(12) United States Patent
Tokuchi

(10) Patent No.: US 10,440,208 B2
(45) Date of Patent: Oct. 8, 2019

(54) INFORMATION PROCESSING APPARATUS WITH COOPERATIVE FUNCTION IDENTIFICATION

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/641,871

(22) Filed: Jul. 5, 2017

(65) Prior Publication Data

US 2018/0109691 A1 Apr. 19, 2018

(30) Foreign Application Priority Data

Oct. 19, 2016 (JP) .................................. 2016-205160
Jan. 11, 2017 (JP) .................................. 2017-002491

(51) Int. Cl.
*G06F 3/12* (2006.01)
*H04N 1/00* (2006.01)

(52) U.S. Cl.
CPC ....... *H04N 1/00474* (2013.01); *H04N 1/0048* (2013.01); *H04N 1/00129* (2013.01); *H04N 1/00413* (2013.01); *H04N 2201/0094* (2013.01)

(58) Field of Classification Search
CPC ........... H04N 1/00474; H04N 1/00129; H04N 1/00413; H04N 1/0048; H04N 1/00973; H04N 1/00344; H04N 1/00267; H04N 2201/0039; H04N 2201/0094; G06F 3/1296; G06F 17/30595; G06K 15/02
USPC ......................................... 358/1.1–1.18, 402
See application file for complete search history.

(56) References Cited

U.S. PATENT DOCUMENTS

| | | | |
|---|---|---|---|
| 6,024,848 A | 2/2000 | Dufner et al. | |
| 6,052,458 A | 4/2000 | Amir-Ebrahimi | |
| 7,757,180 B2 * | 7/2010 | Nakai | G06F 3/0486 715/769 |
| 9,986,113 B2 * | 5/2018 | Tokuchi | H04N 1/00251 |
| 2004/0153530 A1 * | 8/2004 | Machida | H04L 41/0803 709/220 |
| 2008/0201492 A1 * | 8/2008 | Nigorikawa | H04N 1/00347 710/11 |
| 2010/0195147 A1 * | 8/2010 | Tamura | G06F 3/1204 358/1.15 |
| 2011/0302300 A1 * | 12/2011 | Kikkawa | H04L 12/2809 709/224 |

(Continued)

FOREIGN PATENT DOCUMENTS

| | | |
|---|---|---|
| JP | 2001-92575 A | 4/2001 |
| JP | 2011-182183 A | 9/2011 |

(Continued)

OTHER PUBLICATIONS

Jul. 3, 2018 Office Action issued in Japanese Patent Application No. 2017-002491.

(Continued)

*Primary Examiner* — Gabriel I Garcia
(74) *Attorney, Agent, or Firm* — Oliff PLC

(57) ABSTRACT

An information processing apparatus includes a controller. The controller performs, if a first image related to a first device that is necessary to execute a cooperative function is designated, control to present a guide indicating a second device that is capable of executing the cooperative function together with the first device.

20 Claims, 31 Drawing Sheets

(56) References Cited

U.S. PATENT DOCUMENTS

2012/0320411 A1* 12/2012 Ganesan ............... G06F 3/1204
358/1.15
2017/0324879 A1* 11/2017 Tokuchi ............. H04N 1/00514

FOREIGN PATENT DOCUMENTS

| JP | 2011-253370 A | 12/2011 |
| JP | 2012-213144 A | 11/2012 |
| JP | 2015-177504 A | 10/2015 |
| JP | 2015-223006 A | 12/2015 |
| JP | 6024848 B1 | 11/2016 |
| JP | 6052458 B1 | 12/2016 |
| WO | 2013/061517 A1 | 5/2013 |

OTHER PUBLICATIONS

Mar. 27, 2018 Office Action issued in Japanese Patent Application No. 2017-002491.

Nov. 20, 2018 Office Action issued in Japanese Patent Application No. 2017-002491.

Jan. 8, 2019 Office Action issued in Japanese Patent Application No. 2018-096311.

* cited by examiner

FIG. 6

| DEVICE ID | NAME (TYPE) OF DEVICE | FUNCTION | IMAGE ID |
|---|---|---|---|
| A | PC | DISPLAY FUNCTION, STORAGE FUNCTION, ... | ... |
| B | MFP | PRINT FUNCTION, SCAN FUNCTION, COPY FUNCTION, FACSIMILE FUNCTION, POST-PROCESSING FUNCTION, ... | ... |
| C | PROJECTOR | PROJECTION FUNCTION, ... | ... |
| ... | ... | ... | ... |

FIG. 7

| COMBINATION OF DEVICE IDS | NAME (TYPE) OF DEVICE | COOPERATIVE FUNCTION |
|---|---|---|
| A, B | PC (A), MFP (B) | SCAN AND TRANSFER FUNCTION |
| | | PRINT FUNCTION |
| A, C | PC (A), PROJECTOR (C) | PROJECTION FUNCTION |
| | | PRINT FUNCTION |
| B, C | MFP (B), PROJECTOR (C) | PROJECTION FUNCTION |
| | | PRINT FUNCTION |
| ... | ... | ... |

| COMBINATION OF DEVICE IDS | NAME (TYPE) OF DEVICE | COOPERATIVE FUNCTION | LINKAGE ORDER | PRIORITY ORDER |
|---|---|---|---|---|
| A, B | PC (A), MFP (B) | SCAN AND TRANSFER FUNCTION | B→A | 1 |
| | | | A→B | 2 |
| | | PRINT FUNCTION | A→B | 1 |
| | | | B→A | 2 |
| A, C | PC (A), PROJECTOR (C) | PROJECTION FUNCTION | A→C | 1 |
| | | | C→A | 2 |
| | | ... | C→A | 1 |
| | | | A→C | 2 |
| ... | ... | ... | ... | ... |

FIG. 39

| DEVICE ID | NAME (TYPE) OF DEVICE | POSITION IN IMAGE | FUNCTION | IMAGE ID |
|---|---|---|---|---|
| A | PC | ... | SCREEN DISPLAY FUNCTION | ... |
| | | ... | DATA STORAGE FUNCTION | |
| | | ... | ... | |
| B | MFP | ... | PRINT FUNCTION | ... |
| | | ... | SCAN FUNCTION | |
| | | ... | STAPLING FUNCTION | |
| | | ... | ... | |
| ... | ... | ... | ... | ... |

FIG. 41

| DEVICE ID | NAME (TYPE) OF DEVICE | PART | PART ID | FUNCTION | PARTIAL IMAGE ID |
|---|---|---|---|---|---|
| A | PC | DISPLAY PART | Aa | SCREEN DISPLAY FUNCTION | ... |
| | | BODY PART | Ab | DATA STORAGE FUNCTION | ... |
| | | ... | ... | ... | ... |
| B | MFP | BODY PART | Ba | PRINT FUNCTION | ... |
| | | READING PART | Bb | SCAN FUNCTION | ... |
| | | POST-PROCESSING APPARATUS | Bc | STAPLING FUNCTION | ... |
| | | ... | ... | ... | ... |
| C | PROJECTOR | BODY PART | Ca | PROJECTION FUNCTION | ... |
| | | ... | ... | ... | ... |
| ... | ... | ... | ... | ... | ... |

FIG. 42

| COMBINATION OF PARTS OF DEVICES | COMBINATION OF PART IDS | COOPERATIVE FUNCTION |
|---|---|---|
| DISPLAY PART OF PC (A) AND BODY PART OF MFP (B) | Aa, Ba | PRINT FUNCTION |
| | ... | ... |
| BODY PART OF MFP (B) AND BODY PART OF PROJECTOR (C) | Ba, Ca | PRINT FUNCTION |
| | ... | ... |
| READING PART OF MFP (B) AND BODY PART OF PROJECTOR (C) | Bb, Ca | SCAN AND PROJECTION FUNCTION |
| | ... | ... |

INFORMATION PROCESSING APPARATUS WITH COOPERATIVE FUNCTION IDENTIFICATION

CROSS-REFERENCE TO RELATED APPLICATIONS

This application is based on and claims priority under 35 USC 119 from Japanese Patent Application No. 2016-205160 filed Oct. 19, 2016, and Japanese Patent Application No. 2017-002491 filed Jan. 11, 2017.

BACKGROUND

Technical Field

The present invention relates to an information processing apparatus.

SUMMARY

According to an aspect of the invention, there is provided an information processing apparatus including a controller. The controller performs, if a first image related to a first device that is necessary to execute a cooperative function is designated, control to present a guide indicating a second device that is capable of executing the cooperative function together with the first device.

BRIEF DESCRIPTION OF THE DRAWINGS

An exemplary embodiment of the present invention will be described in detail based on the following figures, wherein:

FIG. 6 is a diagram illustrating an example of a device function management table;

FIG. 7 is a diagram illustrating an example of a cooperative function management table;

FIG. 39 is a diagram illustrating an example of a device function management table;

FIG. 41 is a diagram illustrating an example of a device function management table;

FIG. 42 is a diagram illustrating an example of a cooperative function management table;

DETAILED DESCRIPTION

A device system serving as an information processing system according to an exemplary embodiment of the present invention will be described with reference to FIG. 1.

Figure 1:
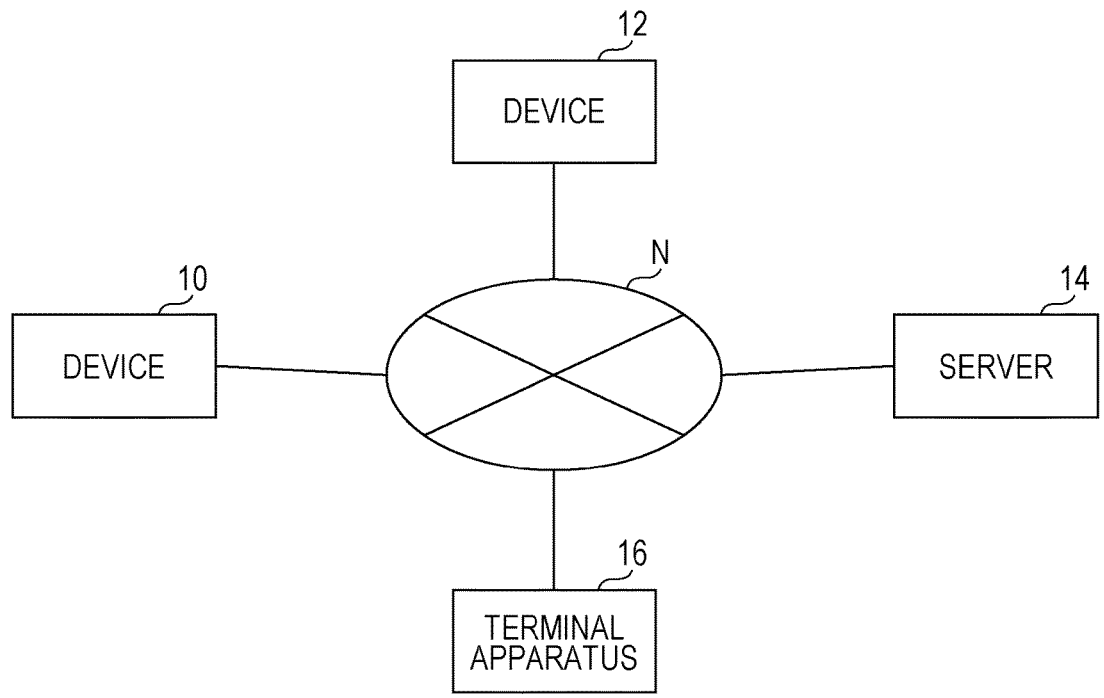
FIG. 1 is a block diagram illustrating a device system according to an exemplary embodiment of the present invention.

FIG. 1 illustrates an example of the device system according to the exemplary embodiment.

The device system according to the exemplary embodiment includes plural devices (for example, devices 10 and 12), a server 14 which is an example of an external apparatus, and a terminal apparatus 16 which is an example of an information processing apparatus. The devices 10 and 12, the server 14, and the terminal apparatus 16 have a function of communicating with each other through a communication path N such as a network. Of course, the devices 10 and 12, the server 14, and the terminal apparatus 16 may communicate with another apparatus through different communication paths. In the example illustrated in FIG. 1, two devices (the devices 10 and 12) are included in the device system. Three or more devices may be included in the device system. Also, plural servers 14 and plural terminal apparatuses 16 may be included in the device system.

The devices 10 and 12 are apparatuses having a specific function and may be, for example, an image forming apparatus having an image formation function, a personal computer (PC), a projector, a display apparatus such as a liquid crystal display or a projector, a telephone, a clock, a monitoring camera, or the like. The devices 10 and 12 have a function of transmitting data to and receiving data from another apparatus. In the exemplary embodiment, it is assumed that the device 10 is an image forming apparatus, for example. The image forming apparatus (device 10) is an apparatus having at least one of a scan function, a print function, a copy function, and a facsimile function.

The server 14 is an apparatus that manages the functions of individual devices. For example, the server 14 manages the functions of individual devices, cooperative functions that use plural functions, and so forth. The server 14 also has a function of transmitting data to and receiving data from another apparatus.

The server 14 may manage, for each user, one or more functions available to the user. A function available to the user is, for example, a function provided to the user without charge or a function provided to the user with charge and purchased by the user. The server 14 may manage, for each user, available function information representing one or more functions available to the user (for example, function purchase history information). Of course, the server 14 does not necessarily manage functions in accordance with whether or not the functions have been purchased, because there are functions free of charge, additional update functions, and special functions managed by a manager. A function purchase process is performed by, for example, the server 14. Of course, the function purchase process may be performed by another apparatus.

The terminal apparatus 16 is an apparatus such as a PC, a tablet PC, a smartphone, or a mobile phone, and has a function of transmitting data to and receiving data from another apparatus. The terminal apparatus 16 functions as, for example, a user interface unit (UI unit) when a device is used.

In the device system according to the exemplary embodiment, if a first image related to a first device is designated, control is performed to present a guide indicating a second device that is capable of executing a cooperative function together with the first device. Alternatively, if a first, image related to a first function is designated, control may be performed to present a guide indicating a second function that is capable of executing a cooperative function together with the first function.

Hereinafter, the individual apparatuses included in the device system according to the exemplary embodiment will be described in detail.

Figure 2:
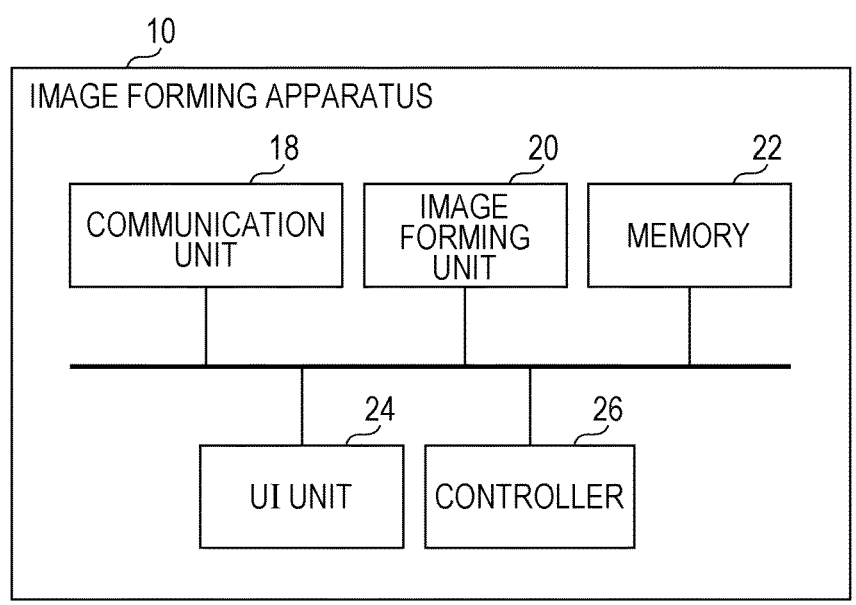
FIG. 2 is a block diagram illustrating an image forming apparatus according to the exemplary embodiment.

The configuration of the device 10 as an image forming apparatus will be described in detail with reference to FIG. 2. Hereinafter, the device 10 may be referred to as an image forming apparatus 10. FIG. 2 illustrates the configuration of the image forming apparatus 10.

A communication unit 18 is a communication interface and has a function of transmitting data to another apparatus and a function of receiving data from another apparatus. The communication unit 18 may be a communication interface having a wireless communication function or may be a communication interface having a wired communication function.

An image forming unit 20 has an image formation function. Specifically, the image forming unit 20 has at least one of a scan function, a print function, a copy function, and a facsimile function. When the scan function is executed, a document is read and scan data (image data) is generated. When the print function is executed, an image is printed on a recording medium such as paper. When the copy function is executed, a document is read and printed on a recording medium. When the facsimile function is executed, image data is transmitted or received by facsimile. Furthermore, a cooperative function that uses plural functions may be executed. For example, a scan and transfer function, which is a combination of a scan function and a transmission (transfer) function, may be executed. When the scan and transfer function is executed, a document is read, scan data (image data) is generated, and the scan data is transmitted to a destination (for example, an external apparatus such as the terminal apparatus 16). Of course, this cooperative function is merely an example and another cooperative function may be executed.

A memory 22 is a storage apparatus such as a hard disk or a memory (for example, a solid state drive (SSD) or the like). The memory 22 stores, for example, information representing an image formation instruction (for example, job information), image data to be printed, scan data generated by executing a scan function, device address information representing the address of another device, server address information representing the address of the server 14, various pieces of control data, and various programs. Of course, these pieces of information and data may be stored in different storage apparatuses or in one storage apparatus.

A UI unit 24 is a user interface unit and includes a display and an operation unit. The display is a display apparatus such as a liquid crystal display. The operation unit is an input apparatus such as a touch screen or a keyboard. Of course, a user interface serving as both a display and an operation unit (for example, a touch display or an apparatus including a display that electronically displays a keyboard or the like) may be used. The image forming apparatus 10 does not necessarily include the UI unit 24, and may include a hardware user interface unit (hardware UI unit) serving as hardware instead of the display. The hardware UI unit is, for example, a hardware keypad dedicated to input numbers (for example, a numeric keypad) or a hardware keypad dedicated to indicate directions (for example, a direction indication keypad).

A controller 26 controls the operations of the individual units of the image forming apparatus 10.

Figure 3:
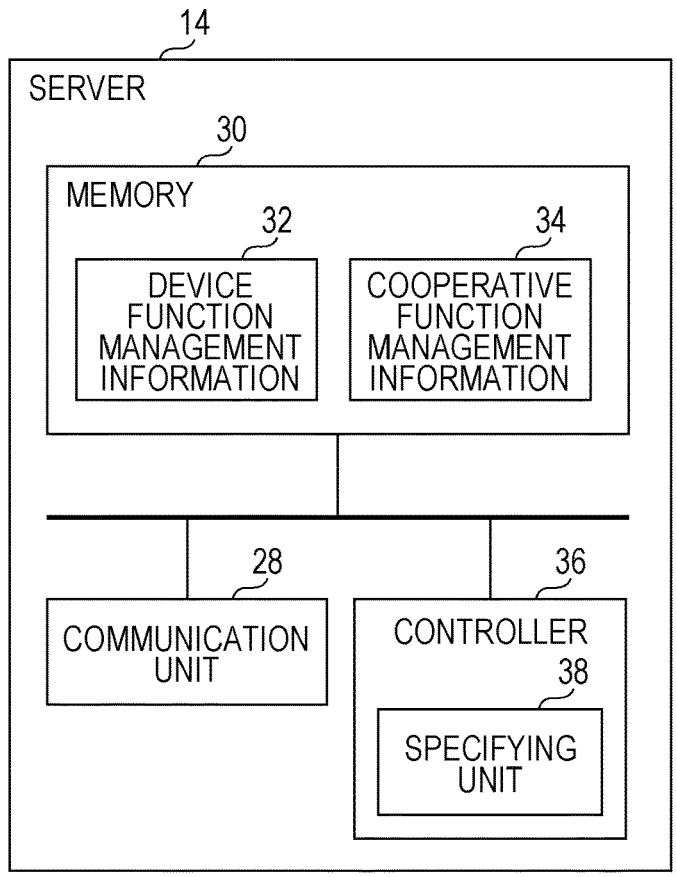
FIG. 3 is a block diagram illustrating a server according to the exemplary embodiment.

Hereinafter, the configuration of the server 14 will be described in detail with reference to FIG. 3. FIG. 3 illustrates the configuration of the server 14.

A communication unit 28 is a communication interface and has a function of transmitting data to another apparatus and a function of receiving data from another apparatus. The communication unit 28 may be a communication interface having a wireless communication function or may be a communication interface having a wired communication function.

A memory 30 is a storage apparatus such as a hard disk or a memory (for example, an SSD or the like). The memory 30 stores, for example, device function management information 32, cooperative function management information 34, various pieces of data, various programs, device address information representing the addresses of individual devices, and server address information representing the address of the server 14. Of course, these pieces of information and data may be stored in different storage apparatuses or in one storage apparatus. The device function management information 32 and the cooperative function management information 34 stored in the memory 30 may be provided to the terminal apparatus 16 periodically or at designated timing, and accordingly the information stored in the terminal apparatus 16 may be updated. Hereinafter, the device function management information 32 and the cooperative function management information 34 will be described.

The device function management information 32 is information for managing the functions of the individual devices, and is, for example, information representing the correspondence between device identification information for identifying a device and one or more pieces of function information representing one or more functions of the device. The device identification information includes, for example, a device ID, a device name, information representing the type of the device, a model number of the device, information representing the position of the device (device position information), and an appearance image representing an appearance of the device. The function information includes, for example, a function ID and a function name. For example, if the image forming apparatus 10 has a scan function, a print function, a copy function, and a scan and transfer function, the device identification information of the image forming apparatus 10 is associated with function information representing the scan function, function information representing the print function, function information representing the copy function, and function information representing the scan and transfer function. The functions of the individual devices are specified (identified) by referring to the device function management, information 32.

The devices managed by the device function management information 32 are, for example, the devices included in the device system (for example, the devices 10 and 12). Of course, a device not included in the device system may be managed by the device function management information 32. For example, the server 14 may obtain information about a new device not included in the device system (information including device identification information and function information) and may newly register the information in the device function management information 32. Information about the device may be obtained by using the Internet or the like, or may be input by a manager or the like. The server 14 may update the device function management information 32 at certain timing, periodically, or at timing designated by a manager or the like. Accordingly, function information representing a function that a device does not have before update and that the device has after update may be registered in the device function management information 32. Also, function information representing a function that a device has before update and that the device does not have after update may be deleted from the device function management information 32 and may be registered as unavailable information. Information for update may be obtained by using the Internet or the like or may be input by a manager or the like.

The cooperative function management information 34 is information for managing cooperative functions, each being executed through cooperation between plural functions. One or plural cooperative functions are executed through cooperation between plural functions. Each cooperative function may be executed through cooperation between plural functions of one device (for example, the device 10 or 12) or may be executed through cooperation between plural functions of plural devices (for example, the devices 10 and 12). A terminal apparatus that provides an operation instruction (in the exemplary embodiment, the terminal apparatus 16) may be included in the devices to be identified, and a function of the terminal apparatus may be used as part of a cooperative function.

A cooperative function may be a function that is executed without using a hardware device. For example, a cooperative function may be a function that is executed through cooperation between plural software units. Of course, a cooperative function may be a function that is executed through cooperation between a function of a hardware device and a function implemented by software.

The cooperative function management information 34 is, for example, information representing the correspondence between a combination of pieces of function information representing individual functions that are used in a cooperative function, and cooperative function information representing the cooperative function. The cooperative function information includes, for example, a cooperative function ID and a cooperative function name. If a single function is updated, the cooperative function management information 34 is also updated in accordance with the update. Accordingly, a cooperative function that uses plural functions that are incapable of cooperating with each other before update may become available after update, or a cooperative function that is available before update may become unavailable after update. Cooperative function information representing a cooperative function that becomes available after update is registered in the cooperative function management information 34, and cooperative function information representing a cooperative function that becomes unavailable after update is deleted from the cooperative function management information 34 or is registered as unavailable information.

In the case of causing plural devices to cooperate with each other, the cooperative function management information 34 is information for managing one or more cooperative functions that use plural functions of the plural devices, and is information representing the correspondence between a combination of pieces of device identification information for identifying the individual devices that are used for the one or more cooperative functions, and cooperative function information. If the device function management information 32 is updated, the cooperative function management information 34 is also updated in accordance with the update. Accordingly, a cooperative function that uses plural devices that are incapable of cooperating with each other before update may become available, or a cooperative function that is available before update may become unavailable after update.

A cooperative function may be a function that is executed through cooperation between plural different functions or may be a function that is executed through cooperation between the same functions. A cooperative function may be a function that is not available without cooperation. The function that is not available without cooperation may be a function that becomes available by combining the same functions or a function that becomes available by combining different functions among the functions of target devices that cooperate with each other. For example, the cooperation between a device having a print function (printer) and a device having a scan function (scanner) implements a copy function as a cooperative function. That is, the cooperation between the print function and the scan function implements the copy function. In this case, the copy function as a cooperative function is associated with the combination of the print function and the scan function. In the cooperative function management information 34, for example, the cooperative function information representing the copy function as a cooperative function is associated with the combination of the device identification information for identifying the device having the print function and the device identification information for identifying the device having the scan function.

The memory 30 may store available function management information. The available function management information is information for managing one or more functions available to each user, and is, for example, information representing the correspondence between, user identification information for identifying a user and one or more pieces of function information (may include cooperative function information) representing one or more functions available to the user. A function available to the user is, as described above, for example, a function provided to the user without charge or a function purchased by the user, and may be a single function or a cooperative function. The user identification information is, for example, user account information such as a user ID and a user name. Functions available to the individual users are specified (identified) by referring to the available function management information. The available function management information is updated every time a function is provided to a user (for example, every time a function is provided to a user with or without charge).

A controller 36 controls the operations of the individual units of the server 14. The controller 36 includes a specifying unit 38.

The specifying unit 38 receives device identification information for identifying a device and specifies one or more pieces of function information representing one or more functions associated with the device identification information in the device function management information 32 stored in the memory 30. Accordingly, the one or more functions of the device are specified (identified). For example, device identification information is transmitted from the terminal apparatus 16 to the server 14, and then the specifying unit 38 specifies one or more pieces of function information representing one or more functions associated with the device identification information. Information about the one or more functions (for example, function information and function explanation information) is transmitted from the server 14 to the terminal apparatus 16 and is displayed on the terminal apparatus 16, for example. Accordingly, the information about the one or more functions of the device specified by the device identification information is displayed on the terminal apparatus 16.

Also, the specifying unit 38 receives pieces of device identification information for identifying target devices that cooperate with each other and specifies one or more pieces of cooperative function information representing one or more cooperative functions associated with the combination of the pieces of device identification information in the cooperative function management information 34 stored in the memory 30. Accordingly, the one or more cooperative functions that are executed through cooperation between the functions of the target devices that cooperate with each other are specified (identified). For example, plural pieces of device identification information are transmitted from the terminal apparatus 16 to the server 14, and then the specifying unit 38 specifies one or more pieces of cooperative function information representing one or more cooperative functions associated with the plural pieces of device identification information. Information about the one or more cooperative functions (for example, cooperative function information and cooperative function explanation information) is transmitted from the server 14 to the terminal apparatus 16 and is displayed on the terminal apparatus 16, for example. Accordingly, the information about the one or more cooperative functions that are executed by the plural devices specified by the plural pieces of device identification information is displayed on the terminal apparatus 16.

For example, if one device is identified (for example, if one device is photographed), the specifying unit 38 may receive the device identification information for identifying the device and may specify one or more pieces of function information representing one or more functions associated with the device identification information in the device function management information 32. Accordingly, if one device is identified (for example, if one device is photographed), one or more functions of the device are specified (identified). If plural devices are identified (for example, if plural devices are photographed), the specifying unit 38 may receive the pieces of device identification information for identifying individual devices included in the plural devices and may specify one or more pieces of cooperative function information representing one or more cooperative functions associated with the combination of the pieces of device identification information in the cooperative function management information 34. Accordingly, if plural devices are identified (for example, if plural devices are photographed), one or more cooperative functions that use functions of the plural devices are specified (identified).

The specifying unit 38 may receive pieces of function information representing individual functions that are used in a cooperative function and may specify one or more pieces of cooperative function information representing one or more cooperative functions associated with the combination of the pieces of function information in the cooperative function management information 34 stored in the memory 30. Accordingly, one or more cooperative functions that are executed through cooperation between target functions are specified (identified). For example, plural pieces of function information are transmitted from the terminal apparatus 16 to the server 14, and then the specifying unit 38 specifies one or more pieces of cooperative function information representing one or more cooperative functions associated with the plural pieces of function information. In a manner similar to that described above, information about one or more cooperative functions that are executed by the plural functions specified, by the plural pieces of function information is displayed on the terminal apparatus 16.

If functions available to a user are managed, the specifying unit 38 may receive user identification information for identifying the user and may specify the pieces of function information representing individual functions associated with the user identification information in the available function management, information stored in the memory 30.

Accordingly, a group of functions available to the user is specified (identified). For example, user identification information is transmitted from the terminal apparatus 16 to the server 14, and the pieces of function information representing individual functions associated with the user identification information are specified by the specifying unit 38. The information about the individual functions available to the user (for example, information representing the names of the individual functions) is transmitted from the server 14 to the terminal apparatus 16 and is displayed on the terminal apparatus 16, for example. Accordingly, the information about the individual functions available to the user specified by the user identification information is displayed, on the terminal apparatus 16. For example, the specifying unit 38 receives device identification information and user identification information, specifies one or more pieces of function information representing one or more functions associated with the device identification information in the device function management information 32, and also specifies one or more pieces of function information representing one or more functions associated with the user identification information in the available function management information. Accordingly, the one or more functions that the device specified by the device identification information has and that are available to the user specified by the user identification information are specified.

The controller 36 may execute a function purchase process and may manage the history of the purchase. For example, if a pay function is purchased by a user, the controller 36 may apply a charging process to the user.

The controller 36 may execute functions related to image processing, such as a character recognition function, a translation function, an image processing function, and an image formation function. Of course, the controller 36 may execute a function related to processing other than image processing. When the character recognition function is executed, characters in an image are recognized and character data representing the characters is generated. When the translation function is executed, characters in an image are translated into characters expressed by a specific language and character data representing the translated characters is generated. When the image processing function is executed, an image is processed. For example, the controller 36 may receive scan data generated through execution of a scan function from the image forming apparatus 10, and may execute a function related to image processing, such as the character recognition function, the translation function, or the image processing function, on the scan data. The controller 36 may receive image data from the terminal apparatus 16 and execute each function on the image data. The character data or image data generated by the controller 36 is transmitted from the server 14 to the terminal apparatus 16, for example. The server 14 may be used as an external device, and a cooperative function may be a function that uses functions of plural devices including the server 14.

Figure 4:
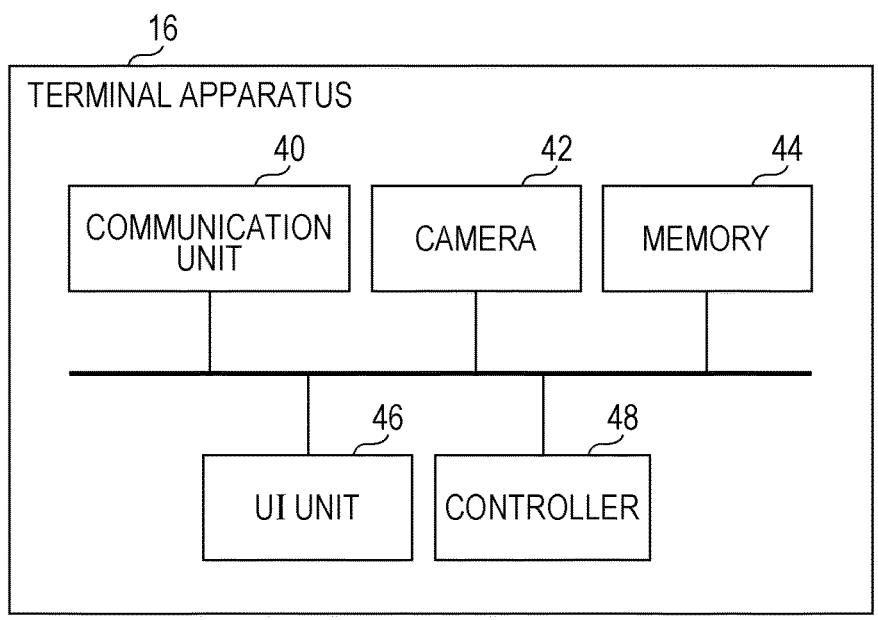
FIG. 4 is a block diagram illustrating a terminal apparatus according to the exemplary embodiment.

Hereinafter, the configuration of the terminal apparatus 16 will be described in detail with reference to FIG. 4. FIG. 4 illustrates the configuration of the terminal apparatus 16.

A communication unit 40 is a communication interface and has a function of transmitting data to another apparatus and a function of receiving data from another apparatus. The communication unit 40 may be a communication interface having a wireless communication function or may be a communication interface having a wired communication function.

A camera 42, which serves as a photographing unit, photographs a subject and thereby generates image data (for example, still image data or moving image data). Alternatively, instead of using the camera 42 of the terminal apparatus 16, image data captured by an external camera connected to a communication path such as a network may be received by the communication unit 40 and may be displayed on a UI unit 46 so that the image data may be operated by a user.

A memory 44 is a storage apparatus such as a hard disk or a memory (for example, an SSD or the like). The memory 44 stores various programs, various pieces of data, the address information of the server 14, the pieces of address information of individual devices (for example, the pieces of address information of the devices 10 and 12), information about an identified device, information about identified target devices that cooperate with each other, information about a function of an identified device, and information about a cooperative function.

The UI unit 46 is a user interface unit and includes a display and an operation unit. The display is a display apparatus such as a liquid crystal display. The operation unit is an input apparatus such as a touch screen, a keyboard, or a mouse. Of course, a user interface serving as both a display and an operation unit (for example, a touch display or an apparatus including a display that electronically displays a keyboard or the like) may be used.

A controller 48 controls the operations of the individual units of the terminal apparatus 16. The controller 48 functions as, for example, a display controller (controller) and causes the display of the UI unit 46 to display various pieces of information.

The display of the UI unit 46 displays, for example, an image captured by the camera 42, an image related to a device identified as a target device to be used (for example, a device used alone or a target, device that cooperates), an image related to a function, and so forth. An image related to a device may be an image (still image or moving image) representing the device captured by the camera 42 or may be an image (for example, an icon) schematically representing the device. The data of the image schematically representing the device may be stored in the server 14 and provided from the server 14 to the terminal apparatus 16, may be stored in the terminal apparatus 16 in advance, or may be stored in another apparatus and provided from the other apparatus to the terminal apparatus 16. An image related to a function is, for example, an image of an icon or the like representing the function.

The above-described device function management information 32 may be stored in the memory 44 of the terminal apparatus 16. In this case, the device function management, information 32 is not necessarily stored in the memory 30 of the server 14. Also, the above-described cooperative function management information 34 may be stored in the memory 44 of the terminal apparatus 16. In this case, the cooperative function management information 34 is not necessarily stored in the memory 30 of the server 14. The controller 48 of the terminal apparatus 16 may include the above-described specifying unit 38, which may specify one or more functions of a device by identifying the device on the basis of device identification information and may specify one or more cooperative functions that use plural functions. In this case, the server 14 does not necessarily include the specifying unit 38.

If available function management information is created, the available function management information may be stored in the memory 44 of the terminal apparatus 16. In this case, the available function management, information is not necessarily stored in the memory 30 of the server 14. The controller 48 of the terminal apparatus 16 may manage a function purchase history of a user. In this case, the controller 36 of the server 14 does not necessarily have the management function therefor. The controller 48 of the terminal apparatus 16 may specify one or more functions available to a user on the basis of user identification information.

Alternatively, the device function management information 32 and the cooperative function management information 34 may be stored in a device such as the device 10 or 12, and a device such as the device 10 or 12 may include the specifying unit 38. That is, the process by the specifying unit 38 of the server 14 (for example, a process of identifying a device, a process of identifying a function, or a process of identifying a cooperative function) may be performed in the server 14, may be performed in the terminal apparatus 16, or may be performed in a device such as the device 10 or 12.

In the exemplary embodiment, for example, augmented reality (AR) technologies are applied to obtain device identification information and to identify a device. For example, the AR technologies are applied to obtain device identification information of a device that is used alone and to identify the device, and also to obtain pieces of device identification information of the target devices that cooperate with each other and to identify the target devices. The AR technologies according to the related art are used. For example, a marker-based AR technology in which a marker such as a two-dimensional barcode is used, a markerless AR technology in which an image recognition technique is used, a position information AR technology in which position information is used, and the like are used. Of course, device identification information may be obtained and a device may be identified without applying the AR technologies. For example, in the case of a device connected to a network, the device may be identified on the basis of the IP address thereof or by reading the device ID thereof. Furthermore, in the case of devices or terminal apparatuses having various types of wireless communication function based on infrared communication, visible light communication, Wireless Fidelity (Wi-Fi, registered trademark), or Bluetooth (registered trademark), the devices that cooperate with each other by using the wireless communication function may be identified by obtaining the device IDs thereof, and a cooperative function may be executed.

Figure 5:
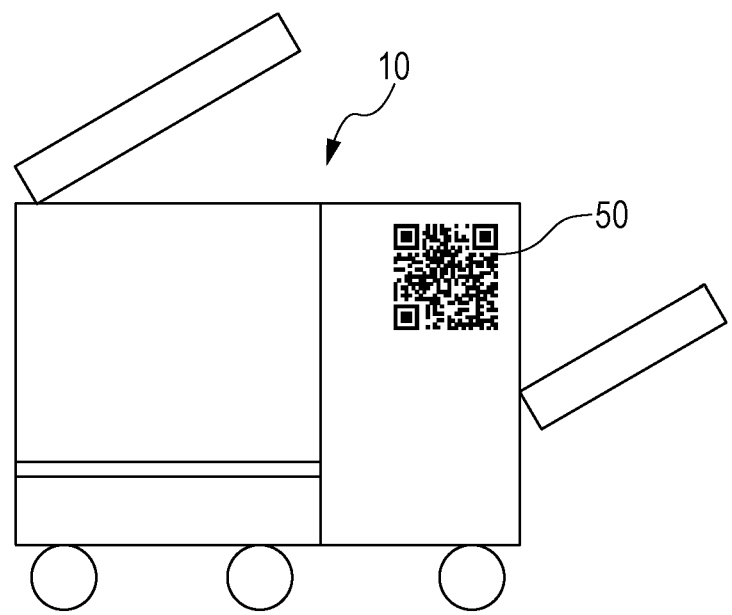
FIG. 5 is a schematic diagram illustrating an appearance of the image forming apparatus.

Hereinafter, a process of obtaining device identification information will be described in detail with reference to FIG. 5. As an example, a description will be given of the case of obtaining the device identification information of the image forming apparatus 10. FIG. 5 schematically illustrates an appearance of the image forming apparatus 10. Here, a description will be given of a process of obtaining the device identification information by applying the marker-based AR technology. The housing of the image forming apparatus 10 is attached with a marker 50, such as a two-dimensional barcode. The marker 50 is information obtained by coding the device identification information of the image forming apparatus 10. A user activates the camera 42 of the terminal apparatus 16 and photographs, with the camera 42, the marker 50 attached to the image forming apparatus 10, which is a target to be used. Accordingly, image data representing the marker 50 is generated. The image data is transmitted from the terminal apparatus 16 to the server 14, for example. In the server 14, the controller 36 performs a decoding process on the marker image represented by the image data and thereby extracts device identification information. Accordingly, the image forming apparatus 10 to be used (the image forming apparatus 10 attached with the photographed marker 50) is identified. The specifying unit 38 of the server 14 specifies the pieces of function information of the functions associated with the extracted device identification information in the device function management information 32. Accordingly, the functions of the image forming apparatus 10 to be used are specified (identified).

Alternatively, the controller 48 of the terminal apparatus 16 may perform a decoding process on the image data representing the marker 50 to extract the device identification information. In this case, the extracted device identification information is transmitted from the terminal apparatus 16 to the server 14. The specifying unit 38 of the server 14 specifies the pieces of function information representing the functions associated with the device identification information transmitted from the terminal apparatus 16 in the device function management information 32. If the device function management information 32 is stored in the memory 44 of the terminal apparatus 16, the controller 48 of the terminal, apparatus 16 may specify the pieces of function information representing the functions associated with the extracted device identification information in the device function management information 32.

The marker 50 may include coded function information representing the functions of the image forming apparatus 10. In this case, the device identification information of the image forming apparatus 10 is extracted and also the pieces of function information representing the functions of the image forming apparatus 10 are extracted by performing a decoding process on the image data representing the marker 50. Accordingly, the image forming apparatus 10 is specified (identified) and also the functions of the image forming apparatus 10 are specified (identified). The decoding process may be performed by the server 14 or the terminal apparatus 16.

In the case of executing a cooperative function that uses functions of plural devices, markers of the target devices that cooperate with each other are photographed to obtain the pieces of device identification information of the devices, and thereby the cooperative function is specified (identified).

In the case of obtaining device identification information by applying the markerless AR technology, for example, a user photographs the whole appearance or part of the appearance of the device to be used (for example, the image forming apparatus 10) by using the camera 42 of the terminal apparatus 16. Of course, it is useful to obtain information for specifying the device to be used, such as the name (for example, the trade name) or model number of the device, by photographing the appearance of the device. As a result of the photography, appearance image data representing the whole appearance or part of the appearance of the device to be used is generated. The appearance image data is transmitted from the terminal apparatus 16 to the server 14, for example. In the server 14, the controller 36 identifies the device to be used on the basis of the appearance image data. For example, the memory 30 of the server 14 stores, for each device, appearance image correspondence information representing the correspondence between appearance image data representing the whole appearance or part of the appearance of the device and device identification information of the device. The controller 36 compares, for example, the appearance image data received from the terminal apparatus 16 with each piece of appearance image data included in the appearance image correspondence information, and specifies the device identification information of the device to be used on the basis of the comparison result. For example, the controller 36 extracts, from the appearance image data received from the terminal apparatus 16, a feature of the appearance of the device to be used, specifies the appearance image data representing a feature that is the same as or similar to the feature of the appearance in the appearance image data group included in the appearance image correspondence information, and specifies the device identification information associated with the appearance image data. Accordingly, the device to be used (the device photographed by the camera 42) is identified. For another example, if the name (for example, the trade name) or model number of the device is photographed and appearance image data representing the name or model number is generated, the device to be used may be identified on the basis of the name or model number represented by the appearance image data. The specifying unit 38 of the server 14 specifies the pieces of function information representing the individual functions associated with the specified device identification information in the device function management information 32. Accordingly, the functions of the device to be used (for example, the image forming apparatus 10) are specified.

Alternatively, the controller 48 of the terminal apparatus 16 may compare the appearance image data representing the whole appearance or part of the appearance of the device to be used (for example, the image forming apparatus 10) with each piece of appearance image data included in the appearance image correspondence information and may specify the device identification information of the device to be used on the basis of the comparison result. The appearance image correspondence information may be stored in the memory 44 of the terminal apparatus 16. In this case, the controller 48 of the terminal apparatus 16 refers to the appearance image correspondence information stored in the memory 44 of the terminal apparatus 16 and thereby specifies the device identification information of the device to be used. Alternatively, the controller 48 of the terminal apparatus 16 may obtain the appearance image correspondence information from the server 14 and may refer to the appearance image correspondence information, so as to specify the device identification information of the device to be used.

In the case of executing a cooperative function that uses plural functions of plural devices, the whole appearance or part of the appearance of the individual devices that cooperate with each other is photographed to obtain the pieces of device identification information of the devices, and thereby the cooperative function is specified (identified).

In the case of obtaining device identification information by applying the position information AR technology, for example, position information representing the position of a device (for example, the image forming apparatus 10) is obtained by using a Global Positioning System (GPS) function. For example, each device has a GPS function and obtains device position information representing the position of the device. The terminal apparatus 16 outputs, to the device to be used, information representing a request for obtaining device position information, and receives, as a response to the request, the device position information of the device from the device. The device position information is transmitted from the terminal apparatus 16 to the server 14, for example. In the server 14, the controller 36 identifies the device to be used on the basis of the device position information. For example, the memory 30 of the server 14 stores, for each device, position correspondence information representing the correspondence between the device position information representing the position of the device and the device identification information of the device. The controller 36 specifies, in the position correspondence information, the device identification information associated with, the device position information received from the terminal apparatus 16. Accordingly, the device to be used is specified (identified). The specifying unit 38 of the server 14 specifies, in the device function management information 32, the pieces of function information representing the individual functions associated with the specified device identification information. Accordingly, the functions of the device to be used (for example, the image forming apparatus 10) are specified (identified).

The controller 48 of the terminal apparatus 16 may specify, in the position correspondence information, the device identification information associated with the position information of the device to be used. The position correspondence information may be stored in the memory 44 of the terminal apparatus 16. In this case, the controller 48 of the terminal apparatus 16 refers to the position, correspondence information stored in the memory 44 of the terminal apparatus 16 and thereby specifies the device identification information of the device to be used. Alternatively, the controller 48 of the terminal apparatus 16 may obtain the position correspondence information from the server 14 and refer to the position correspondence information, so as to specify the device identification information of the device to be used.

In the case of executing a cooperative function that uses plural devices, the pieces of device position information of the devices that cooperate with each other are obtained and the pieces of device identification information of the devices are specified on the basis of the pieces of device position information. Accordingly, the cooperative function is specified (identified).

Hereinafter, the device system according to the exemplary embodiment will further be described in detail.

The device function management information 32 will be described in detail with reference to FIG. 6. FIG. 6 illustrates an example of a device function management table, which is the device function management information 32. In the device function management table, for example, a device ID, information representing the name of the device (for example, the type of the device), information representing one or more functions of the device (function information), and an image ID are associated with each other. The device ID and the name of the device correspond to an example of device, identification information. The image ID is an example of image identification information for identifying an image representing a device (for example, an image representing an appearance of a device or an image schematically representing a device (for example, an icon)). The device function management table does not necessarily include the image ID. For example, the device having a device ID "B" is a multifunction peripheral (MFP, an image forming apparatus having plural image formation functions) and has a print function, a scan function, and so forth. An image ID for identifying an image representing the device is associated with the device. The data of the image representing the device is stored in, for example, the memory 30 of the server 14 or another apparatus.

For example, with use of the AR technologies, a device ID for identifying a device to be used is obtained. The specifying unit 38 of the server 14 specifies the name of the device, one or more functions of the device, and the image ID associated with the device ID by referring to the device function management table. Accordingly, the device to be used is identified. For example, information representing the name of the device and the data, of an image representing the device are transmitted from the server 14 to the terminal apparatus 16 and then they are displayed on the UI unit 46 of the terminal apparatus 16. The image representing the device is displayed as an image related to the device. Of course, an image captured by the camera 42 may be displayed on the UI unit 46 of the terminal apparatus 16. If the image related to the device (for example, an image captured by the camera 42 or an image schematically representing the device) is designated by a user on the UI unit 46 of the terminal apparatus 16, information about one or more functions of the device (for example, function information or function explanation information) may be transmitted from the server 14 to the terminal apparatus 16 and may be displayed on the UI unit 46 of the terminal apparatus 16.

Next, the cooperative function management information 34 will be described in detail with reference to FIG. 7. FIG. 7 illustrates an example of a cooperative function management table, which is the cooperative function management information 34. In the cooperative function management table, for example, a combination of device IDs, information representing the names (types) of target devices that cooperate with each other, and information representing one or more cooperative functions (cooperative function information) are associated with each other. For example, the device having a device ID "A" is a personal computer (PC), and the device having a device ID "B" is an MFP. The cooperation between the PC (A) and the MFP (B) implements, for example, a scan and transfer function and a print function as cooperative functions. The scan and transfer function is a function of transferring image data generated through scanning by the MFP (B) to the PC (A). The print function is a function of transmitting data (for example, image data or document data) stored in the PC (A) to the MFP (B) and printing the data by the MFP (B).

Figure 8:
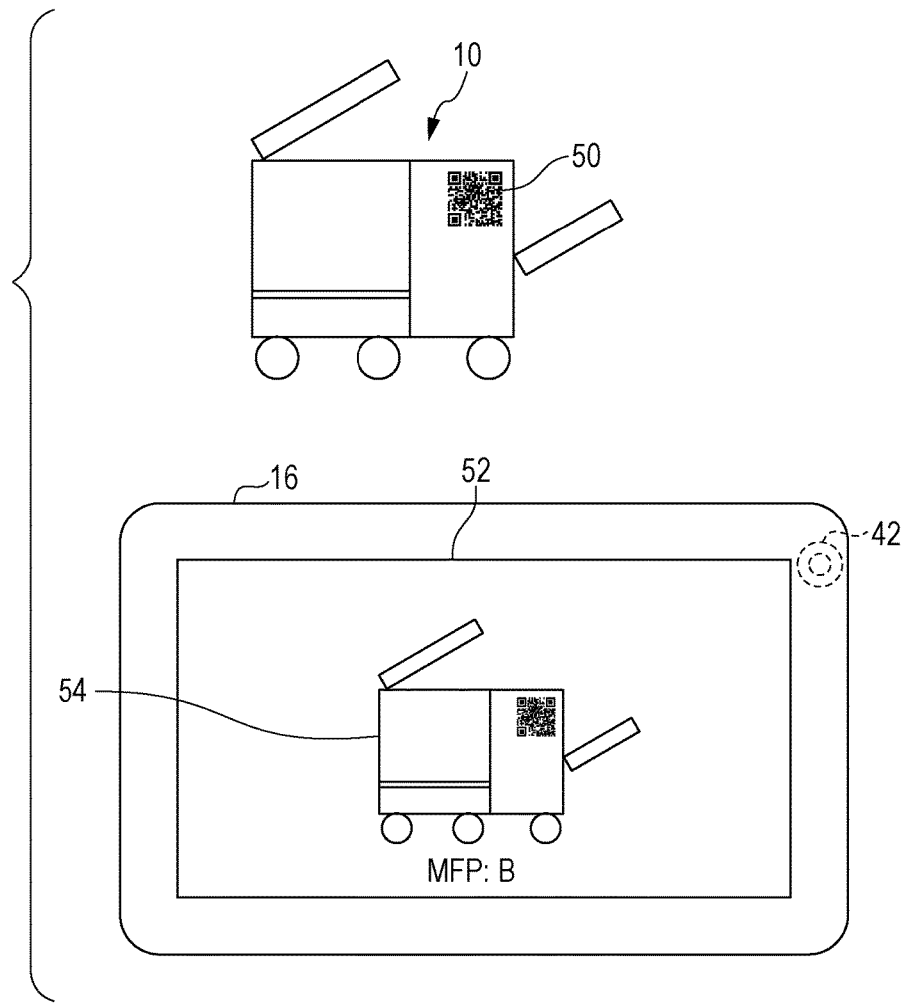
FIG. 8 is a diagram illustrating a device that is used alone.

Hereinafter, a description will be given of a process in a case where a device is used alone, with reference to FIG. 8. FIG. 8 illustrates an example of a device that is used alone. For example, it is assumed that the image forming apparatus 10 is the device that is used alone. The image forming apparatus 10 is, for example, an MFP. The image forming apparatus 10 is a device that exists in real space. The terminal apparatus 16 illustrated in FIG. 8 is a device that exists in real space and is, for example, a mobile terminal apparatus such as a smartphone or mobile phone.

For example, the housing of the image forming apparatus 10 is attached with the marker 50, such as a two-dimensional barcode. In a case where the marker-based AR technology or the markerless AR technology is used, a user photographs, with the camera 42 of the terminal, apparatus 16 (for example, a smartphone), the image forming apparatus 10 to be used. Accordingly, image data representing the marker 50 or appearance image data representing an appearance of the image forming apparatus 10 is generated. A device display screen 52 is displayed on a display of the UI unit 46 of the terminal apparatus 16, and a device image 54 related to the image forming apparatus 10 is displayed on the device display screen 52. The device image 54 is, for example, an image generated through photography by the camera 42 (having an original size at the photography or an increased or decreased size).

The image data generated through photography by the camera 42 is transmitted from the terminal apparatus 16 to the server 14. In the server 14, the controller 36 performs a decoding process on the image data to extract the device identification information of the image forming apparatus 10, and accordingly the image forming apparatus 10 is identified. Alternatively, appearance image data representing an appearance of the image forming apparatus 10 may be generated, and the appearance image data may be transmitted from the terminal apparatus 16 to the server 14. In this case, in the server 14, the controller 36 specifies the device identification information of the image forming apparatus 10 by referring to the appearance image correspondence information. Accordingly, the image forming apparatus 10 is identified.

The specifying unit 38 of the server 14 specifies (identifies) the functions of the image forming apparatus 10 by referring to the device function management information 32 (for example, the device function management table illustrated in FIG. 6). This will be described in detail with reference to FIG. 6. It is assumed that the image forming apparatus 10 is an "MFP (B)", for example. The specifying unit 38 specifies the functions associated with the MFP (B) in the device function management table illustrated in FIG. 6. Accordingly, the functions of the MFP (B) are specified. The information about the specified functions is transmitted from the server 14 to the terminal apparatus 16. Of course, the process for identifying a device and a function may be performed by the terminal apparatus 16.

On the device display screen 52, a prepared image related to the identified image forming apparatus 10 (not an image obtained through photography but a schematic image (for example, an icon)) or an image generated through photography by an external camera may be displayed as the device image 54, instead of the image generated through photography by the camera 42.

For example, in the case of using image data obtained by photographing a device, the appearance of the device in a current state (for example, an appearance including a scratch, note, sticker attached to the device, and so forth) is reflected in the image, and thus a user may be able to visually recognize the difference from another device of the same type more clearly.

In the case of using a schematic image, the data of the schematic image is transmitted from the server 14 to the terminal apparatus 16, for example. For example, when the image forming apparatus 10 is identified, the specifying unit 38 of the server 14 specifies the schematic image related to the image forming apparatus 10 by referring to the device function management table (device function management information 32) illustrated in FIG. 6. The data of the schematic image is transmitted from the server 14 to the terminal apparatus 16, and the schematic image is displayed as the device image 54 on the device display screen 52. The data of the schematic image may be stored in the terminal apparatus 16 in advance. In this case, when the image forming apparatus 10 is identified, the device image 54 stored in the terminal apparatus 16 is displayed on the device display screen 52. The data of the schematic image may be stored in an apparatus other than the server 14 and the terminal apparatus 16.

Also, when a device is identified, information representing the name of the device may be transmitted from the server 14 to the terminal apparatus 16, and the name of the device may be displayed on the device display screen 52 in the terminal apparatus 16. In the example illustrated in FIG. 8, the image forming apparatus 10 is an MFP, and the name thereof "MFP (B)" is displayed.

Figure 9:
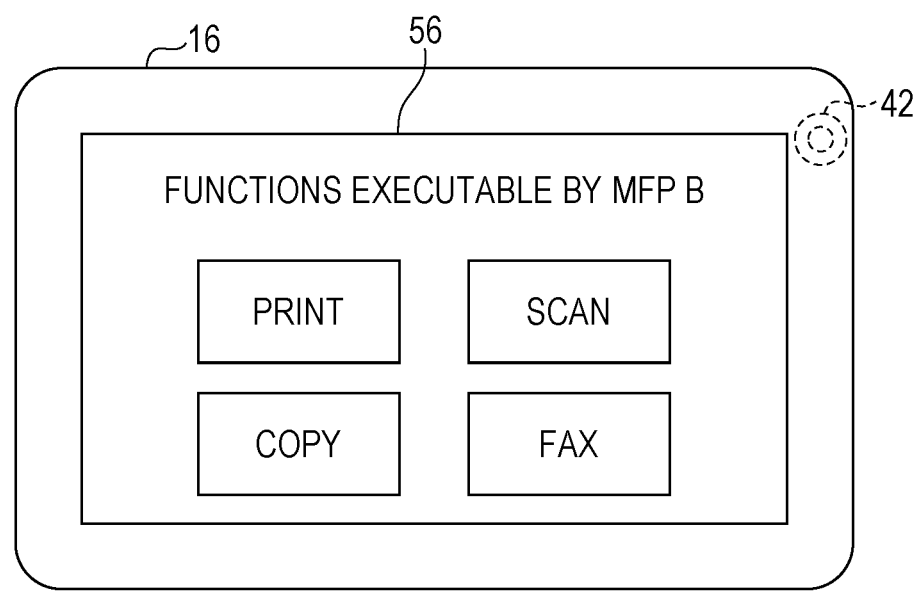
FIG. 9 is a diagram illustrating an example of a function display screen.

After the functions of the image forming apparatus 10 are specified, the controller 48 of the terminal apparatus 16 causes the UI unit 46 of the terminal apparatus 16 to display a function display screen 56 and causes information about the functions to be displayed on the function display screen 56, as illustrated in FIG. 9. As the information about the functions, for example, button images to be used for providing an instruction to execute the functions are displayed.

The MFP (B) as the image forming apparatus 10 has, for example, a print function, a scan function, a copy function, and a facsimile function, and thus button images to be used for providing an instruction to execute these functions are displayed on the function display screen 56. For example, when a user designates the button image representing the print function by using the terminal apparatus 16 and provides an instruction to execute the print function, execution instruction information representing an instruction to execute the print function is transmitted from the terminal apparatus 16 to the image forming apparatus 10. The execution instruction information includes control data for executing the print function, data such as image data to which the print function is applied, and so forth. In response to receipt of the execution instruction information, the image forming apparatus 10 executes printing in accordance with the execution instruction information.

Figure 10:
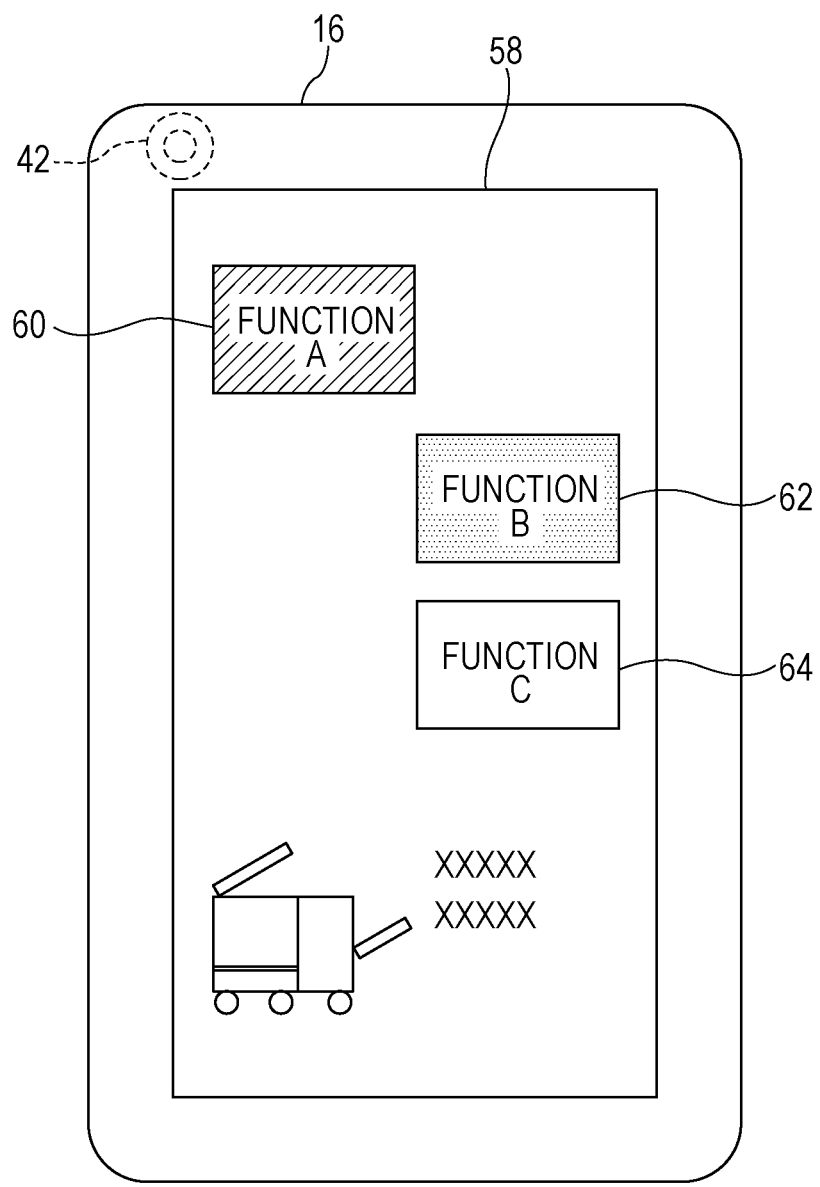
FIG. 10 is a diagram illustrating an example of a function display screen.

FIG. 10 illustrates another example of a function display screen. A function display screen 58 is a screen that is displayed on the UI unit 46 of the terminal apparatus 16 in the case of using a single device, as illustrated in FIG. 8. As described above, the device to be used (for example, the image forming apparatus 10) is specified and the functions of the device to be used are specified. The function information representing the function associated with the user identification information of the user who uses the target device, that is, the function available to the user may be specified. Furthermore, since the functions of the device to be used are specified, a function that the device to be used does not have among a group of functions to be provided may be specified. These pieces of information may be displayed on the function display screen 58.

On the function display screen 58 illustrated in FIG. 10, a button image 60 representing function A, a button image 62 representing function B, and a button image 64 representing function C are displayed as an example of pieces of function information. Function A is a function of the device to be used (for example, the identified image forming apparatus 10) and is a function available to the user. Function B is a function of the device to be used and is a function unavailable to the user. The user becomes able to use function B by being provided with function B. If function B is a pay function, the user becomes able to use function B by purchasing function B. If function B is a free function, the user becomes able to use function B by being provided with function B without charge. Function C is a function that the device to be used does not have, that is, a function incompatible with the device to be used. In accordance with whether or not the function represented by a button image is a function of the device to be used, the controller 48 of the terminal apparatus 16 may change the display form of the button image. Also, in accordance with whether or not the function represented by a button image is a function available to the user, the controller 48 may change the display form of the button image. For example, the controller 48 may change the color or shape of each button image. In the example illustrated in FIG. 10, the button images 60, 62, and 64 are displayed in different colors. For example, a button image representing a function that the device to be used has and that is available to the user (for example, the button image 60 representing function A) is displayed in blue. A button image representing a function that the device to be used has and that is unavailable to the user (for example, the button image 62 representing function B) is displayed in yellow. A button image representing a function that the device to be used does not have (for example, the button image 64 representing function C) is displayed in gray.

Alternatively, the controller 48 may change the shapes of the button images 60, 62, and 64, or may change the fonts of the function display names. Of course, the display form may be changed in another method. Accordingly, the user may recognize the availability of each function with enhanced visibility.

For example, if the user designates the button image 60 representing function A by using the terminal apparatus 16 and provides an instruction to execute function A, execution instruction information representing an instruction to execute function A is transmitted from the terminal apparatus 16 to the target device to be used. The execution instruction information includes control data for executing function A, image data to be subjected to the process by function A, and so forth. In response to receipt of the execution instruction information, the target device executes function A in accordance with, the execution instruction information. For example, if the target device is the image forming apparatus 10 and if function A is a scan and transfer function, the image forming unit 20 of the image forming apparatus 10 executes a scan function to generate scan data (image data). The scan data is then transmitted from the image forming apparatus 10 to a destination that is set (for example, the terminal apparatus 16).

If the user designates the button image 62 representing function B by using the terminal apparatus 16 and provides an instruction to provide function B, a provision process is performed. If the provision process is performed by the server 14, the terminal apparatus 16 accesses the server 14. Accordingly, a screen for being provided with function B (for example, a website), which is information enabling the user to use function B, is displayed on the UI unit 46 of the terminal apparatus 16. By taking a provision procedure on the screen, the user becomes able to use function B. For example, the terminal apparatus 16 stores a program, of a web browser. With use of the web browser, the user is able to access the server 14 from the terminal apparatus 16. When the user accesses the server 14 by using the web browser, a function provision screen (for example, a website) is displayed on the UI unit 46 of the terminal apparatus 16, and the user is provided with the function through the website. Of course, the provision process may be performed by a server different from, the server 14. Alternatively, as the information enabling the user to use function B, a usage permission request screen (for example, a website) for requesting the use of function B to a manager or the like may be displayed on the UI unit 46 of the terminal apparatus 16. If the user requests permission to use function B to the manager or the like through the usage permission request screen and if the permission is obtained, the user is able to use function B.

Figure 11:
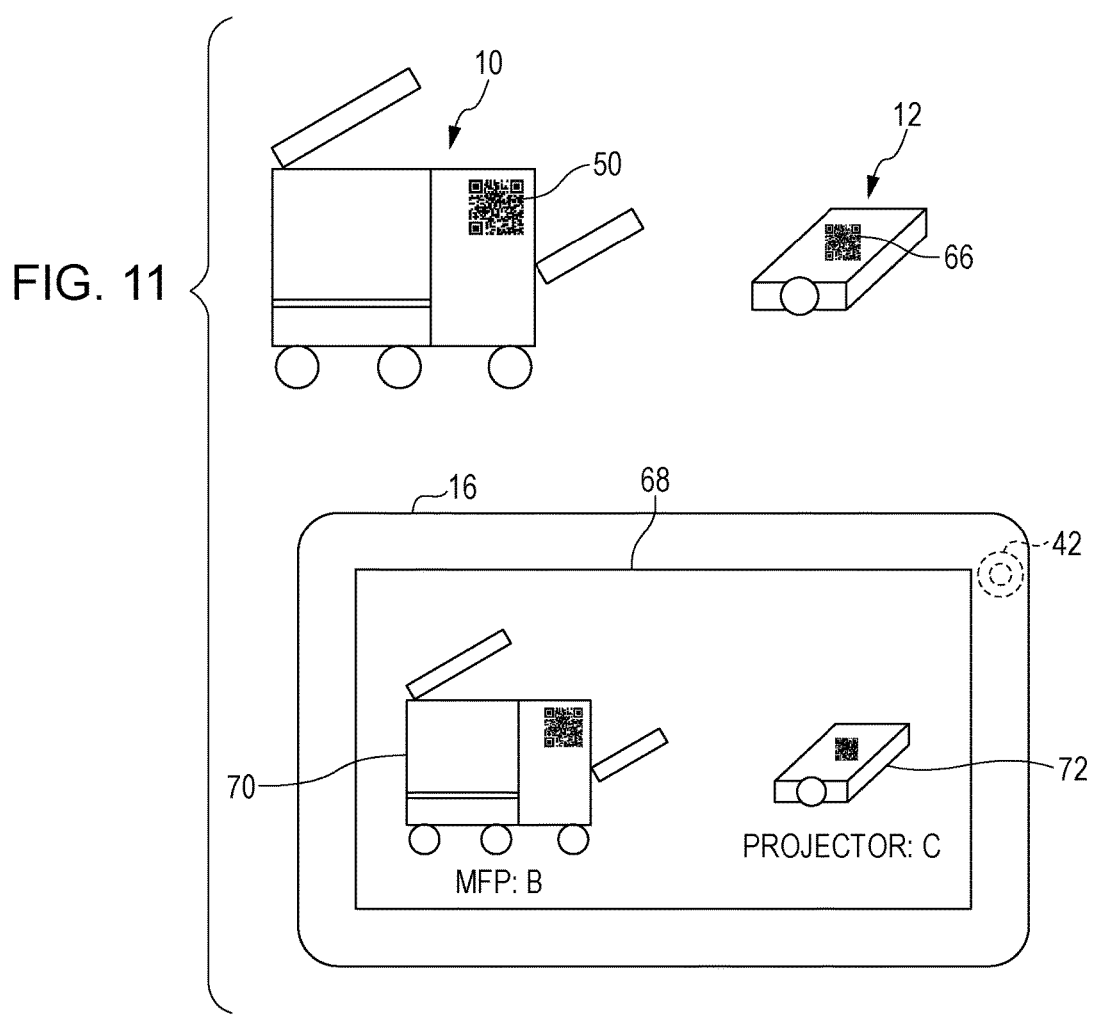
FIG. 11 is a diagram illustrating target devices that cooperate with each other.

Hereinafter, a description will be given of a process in a case where a cooperative function is used with reference to FIG. 11. FIG. 11 illustrates an example of target devices that cooperate with each other. For example, it is assumed that the image forming apparatus 10 and a projector as the device 12 (hereinafter it may be referred to as a projector 12) are used as the target devices. The image forming apparatus 10, the projector 12, and the terminal apparatus 16 are devices that exist in real space.

For example, the marker 50 such as a two-dimensional barcode is attached to the housing of the image forming apparatus 10, and a marker 66 such as a two-dimensional barcode is attached to the housing of the projector 12. The marker 66 is information obtained by coding the device identification information of the projectors 12. If the marker-based AR technology or the markerless AR technology is used, a user photographs, by using the camera 42 of the terminal apparatus 16 (for example, a smartphone), the image forming apparatus 10 and the projector 12 as the target devices that cooperate with each other. In the example illustrated in FIG. 11, the image forming apparatus 10 and the projector 12 are photographed together in a state where both the image forming apparatus 10 and the projector 12 are within the field of view of the camera 42. Accordingly, image data representing the markers 50 and 66 is generated. A device display screen 68 is displayed on the display of the UI unit 46 of the terminal apparatus 16. On the device display screen 68, a device image 70 related to the image forming apparatus 10 and a device image 72 related to the projector 12 are displayed. The device images 70 and 72 are images generated through, for example, photography by the camera 42 (having an original size at the photography or an increased or decreased size).

The image data generated through photography by the camera 42 is transmitted from the terminal apparatus 16 to the server 14. In the server 14, the controller 36 performs a decoding process on the image data to extract the device identification information of the image forming apparatus 10 and the device identification information of the projector 12, and accordingly the image forming apparatus 10 and the projector 12 are identified. Alternatively, appearance image data representing appearances of the image forming apparatus 10 and the projector 12 may be generated and transmitted from the terminal apparatus 16 to the server 14. In this case, in the server 14, the controller 36 specifies the device identification information of the image forming apparatus 10 and the device identification information of the projector 12 by referring to the appearance image correspondence information. Accordingly, the image forming apparatus 10 and the projector 12 are identified.

The specifying unit 38 of the server 14 specifies (identifies) one or more cooperative functions that use a function of the image forming apparatus 10 and a function of the projector 12 by referring to the cooperative function management information 34 (for example, the cooperative function management table illustrated in FIG. 7). This will be described in detail with reference to FIG. 7. It is assumed that, for example, the image forming apparatus 10 is an MFP (B) and the projector 12 is a projector (C). The specifying unit 38 specifies the cooperative functions associated with the combination of the MFP (B) and the projector (C) in the cooperative function management table illustrated in FIG. 7. Accordingly, the cooperative functions that are executed through cooperation between the MFP (B) and the projector (C) are specified. The information about the specified cooperative functions is transmitted from the server 14 to the terminal apparatus 16. Of course, the process for identifying a device and a cooperative function may be performed by the terminal apparatus 16.

On the device display screen 68, a prepared image related to the identified image forming apparatus 10 (for example, a schematic image such as an icon) or an image generated through photography by an external camera may be displayed as the device image 70, instead of the image generated through photography by the camera 42. Also, a prepared image related to the identified projector 12 or an image generated through photography by an external camera may be displayed as the device image 72. The data of the schematic image may be transmitted from the server 14 to the terminal apparatus 16, may be stored in advance in the terminal apparatus 16, or may be stored in another apparatus, as described above.

When a device is identified, information representing the name of the device may be transmitted from the server 14 to the terminal apparatus 16, and the name of the device may be displayed on the device display screen 68 in the terminal apparatus 16. In the example illustrated in FIG. 11, the name "MFP (B)" of the image forming apparatus 10 and the name "projector (C)" of the projector 12 are displayed.

If plural devices are photographed, the specifying unit 38 of the server 14 may specify the functions of the individual devices by referring to the device function management information 32. In the example illustrated in FIG. 11, the specifying unit 38 may specify the functions of the image forming apparatus 10 and the functions of the projector 12. The information about the specified functions may be transmitted from the server 14 to the terminal apparatus 16.

Figure 12:
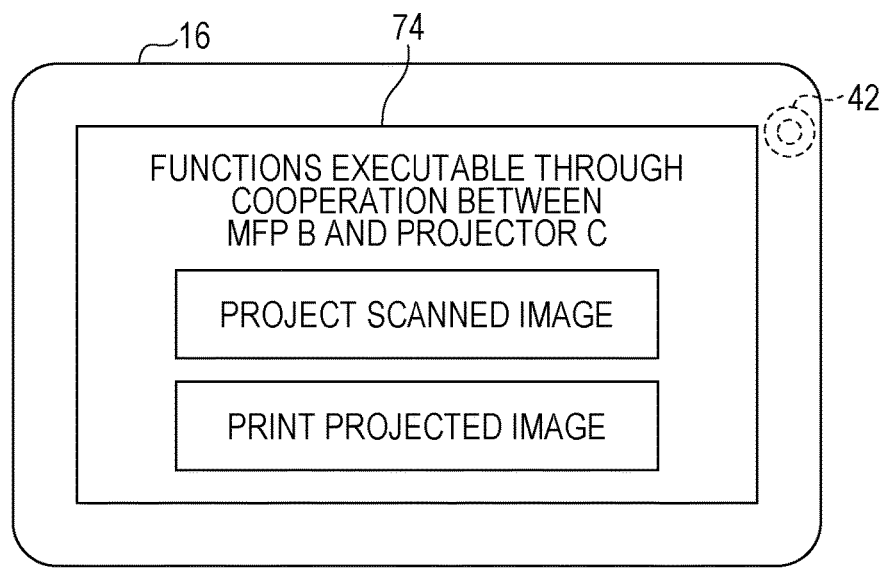
FIG. 12 is a diagram illustrating an example of a function display screen.

After the cooperative functions are specified, the controller 48 of the terminal apparatus 16 causes the UI unit 46 of the terminal apparatus 16 to display a function display screen 74 and causes information about the cooperative functions to be displayed on the function display screen 74, as illustrated in FIG. 12. As the information about the cooperative functions, for example, button images to be used for providing an instruction to execute the cooperative functions are displayed. The cooperation between the MFP (B) and the projector (C) enables execution of a cooperative function in which an image generated through scanning by the MFP (B) is projected by the projector (C) and a cooperative function in which an image projected by the projector (C) is printed by the MFP (B). The button images to be used for providing an instruction to execute these cooperative functions are displayed on the function display screen 74. For example, when the user designates a button image by using the terminal apparatus 16 and provides an instruction to execute a cooperative function, execution instruction information representing an instruction to execute the cooperative function is transmitted from the terminal apparatus 16 to the image forming apparatus 10 and the projector 12. In response to receipt of the execution instruction information, the image forming apparatus 10 and the projector 12 execute the cooperative function designated by the user.

The target devices that cooperate with each other may be designated by a user operation. For example, as a result of photographing, by using the camera 42, the image forming apparatus 10 and the projector 12, the device image 70 related to the image forming apparatus 10 and the device image 72 related to the projector 12 are displayed on the UI unit 46 of the terminal apparatus 16, as illustrated in FIG. 11. An image related to a device may be an image obtained through photography by the camera 42 or may be a prepared image related to an identified device (for example, a schematic image such as an icon). When the user designates the device images 70 and 72 on the device display screen 68, the image forming apparatus 10 and the projector 12 are designated as the target devices that cooperate with each other. For example, when the user designates the device image 70, the marker-based AR technology or the markerless AR technology is applied to the device image 70 and thereby the image forming apparatus 10 is specified (identified). Likewise, when the user designates the device image 72, the marker-based AR technology or the markerless AR technology is applied to the device image 72 and thereby the projector 12 is specified (identified). Accordingly, the cooperative functions that are executed by the image forming apparatus 10 and the projector 12 are specified, and the information about the cooperative functions is displayed on the UI unit 46 of the terminal apparatus 16.

For another example, the user may touch the device image 70 on the device display screen 68 by using, for example, his/her finger, and may move the finger to the device image 72, so as to designate the device images 70 and 72 and to designate the image forming apparatus 10 and the projector 12 as the target devices that cooperate with each other. The order in which the user touches the device images 70 and 72 or the movement direction of the finger may be opposite to the above-described example. Of course, a screen indication unit that is moved on the device display screen 68 other than the finger, such as a pen, may be used. The user may link the device images 70 and 72 to each other to designate the device images 70 and 72, and may thereby designate the image forming apparatus 10 and the projector 12 as the target devices that cooperate with each other. The user may superimpose the device images 70 and 72 on one another to designate the device images 70 and 72, and may thereby designate the image forming apparatus 10 and the projector 12 as the target devices that cooperate with each other. Furthermore, the target devices that cooperate with each other may be designated by drawing circles thereon, or the target devices may be designated by designating the device images related to the devices within a predetermined period. In the case of cancelling cooperation, the user may designate the target device to be cancelled on the device display screen 68 or may press a cooperation cancellation button. If an image of a device that is not the target device of cooperation is on the device display screen 68, the user may designate the device on the device display screen 68 to eliminate the device from the target devices that cooperate with each other. The device to be cancelled may be designated by performing a predetermined operation, such as drawing a cross mark thereon.

The target devices that cooperate with each other may be separately photographed. For example, the target devices that cooperate with each other are identified by performing photography by the camera 42 plural times. If the photography by the camera 42 is performed plural times, the device identification information of the device identified in each photographing operation is stored in the memory of the server 14 or the terminal apparatus 16. For example, the image forming apparatus 10 is photographed in a state where the image forming apparatus 10 is within the field of view of the camera 42, and then the projector 12 is photographed in a state where the projector 12 is within the field of view of the camera 42. Accordingly, image data representing the image forming apparatus 10 and image data representing the projector 12 are generated. By applying the marker-based AR technology or the markerless AR technology to each piece of image data, the image forming apparatus 10 and the projector 12 are specified (identified), and the cooperative functions that use the functions of the image forming apparatus 10 and the projector 12 are specified (identified). For example, the image forming apparatus 10 and the projector 12 as the target devices that cooperate with each other are not always located close to each other within the field of view of the camera 42. The angle of view of the camera 42 may be changed or the field of view may be increased or decreased. If these operations are insufficient, photography may be performed plural times to identify the target devices that cooperate with each other.

For another example, a target device that cooperates may be set in advance as a basic cooperative device. For example, it is assumed that the image forming apparatus 10 is set in advance as a basic cooperative device. The device identification information of the basic cooperative device may be stored in the memory of the server 14 or the terminal apparatus 16 in advance. Alternatively, a user may designate a basic cooperative device by using the terminal apparatus 16. If a basic cooperative device is set, the user photographs a target device other than the basic cooperative device by using the camera 42 of the terminal apparatus 16. Accordingly, the target devices that cooperate with each other are specified (identified), and one or more cooperative functions that use functions of the basic cooperative device and the photographed device are specified (identified).

In the example illustrated in FIGS. 11 and 12, each cooperative function is a function that uses hardware devices. Alternatively, the cooperative function may be a function that uses a function implemented by software (application). For example, function images (for example, images of icons or the like) related to functions implemented by software may be displayed on the UI unit 46 of the terminal apparatus 16 instead of device images, and plural function images among the function images may be designated by a user so that a cooperative function that uses plural functions related to the plural function images may be specified (identified). For example, a cooperative function may be specified by designating function images related to functions displayed on a home screen of a smartphone or a desktop screen of a PC. Of course, if a device image related to a hardware device and a function image related to a function implemented by software are displayed on the UI unit 46 of the terminal apparatus 16 and if the device image and the function image are designated by the user, a cooperative function that uses the device related to the device image and the function related to the function image may be identified.

In the above-described example, the marker-based AR technology or the markerless AR technology is used, but the position information AR technology may be used. For example, the terminal apparatus 16 has a GPS function, obtains terminal position information representing the position of the terminal apparatus 16, and transmits the terminal position information to the server 14. The controller 36 of the server 14 refers to the position correspondence information representing the correspondence between device position information representing the positions of devices and device identification information, and specifies the devices located within a predetermined range relative to the position of the terminal apparatus 16 as candidate cooperative devices. For example, it is assumed that an MFP, PC, printer, and scanner are located within the predetermined range relative to the position of the terminal apparatus 16. In this case, the MFP, PC, printer, and scanner are specified as candidate cooperative devices. The pieces of device identification information of the individual candidate cooperative devices are transmitted from the server 14 to the terminal apparatus 16 and are displayed on the UI unit 46 of the terminal apparatus 16. As the pieces of device identification information, images of the candidate cooperative devices may be displayed or character strings such as device IDs may be displayed. The user designates target devices that cooperate with each other from among the candidate cooperative devices displayed on the UI unit 46. The pieces of device identification information of the target devices designated by the user are transmitted from the terminal apparatus 16 to the server 14. In the server 14, one or more cooperative functions are specified based on the pieces of device identification information of the target devices. The information about the one or more cooperative functions is displayed on the UI unit 46 of the terminal apparatus 16. The process of specifying candidate cooperative devices and the process of specifying a cooperative function may be performed by the terminal apparatus 16.

If a photographed device is not identified even if the AR technologies or the like are applied, the device image representing the photographed device is not necessarily displayed on the device display screen. Accordingly, the visibility of an identified device may increase. For example, if there are an identified device and an unidentified device and if both the devices are photographed by the camera 42, the device image representing the unidentified device is not displayed. Accordingly, the device image representing the identified device is displayed while being distinguished from the device image representing the unidentified device, and thus the visibility of the identified device may increase. Alternatively, the device image representing the identified device may be displayed in a highlighted manner. For example, the device image representing the identified device may be displayed in a specific color, may be displayed while highlighting the edge of the device image, may be displayed while enlarging the device image, may be displayed three-dimensionally, or may be displayed while blinking the device image. Accordingly, the visibility of the identified device may increase.

Figure 13:
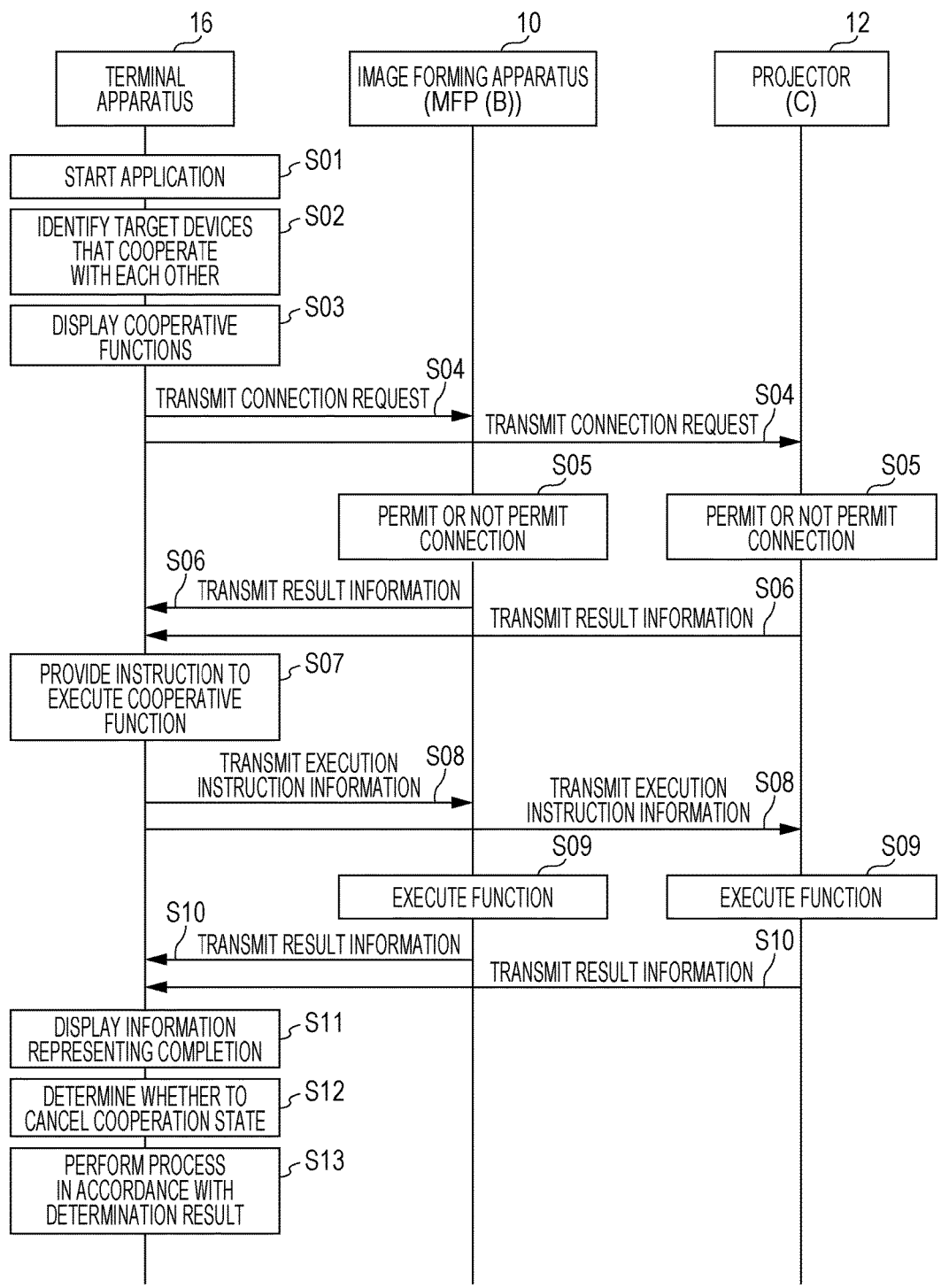
FIG. 13 is a sequence diagram illustrating a connection process.

Hereinafter, a description will be given of a process for executing a function of a device. As an example, a description will be given of a process for executing a cooperative function. In this case, a connection request is transmitted from the terminal apparatus 16 to target devices that cooperate with each other, and connections between the terminal apparatus 16 and the target devices are established. Hereinafter, the connection process will be described with reference to FIG. 13. FIG. 13 is a sequence diagram illustrating the process.

First, a user provides an instruction to start an application (program) for executing a device function by using the terminal apparatus 16. In response to the instruction, the controller 48 of the terminal apparatus 16 starts the application (S01). The application may be stored in the memory 44 of the terminal apparatus 16 in advance or may be downloaded from the server 14 or the like.

Subsequently, the target devices that cooperate with each other are identified by applying the marker-based AR technology, the markerless AR technology, or the position information AR technology (S02). Of course, the target devices may be identified by using a technology other than the AR technologies. In the case of applying the marker-based AR technology or the markerless AR technology, the user photographs the target devices by using the camera 42 of the terminal apparatus 16. For example, in the case of using the image forming apparatus 10 (MFP (B)) and the projector 12 (projector (C)) as the target devices, the user photographs the image forming apparatus 10 and the projector 12 by using the camera 42. Accordingly, the pieces of device identification information of the image forming apparatus 10 and the projector 12 are obtained, and the image forming apparatus 10 and the projector 12 are identified as the target devices. In the case of applying the position information AR technology, the pieces of position information of the image forming apparatus 10 and the projector 12 are obtained, the pieces of device identification information of the image forming apparatus 10 and the projector 12 are specified on the basis of the pieces of position information, and the image forming apparatus 10 and the projector 12 are identified.

For example, if an instruction to display a cooperative function is provided by the user, a cooperative function that uses functions of the plural identified devices is identified. The information about the identified cooperative function is displayed on the UI unit 46 of the terminal apparatus 16 (S03). The process of identifying the cooperative function may be performed by the server 14 or the terminal apparatus 16.

Subsequently, after the user designates, by using the terminal apparatus 16, the target cooperative function to be executed, the terminal apparatus 16 transmits information representing a connection request to the target devices (for example, the image forming apparatus 10 and the projector 12) that execute the cooperative function (S04). For example, if the pieces of address information representing the addresses of the target devices that cooperate with each other are stored in the server 14, the terminal apparatus 16 obtains the pieces of address information from the server 14. If the pieces of address information are included in the pieces of device identification information, the terminal apparatus 16 may obtain the pieces of address information from the pieces of device identification information of the target devices. Alternatively, the pieces of address information of the target devices may be stored in the terminal apparatus 16. Of course, the terminal apparatus 16 may obtain the pieces of address information of the target devices by using another method. By using the pieces of address information of the target devices (for example, the image forming apparatus 10 and the projector 12), the terminal apparatus 16 transmits information representing a connection request to the target devices (for example, the image forming apparatus 10 and the projector 12).

The image forming apparatus 10 and the projector 12 that have received the information representing a connection request permit or do not permit the connection to the terminal apparatus 16 (S05). For example, if the image forming apparatus 10 and the projector 12 are devices that are not permitted to make a connection or if the number of devices to which a connection is requested exceeds an upper limit, the connection is not permitted. If the connection from the terminal apparatus 16 is permitted, an operation of changing setting information unique to the image forming apparatus 10 and the projector 12 may be prohibited so that the setting information is not changed by the terminal apparatus 16. For example, change of color parameters or setting time to shift to a power saving mode of the image forming apparatus 10 may be prohibited. Accordingly, the security for the target devices that cooperate with each other may increase. Alternatively, in the case of causing devices to cooperate with each other, change of setting information may be limited compared to the case of using each device alone without cooperation with another device. For example, change of fewer setting items may be permitted than in the case of using the device alone. Alternatively, viewing of personal information of other users, such as an operation history, may be prohibited. Accordingly, the security for personal information of users may increase.

Result information representing permission or non-permission of connection is transmitted from the image forming apparatus 10 and the projector 12 to the terminal apparatus 16 (S06). If the connection to the image forming apparatus 10 and the projector 12 is permitted, communication is established between the terminal apparatus 16 and each of the image forming apparatus 10 and the projector 12.

Subsequently, the user provides an instruction to execute the cooperative function by using the terminal apparatus 16 (S07). In response to the instruction, execution instruction information representing the instruction to execute the cooperative function is transmitted from the terminal apparatus 16 to the image forming apparatus 10 and the projector 12 (S08). The execution instruction information transmitted to the image forming apparatus 10 includes information representing the process to be executed in the image forming apparatus 10 (for example, job information), and the execution instruction information transmitted to the projector 12 includes information representing the process to be executed in the projector 12 (for example, job information).

In response to the execution instruction information, the image forming apparatus 10 and the projector 12 execute the individual functions in accordance with the execution instruction information (S09). For example, if the cooperative function includes a process of transmitting/receiving data between the image forming apparatus 10 and the projector 12, as in the function of transferring scan data from the image forming apparatus 10 (MFP (B)) to the projector 12 (projector (C)) and projecting the data by the projector 12, communication is established between the image forming apparatus 10 and the projector 12. In this case, for example, the execution instruction information transmitted to the image forming apparatus 10 includes the address information of the projector 12, and the execution instruction information transmitted to the projector 12 includes the address information of the image forming apparatus 10. The communication is established between the image forming apparatus 10 and the projector 12 by using these pieces of address information.

After the execution of the cooperative function is finished, the information indicating that the execution of the cooperative function is completed is transmitted from the image forming apparatus 10 and the projector 12 to the terminal apparatus 16 (S10). The information indicating that the execution of the cooperative function is completed is displayed on the UI unit 46 of the terminal apparatus 16 (S11). If the information indicating that the execution of the cooperative function is completed is not displayed even when a predetermined period elapses from the time point at which the execution instruction is provided, the controller 48 of the terminal apparatus 16 may cause the UI unit 46 to display information representing an error, and may transmit execution instruction information or information representing a connection request to the image forming apparatus 10 and the projector 12 again.

Subsequently, the user determines whether or not to cancel the cooperation state of the image forming apparatus 10 and the projector 12 (S12), and a process is performed in accordance with the determination result (S13). In the case of cancelling the cooperation state, the user provides a cancellation instruction by using the terminal apparatus 16. Accordingly, the communication between the terminal apparatus 16 and each of the image forming apparatus 10 and the projector 12 is stopped. Also, the communication between the image forming apparatus 10 and the projector 12 is stopped. In the case of not cancelling the cooperation state, an execution instruction may be continuously provided.

Furthermore, the number of target devices that cooperate with each other may be increased. For example, the device identification information of the third device may be obtained, and a cooperative function to be executed through cooperation among the three devices including the image forming apparatus 10 and the projector 12 may be specified. The information indicating that the image forming apparatus 10 and the projector 12 have already been identified as the target devices that cooperate with each other is stored in the server 14 or the terminal apparatus 16.

The pieces of device identification information representing the target devices that cooperate with each other and the cooperative function information representing an executed cooperative function may be stored in the terminal apparatus 16 or the server 14. For example, the user account information (user identification information) of the user who uses the terminal apparatus 16 may be obtained, and history information representing the correspondence among the user account information, the pieces of device identification information representing the target devices that cooperate with each other, and the cooperative function information representing the executed cooperative function may be created and stored in the terminal apparatus 16 or the server 14. The history information may be created by the terminal apparatus 16 or the server 14. With reference to the history information, the cooperative function that has been executed and the devices used for the cooperative function are specified.

The target devices that cooperate with each other (for example, the image forming apparatus 10 and the projector 12) may store, as history information, the user account information of the user who has requested connection and the terminal identification information representing the terminal apparatus 16 that has requested connection. With reference to the history information, the user who has used the devices is specified. The user may be specified by using the history information in the case of, for example, specifying the user who was using a device when the device was broken, or performing a charging process for consumables or the like. The history information may be stored in the server 14 or the terminal apparatus 16 or may be stored in another apparatus.

The user account information is stored, for example, in the memory 44 of the terminal apparatus 16 in advance. The controller 48 of the terminal apparatus 16 functions as an example of a user identifying unit, reads the user account information of the user from the memory 44, and identifies the user who uses the terminal apparatus 16. If the pieces of user account information of plural users are stored in the memory 44, the user designates his/her user account information by using the terminal apparatus 16. Accordingly, the user account information of the user is read and the user is identified. Alternatively, the controller 48 of the terminal apparatus 16 may identify the user by reading the user account information of the user who is logged in to the terminal apparatus 16. Alternatively, if only one piece of user account information is stored in the same terminal apparatus 16, the controller 48 of the terminal apparatus 16 may identify the user by reading the one piece of user account information. If a user account is not set and if user account information is not created, initial setting is performed and thereby user account information is created.

Usage histories of cooperative functions may be managed for individual users, and the information representing the cooperative functions previously used by the user represented by read user account information may be displayed on the UI unit 46 of the terminal apparatus 16. The information representing the usage history may be stored in the terminal apparatus 16 or the server 14. Also, the information representing a cooperative function that is used at a predetermined frequency or more may be displayed. With such a shortcut function being provided, a user operation regarding a cooperative function may be simplified.

In a case where a single-device function is executed, information representing an instruction to execute the single-device function is transmitted from the terminal apparatus 16 to the device that executes the single-device function. The device executes the single-device function in accordance with the instruction.

In the above-described example, a cooperative function is executable by plural devices. However, a cooperative function is not always executable according to a combination of devices. Also, a cooperative function is not always executable according to a combination of plural functions (for example, a combination of functions implemented by software or a combination of a function implemented by software and a function of a hardware device). This will be described in detail below.

Figure 14A:
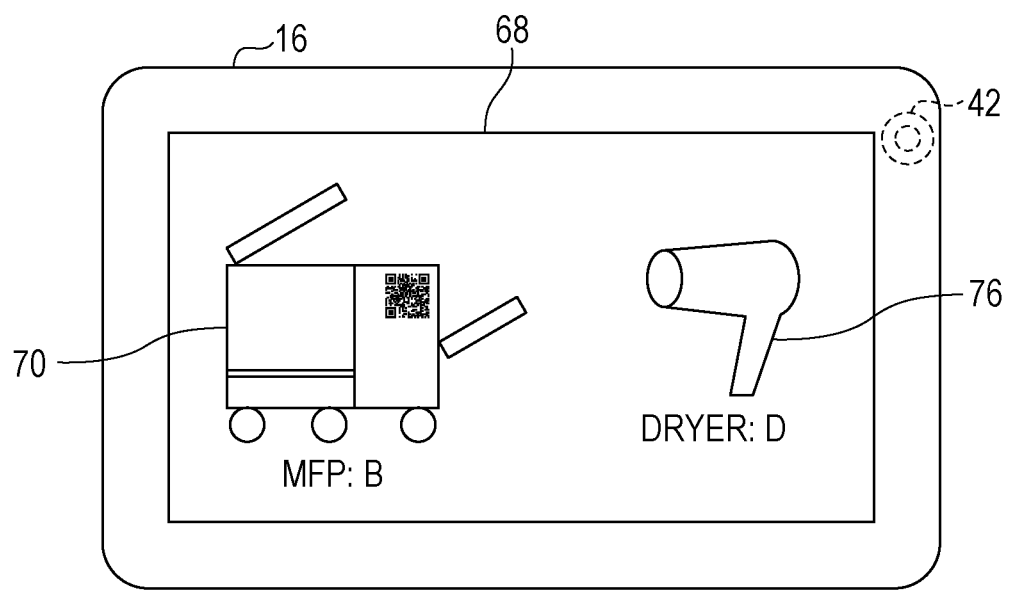
FIGS. 14A and 14B are diagrams illustrating an example of device display screens.
Figure 14B:
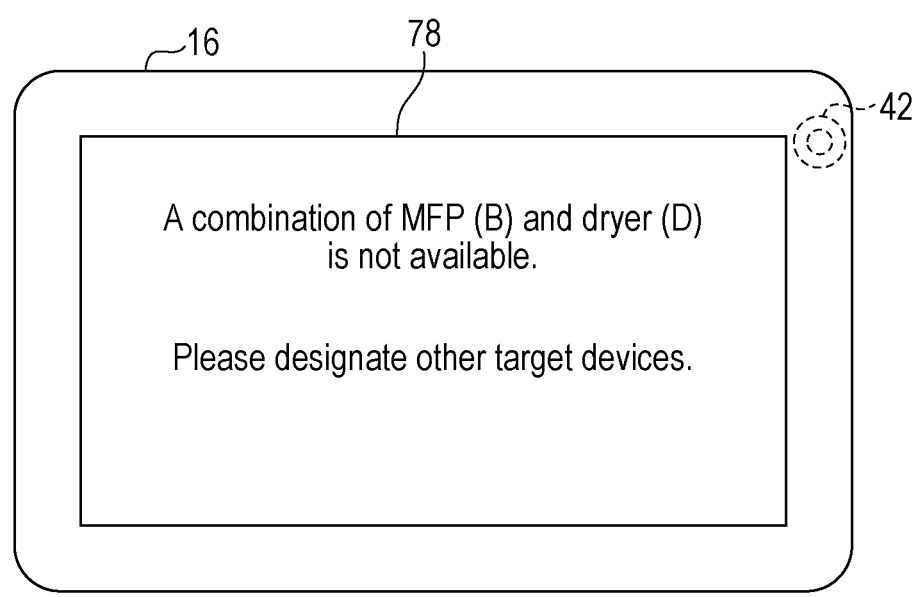

FIG. 14A illustrates an example of a combination of devices that is not capable of executing a cooperative function. For example, it is assumed that the MFP (B) and a dryer (D) are identified as devices. As illustrated in FIG. 14A, the device display screen 68 is displayed on the UI unit 46 of the terminal apparatus 16, and device images 70 and 76 related to the identified devices (MFP (B) and dryer (D)) are displayed on the device display screen 68. If there is no cooperative function that is executable by the MFP (B) and the dryer (D) and if the MFP (B) and the dryer (D) are designated as target devices that cooperate with each other, information about a cooperative function is not displayed, and a message screen 78 is displayed on the UI 46 of the terminal apparatus 16 as illustrated in FIG. 14B. The message screen 78 displays a message indicating that no cooperative function is executable by the MFP (B) and the dryer (D).

The above-described process will be described in more detail. When the MFP (B) and the dryer (D) are identified and designated as target devices that cooperate with each other, the specifying unit 38 of the server 14 specifies (identifies) a cooperative function that uses the MFP (B) and the dryer (D) by referring to the cooperative function management information 34 (for example, the cooperative function management table illustrated in FIG. 7) as described above. If a cooperative function that uses the MFP (B) and the dryer (D) is registered in the cooperative function management table, the specifying unit 38 specifies the cooperative function. On the other hand, if a cooperative function that uses the MFP (B) and the dryer (D) is not registered in the cooperative function management table, the specifying unit 38 determines that there is no cooperative function that uses the MFP (B) and the dryer (D). In this case, the controller 36 of the server 14 outputs a message indicating that a combination of the MFP (B) and the dryer (D) is not capable of executing a cooperative function. This message is displayed on the UI unit 46 of the terminal apparatus 16, as illustrated in FIG. 14B.

Even if there is no available cooperative function as in the above-described case, it may become possible to use a cooperative function in accordance with operation statuses of devices, environments (surroundings) where the devices are installed, or change (update) of functions of the devices. In the above-described example, if condensation occurs in the environment where the MFP (B) is installed, it is possible to remove or prevent condensation by using the dryer (D). In this case, a cooperative function that uses the MFP (B) and the dryer (D) is available, and thus the information representing the cooperative function is displayed on the UI unit 46 of the terminal apparatus 16. For example, the controller 36 of the server 14 monitors the operation statuses of individual devices, the environments (surroundings) where the devices are installed, the update statuses of the functions of the individual devices, and so forth, and determines the availability of a cooperative function on the basis of the monitoring result. In the case of a combination of the MFP (B) and the dryer (D), if the surroundings of the MFP (B) satisfy a specific condition (for example, if condensation occurs in the surroundings of the MFP (B)), the controller 36 determines that a cooperative function is available and specifies (identifies) a cooperative function that uses the dryer (D). The same applies to the operation statuses of the devices, that is, if a group of devices that are identified or designated is in a specific operation status, the controller 36 determines that a cooperative function that uses the group of devices is available. The same also applies to a case where functions of devices are updated and a cooperative function becomes available by updated functions.

Also, there is a case where a cooperative function is not executable by plural functions implemented by plural software units, and there is a case where a cooperative function is not executable by a function implemented by a software unit and a hardware device.

Guiding Process

In the exemplary embodiment, for example, when an image related to a device is designated, a guide indicating a hardware device or a function implemented by software that is capable of executing a cooperative function together with the device is presented. The same applies to a cooperative function that uses software. For example, when an image related to a function implemented by software is designated, a guide indicating a hardware device or a function implemented by software that is capable of executing a cooperative function together with the function is presented. Hereinafter, Examples of a guiding process according to the exemplary embodiment will be described in detail.

Example 1

Figure 15:
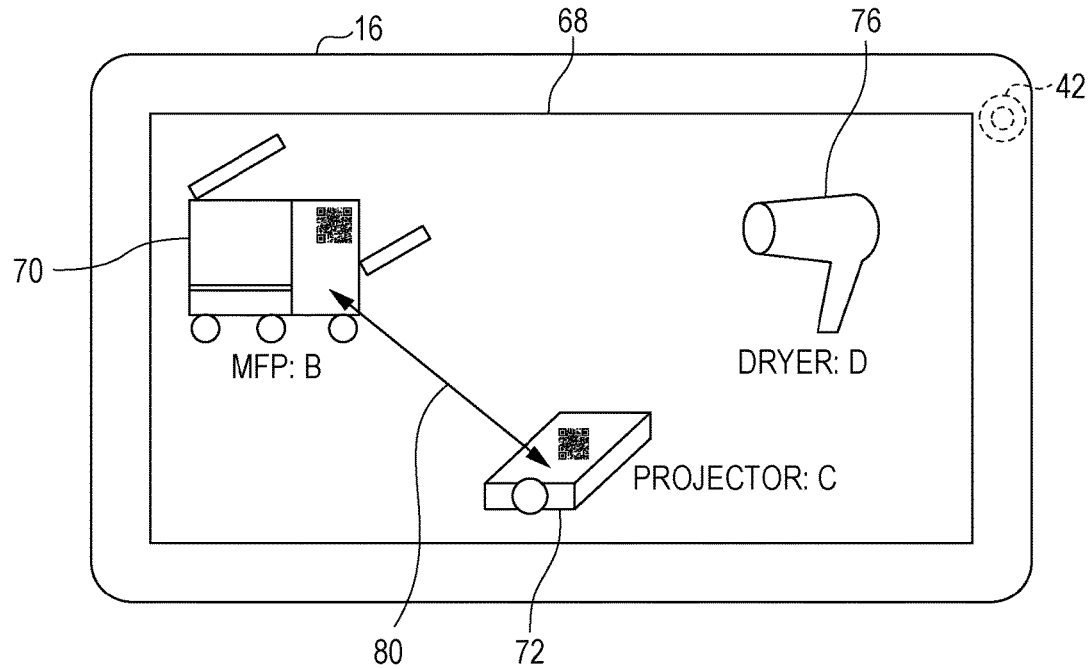
FIG. 15 is a diagram illustrating an example of a device display screen according to Example 1.

A guiding process according to Example 1 will be described with reference to FIG. 15. FIG. 15 illustrates an example of a device display screen according to Example 1. For example, it is assumed that the MFP (B), the projector (C), and the dryer (D) are identified as devices. The device display screen 68 is displayed on the UI unit 46 of the terminal apparatus 16, and the device images 70, 72, and 76 related to the identified devices (MFP (B), projector (C), and dryer (D)) are displayed on the device display screen 68.

In this case, for example, it is assumed that the MFP (B) is selected by a user and the device image 70 related to the MFP (B) is designated by the user. The MFP (B) corresponds to a first device, and the device image 70 related to the MFP (B) corresponds to a first image related to the first device. In response to the user's designation of the MFP (B) as the first device, the specifying unit 38 of the server 14 specifies a second device that is capable of executing a cooperative function together with the MFP (B) as the first device, by referring to the cooperative function management information 34 (for example, the cooperative function management table illustrated in FIG. 7). For example, it is assumed that a combination of the MFP (B) and the projector (C) is capable of executing a cooperative function and that a combination of the MFP (B) and the dryer (D) is not capable of executing a cooperative function. That is, it is assumed that a cooperative function that uses the MFP (B) and the projector (C) is registered in the cooperative function management table and that a cooperative function that uses the MFP (B) and the dryer (D) is not registered in the cooperative function management table. In this case, the projector (C) is specified as a second device, and the controller 36 of the server 14 performs control to present a guide indicating the projector (C) as the second device. Specifically, the device identification information representing the projector (C) is transmitted from the server 14 to the terminal apparatus 16 under control of the controller 36. The controller 48 of the terminal apparatus 16 presents the guide indicating the projector (C) as the second device. For example, as illustrated in FIG. 15, the controller 48 of the terminal apparatus 16 causes an arrow 80, which indicates the projector (C) as a cooperation partner device, to be displayed on the device display screen 68. The arrow 80 is an image linking the device image 70, which is the first image related to the MFP (B) as the first device, and the device image 72, which is the second image related to the projector (C) as the second device, to each other. Of course, the controller 48 may present the guide indicating the projector (C) as the second device by using a method other than an arrow. For example, the controller 48 may present the guide indicating the second device by outputting a sound, may cause a mark superimposed on the second image (for example, the device image 72) related to the second device to be displayed on the device display screen 68, may cause the second image related to the second device to be displayed on the device display screen 68 such that the second image is distinguishable from another image, or may cause a character string representing a cooperation partner to be displayed on the device display screen 68.

In the above-described case where the MFP (B) as the first device is designated by the user, the projector (C) as the second device that is capable of executing a cooperative function together with the MFP (B) is recommended as a candidate cooperation partner device. Accordingly, user convenience of designating a device that is necessary for a cooperative function may be increased compared to a case where such a candidate is not recommended.

A guiding process similar to that described above is performed also if a function image related to a first function implemented by software (an image corresponding to a first image) is designated by the user. That is, if a function image as a first image is designated by the user, a guide indicating a second function that is capable of executing a cooperative function together with the first function related to the function image is presented. For example, a guide indicating a second image related to the second function may be presented or a guide indicating the second function may be presented by using a sound or character string. The second function may be a function implemented by software or a function of a hardware device. Of course, if a device image related to a first device is designated by the user, a guide indicating a second function that is capable of executing a cooperative function together with the first device and that is implemented by software may be presented.

Since the dryer (D) is a device that is not capable of executing a cooperative function together with the MFP (B), a guide indicating the dryer (D) as a cooperation partner is not presented.

A guide indicating the dryer (D) as a second device may be presented in accordance with the environment (surroundings) where the MFP (B) as a first device is installed, the operation status of the MFP (B) (for example, an amount of toner, an amount of paper, whether or not the MFP is being used, or a process end time), change (update) of the function of the MFP (B), change (update) of the function of the dryer (D), and so forth. For example, if condensation occurs in the surroundings of the MFP (B) as the first device, the specifying unit 38 of the server 14 specifies the dryer (D) as a second device that is necessary to remove the condensation. In this case, a guide indicating the dryer (D) as a cooperation partner is presented as in the above-described case of the projector (C). For example, an arrow linking the device image 70 as the first image related to the MFP (B) as the first device and the device image 76 as the second image related to the dryer (D) as the second device to each other is displayed, or a guide indicating the dryer (D) is presented by using a sound.

A device or object related to an image displayed on the device display screen 68 is not necessarily identified. For example, there may be a case where the dryer (D) is not identified by the specifying unit 38 of the server 14. The device or object that is not identified is excluded from a candidate cooperation partner (second device). An image related to the device or object that is not identified may or may not be displayed on the device display screen 68.

Example 2

Figure 16:
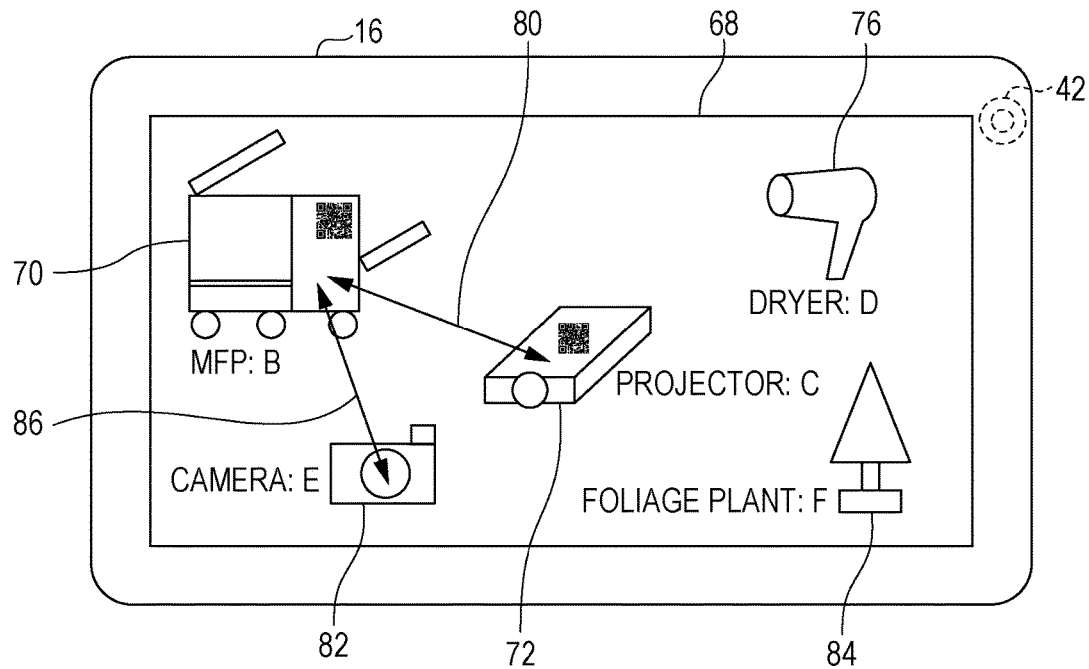
FIG. 16 is a diagram illustrating an example of a device display screen according to Example 2.

A guiding process according to Example 2 will be described, with reference to FIG. 16. FIG. 16 illustrates an example of a device display screen according to Example 2. In Example 2, plural devices correspond to second devices (cooperation partner devices). For example, it is assumed that the MFP (B), the projector (C), the dryer (D), and a camera (E) are identified as devices and that a foliage plant (F) is identified as a foliage plant. Of course, an object that is not a device is not necessarily identified.

The device display screen 68 is displayed on the UI unit 46 of the terminal apparatus 16, and device images 70, 72, 76, and 82 related to the identified devices (MFP (B), projector (C), dryer (D), and camera (E)) and an image 84 related to the foliage plant (F) are displayed on the device display screen 68.

In this case, for example, it is assumed that the MFP (B) is selected as a first device by a user and the device image 70 related to the MFP (B) is designated as a first image by the user. Also it is assumed that the projector (C) and the camera (E) are specified as second devices that are capable of executing a cooperative function together with the MFP (B) as the first device. In this case, guides indicating the projector (C) and the camera (E) as the second devices are presented. For example, the guides are simultaneously presented. In the example illustrated in FIG. 16, as in Example 1, the arrow 80 linking the device image 70 related to the MFP (B) and the device image 72 related to the projector (C) to each other is displayed as a guide. Also, an arrow 86 linking the device image 70 related to the MFP (B) and the device image 82 related to the camera (E) to each other is displayed as a guide.

An order of priority may be associated with cooperative functions. The information representing the order of priority is associated with each cooperative function in the cooperative function management information 34 (for example, the cooperative function management table illustrated in FIG. 7). In the case of presenting guides indicating plural second devices, information representing the order of priority of each cooperative function is transmitted from the server 14 to the terminal apparatus 16, and the order of priority is displayed on the device display screen 68. For example, if a first cooperative function that uses the MFP (B) and the projector (C) has higher priority than a second cooperative function that uses the MFP (B) and the camera (E), the controller 48 of the terminal apparatus 16 causes information indicating that the projector (C) used in the first cooperative function has higher priority than the camera (E) used in the second cooperative function to be displayed on the device display screen 68. The controller 48 may cause a character string representing the order of priority to be displayed on the device display screen 68, may cause the arrows 80 and 86 to be displayed in different colors on the device display screen 68, may cause the device images 72 and 82 to be displayed in different display forms on the device display screen 68, or may cause the arrow 80 for the device image 72 with higher priority to be displayed on the device display screen 68 and cause the arrow 86 for the device image 82 with lower priority not to be displayed on the device display screen 68.

Alternatively, the controller 48 of the terminal apparatus 16 may display a character string representing the second devices in a specific area of the device display screen 68 instead of displaying the arrows. For example, the character string may be displayed in an area where no device images are displayed. Accordingly, a situation is prevented from occurring where an arrow makes it difficult to see information displayed on the screen.

In the above-described case where the MFP (B) as the first device is designated by the user, the projector (C) and the camera (E) as the second devices that are capable of executing a cooperative function together with the MFP (B) are recommended as candidate cooperation partner devices.

If no candidate cooperation partner device (second device) is displayed on the device display screen 68, position information representing a position where a second device is installed or information representing a guide indicating the position where the second device is installed may be displayed on the UI unit 46 of the terminal apparatus 16. For example, the controller 36 of the server 14 obtains position information of the second device by using a GPS function or the like, and creates information representing a guide indicating the position of the second device relative to the position of the terminal apparatus 16 on the basis of the obtained position information and the position information of the terminal apparatus 16. The information representing the guide may be transmitted from the server 14 to the terminal apparatus 16 and may be displayed on the UI unit 46 of the terminal apparatus 16.

As in Example 1, the process according to Example 2 may be applied to a case where a function image related to a function is used. For example, if a function image as a first image is designated by the user, guides indicating plural second functions that are capable of executing a cooperative function together with the first function related to the function image may be presented. Of course, if a device image related to a first device is designated by the user, guides indicating plural functions that are capable of executing a cooperative function together with the first device may be presented.

Example 3

A guiding process according to Example 3 will be described with reference to FIGS. 17 to 20. FIGS. 17 to 20 each illustrate an example of a device display screen according to Example 3. In Example 3, a user designates a first device and then designates a second device, and control is performed to present a guide indicating a third device that is capable of executing a cooperative function together with the first and second devices. A device recommended as a third device may be changed in accordance with an order in which the first and second devices are designated.

Figure 17:
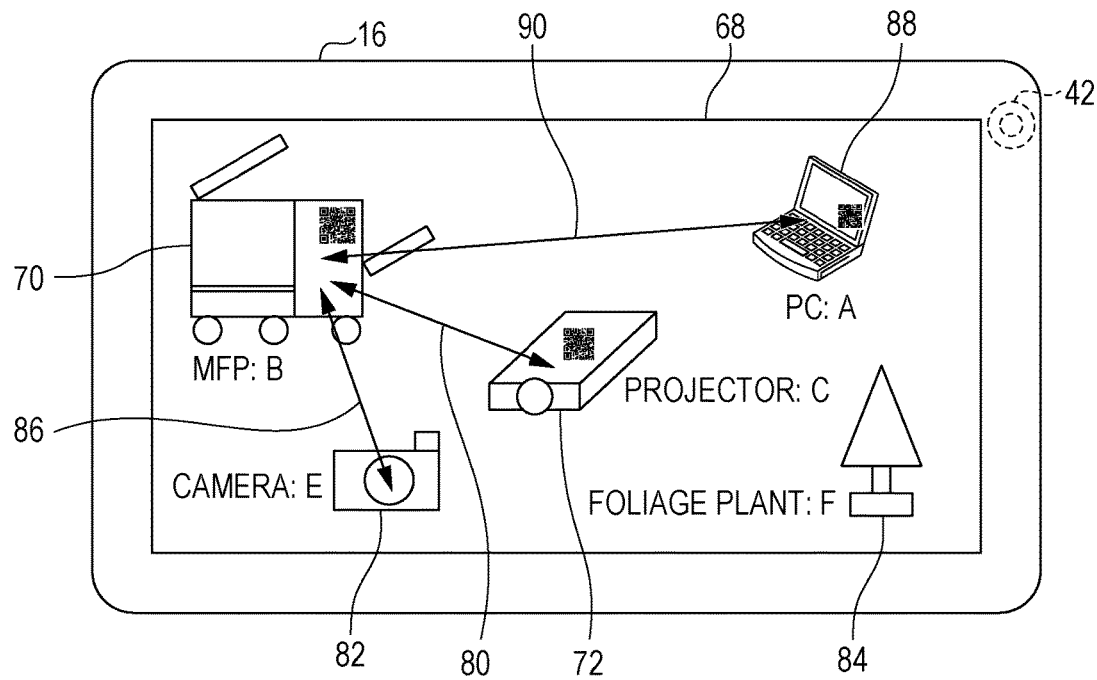
FIG. 17 is a diagram illustrating an example of a device display screen according to Example 3.

For example, it is assumed that the PC (A), the MFP (B), the projector (C), and the camera (E) are identified as devices and that device images 70, 72, 82, and 88 related to the identified devices (PC (A), MFP (B), projector (C), and camera (E)) and the image 84 are displayed on the device display screen 68 as illustrated in FIG. 17.

In this case, for example, if the device image 70 related to the MFP (B) is designated by the user, the MFP (B) is identified as a first device by the specifying unit 38 of the server 14, and the PC (A), the projector (C), and the camera (E) that are capable of executing a cooperative function together with the MFP (B) are identified as second devices (candidate cooperation partner devices). As illustrated in FIG. 17, for example, arrows 80, 86, and 90 are displayed as guides indicating the second devices. The arrow 90 is an image linking the device image 70 related to the MFP (B) and the device image 88 related to the PC (A) to each other.

Figure 18:
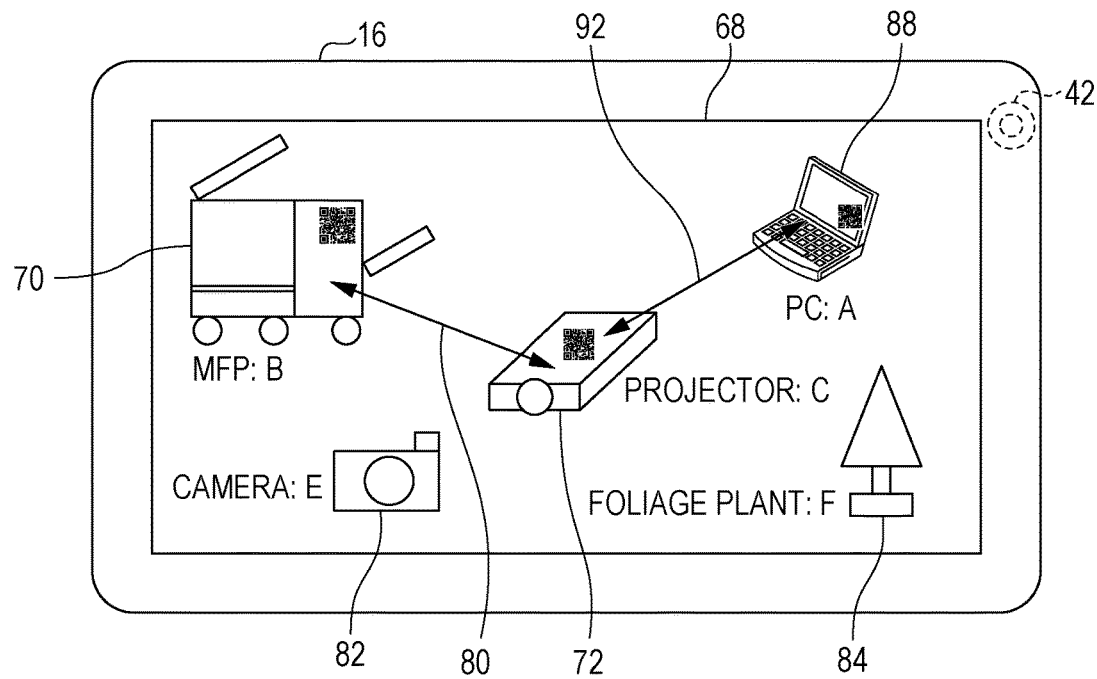
FIG. 18 is a diagram illustrating an example of a device display screen according to Example 3.
Figure 19:
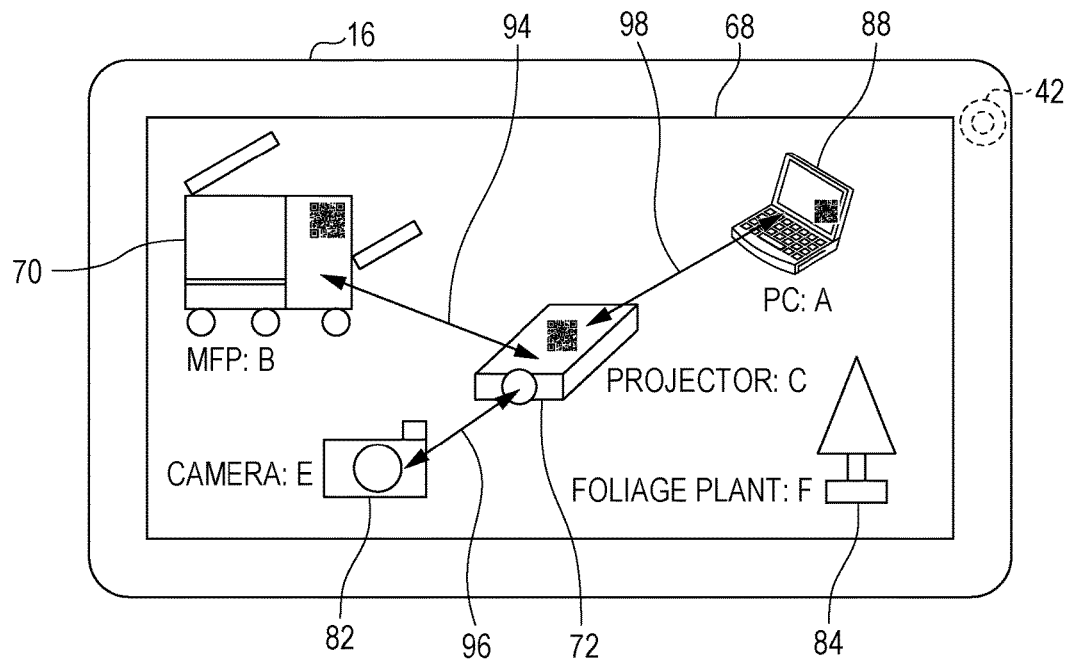
FIG. 19 is a diagram illustrating an example of a device display screen according to Example 3.

Subsequently, it is assumed that the projector (C) is selected as a cooperation partner device from the group of second devices by the user and the device image 72 related to the projector (C) is designated by the user. In this case, the specifying unit 38 of the server 14 specifies a third device that is capable of executing a cooperative function together with the MFP (B) as the first device and the projector (C) as the second device by referring to the cooperative function management information 34. In the cooperative function management table illustrated in FIG. 7, cooperative functions that are executable through cooperation between two devices are registered. However, cooperative functions that are executable through cooperation among three or more devices may of course be registered. For example, it is assumed that the PC (A) is specified as the third device. In this case, a guide indicating the PC (A) as the third device is presented as illustrated in FIG. 18. For example, an arrow 92 linking the device image 72 related to the projector (C) as the second device and the device image 88 related to the PC (A) as the third device to each other is displayed as a guide.

For example, the user may designate the device image 72 related to the projector (C), perform an operation of linking the device image 70 related to the MFP (B) and the device image 72 related to the projector (C) to each other, superimpose the device image 70 on the device image 72, or put an indicator on the device image 70 and then move the indicator to the device image 72, so as to designate the projector (C) that is used as the second device.

An order in which the individual devices (individual device images) are designated corresponds to an order in which the functions of the devices are used or an order in which data is moved between the devices. An operation of designating the devices (for example, an operation of linking images or superimposing an image on another image) serves as an operation of designating an order in which the functions are used or an order in which data is moved. In the example illustrated in FIG. 18, the MFP (B) as the first device is used first and the projector (C) as the second device is used second. A guide indicating a third device that is capable of executing a cooperative function together with the first and second devices and that is used third in the cooperative function is presented. That is, a guide indicating a third device that is used third in the cooperative function in which the MFP (B) is used first and the projector (C) is used second is presented. In the example illustrated in FIG. 18, the PC (A) is the third device. In Example 3, cooperative functions that are executable through cooperation between plural devices are registered in the cooperative function management information 34, and also the usage order of the devices is registered. The specifying unit 38 of the server 14 specifies a third device by referring to the cooperative function management information 34.

FIG. 13 illustrates another example. As in FIG. 17, the device images 70, 72, 82, and 88 and the image 84 are displayed on the device display screen 68.

In this case, for example, if the device image 72 related to the projector (C) is designated by the user, the projector (C)

is identified as a first device, and the PC (A), the MFP (B), and the camera (E) that are capable of executing a cooperative function together with the projector (C) are identified as second devices (candidate cooperation partner devices) by the specifying unit 38 of the server 14. As illustrated in FIG. 13, for example, arrows 94, 96, and 98 are displayed as guides indicating the second devices. The arrow 94 is an image linking the device image 72 related to the projector (C) as the first device and the device image 70 related to the MFP (B) as the second device to each other. The arrow 96 is an image linking the device image 72 and the device image 82 related to the camera (E) as the second device to each other. The arrow 98 is an image linking the device image 72 and the device image 88 related to the PC (A) as the second device to each other.

Figure 20:
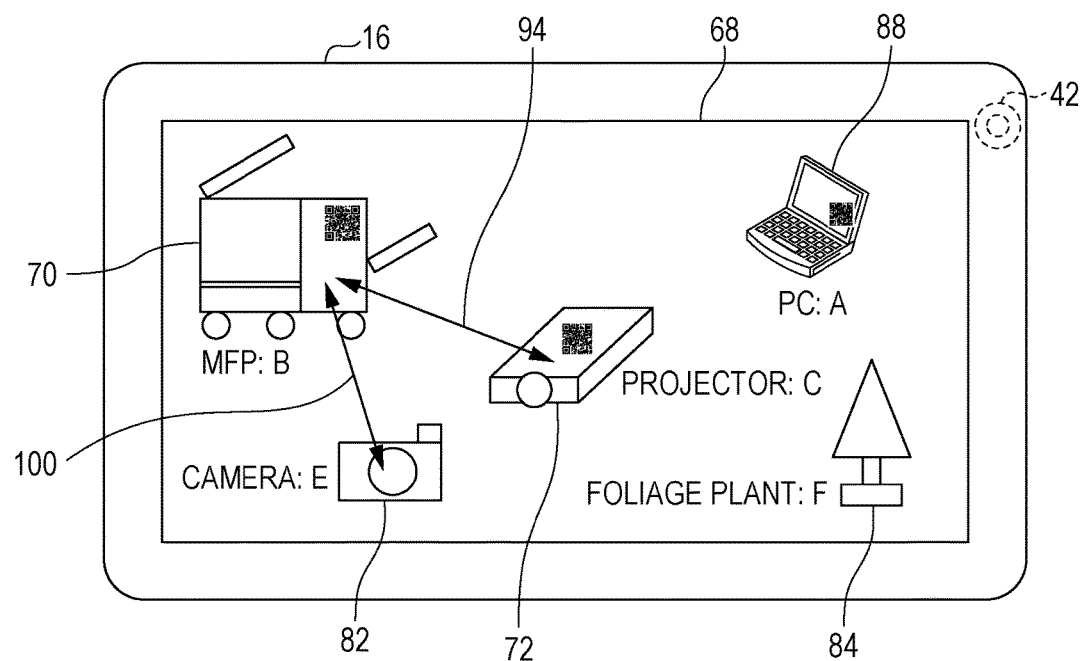
FIG. 20 is a diagram illustrating an example of a device display screen according to Example 3.

Subsequently, it is assumed that the MFP (B) is selected as a cooperation partner device from the group of second devices by the user and the device image 70 related to the MFP (B) is designated by the user. In this case, the specifying unit 38 of the server 14 specifies a third device that is capable of executing a cooperative function together with the projector (C) as the first device and the MFP (B) as the second device by referring to the cooperative function management information 34. For example, it is assumed that the camera (E) is specified as the third device. In this case, a guide indicating the camera (E) as the third device is presented as illustrated in FIG. 20. For example, an arrow 100 linking the device image 70 related to the MFP (B) as the second device and the device image 82 related to the camera (E) as the third device to each other is displayed as a guide. In this case, a guide indicating the device (for example, the camera (E)) that is used third in the cooperative function in which the projector (C) is used first and the MFP (B) is used second is presented as the third device.

For example, the user may designate the device image 70 related to the MFP (B), perform an operation of linking the device image 72 related to the projector (C) and the device image 70 related to the MFP (B) to each other, superimpose the device image 72 on the device image 70, or put an indicator on the device image 72 and then move the indicator to the device image 70, so as to designate the MFP (B) that is used as the second device.

In the above-described manner, a guide indicating a third device that is capable of executing a cooperative function together with first and second devices is presented. The device presented (recommended) as the third device varies in accordance with an order in which the first and second devices are designated. An order in which the devices are designated corresponds to an order in which the functions of the devices are used or an order in which data is moved between the devices. An operation of designating the devices serves as an operation of designating an order in which the functions are used or an order in which data is moved. The device that is used next or the device as a destination of data in a cooperative function is changed in accordance with the order in which the devices are designated. Thus, in Example 3, a guide indicating the third device to be used in the cooperative function is presented in accordance with the change.

As in Example 1, the process according to Example 3 may be applied to a case where a function image related to a function is used. For example, if a function image related to a first function is designated by the user, a guide indicating a function image related to a second function that is capable of executing a cooperative function together with the first function is presented. If the function image related to the second function is designated by the user, a guide indicating a function image related to a third function that is capable of executing a cooperative function together with the first and second functions may be presented. In this case, the function presented as the third function is changed in accordance with an order in which the first and second functions are designated. Also in Example 3, a cooperative function may be a function that uses a function of a hardware device and a function implemented by software.

Example 4

Figure 21:
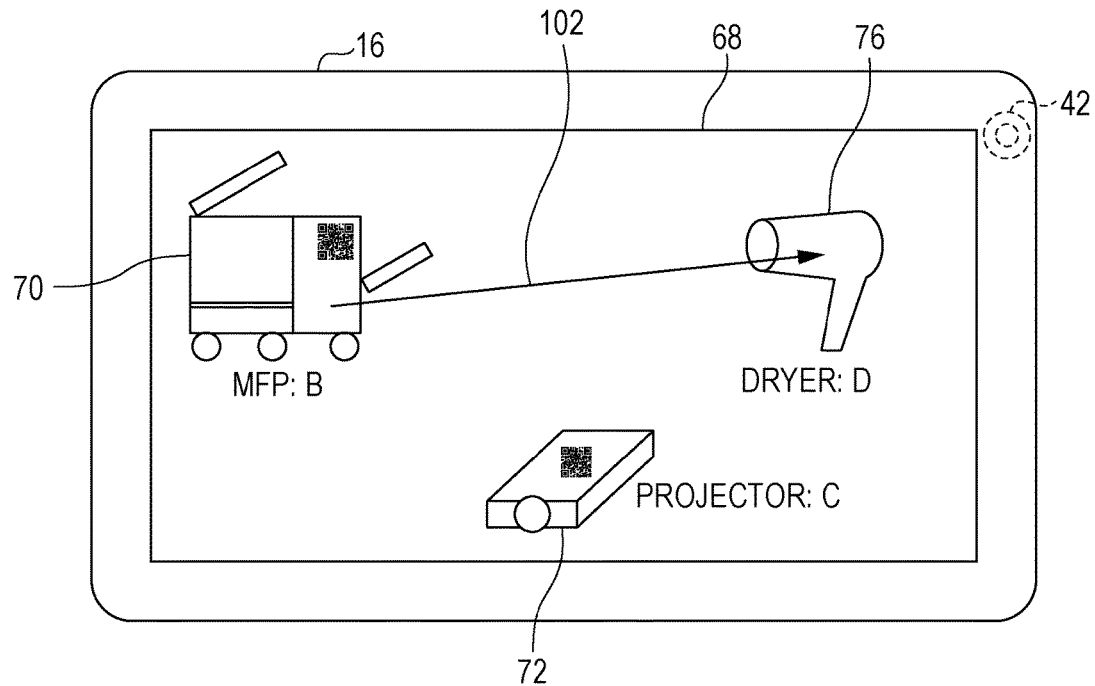
FIG. 21 is a diagram illustrating an example of a device display screen according to Example 4.
Figure 22:
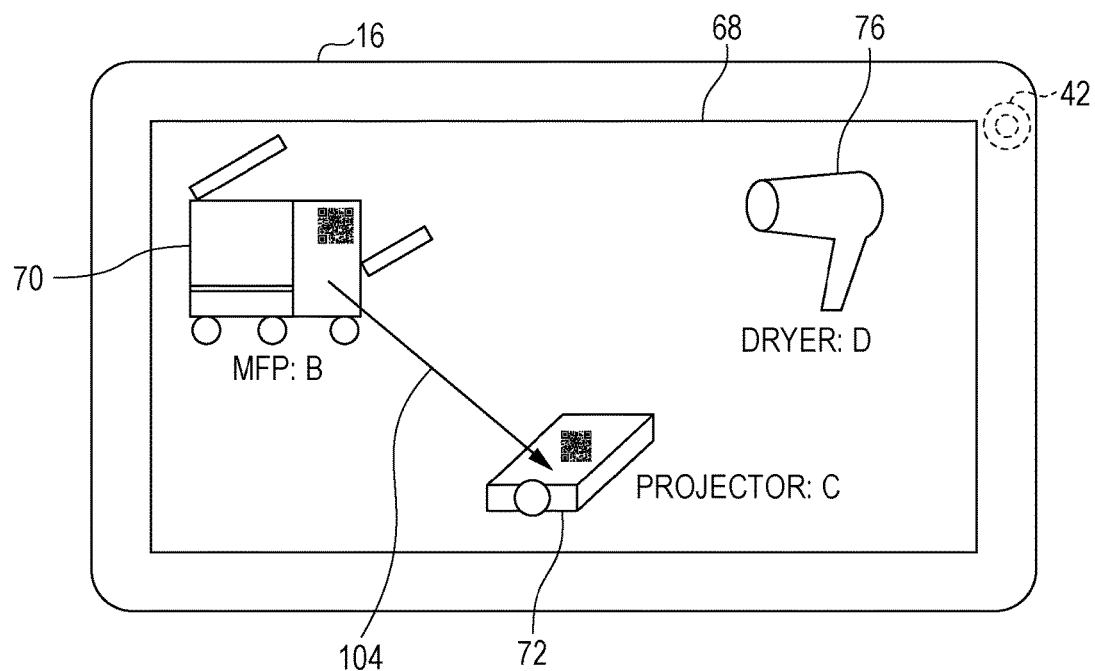
FIG. 22 is a diagram illustrating an example of a device display screen according to Example 4.

A guiding process according to Example 4 will be described with reference to FIGS. 21 and 22. FIGS. 21 and 22 each illustrate an example of a device display screen according to Example 4. In Example 4, if a device that is not capable of executing a cooperative function together with a first device is designated, a guide indicating a second device (cooperation partner device) that is capable of executing a cooperative function together with the first device is presented. For example, it is assumed that the MFP (B), the projector (C), and the dryer (D) are identified as devices.

As illustrated in FIG. 21, the device display screen 68 is displayed on the UI unit 46 of the terminal apparatus 16, and the device images 70, 72, and 76 related to the identified devices (MFP (B), projector (C), and dryer (D)) are displayed on the device display screen 68.

In this case, for example, if the MFP (B) is selected as a first device by a user and the device image 70 related to the MFP (B) is designated as a first image by the user, the MFP (B) is identified as the first device by the specifying unit 38 of the server 14. For example, it is assumed that the projector (C) corresponds to a second device that is capable of executing a cooperative function together with the MFP (B) as the first device and that the dryer (D) corresponds to a device that is not capable of executing a cooperative function together with the MFP (B). In this case, for example, it is assumed that the user designates the dryer (D), which is not capable of executing a cooperative function together with the MFP (B), as a cooperation partner device by designating the device image 76 related to the dryer (D), performing an operation of linking the device image 70 related to the MFP (B) and the device image 76 related to the dryer (D) to each other, superimposing the device image 70 on the device image 76, or putting an indicator on the device image 70 and then moving the indicator to the device image 76. In the example illustrated in FIG. 21, an operation of linking the device image 70 and the device image 76 to each other is performed by the user, as indicated by an arrow 102.

When the dryer (D), which is not capable of executing a cooperative function together with the MFP (B) as the first device, is designated as a cooperation partner device by the user, the controller 36 of the server 14 receives the designation and performs control to present a guide indicating the projector (C) as a second device that is capable of executing a cooperative function together with the MFP (B). Accordingly, the guide indicating the projector (C) as the second device is presented. For example, as illustrated in FIG. 22, the controller 48 of the terminal apparatus 16 causes an arrow 104 indicating the projector (C) as a cooperation partner device to be displayed on the device display screen 68. The arrow 104 is, for example, an image linking the device image 70 related to the MFP (B) as the first device and the device image 72 related to the projector (C) as the second device to each other. Of course, the guide may be presented by using a sound or displaying a character string.

As described above, in Example 4, if a device that is not capable of executing a cooperative function together with a first device is designated, control is performed to present a guide indicating a second device that is capable of executing a cooperative function together with the first device. If an arrow or the like serving as a guide is displayed every time a first device is designated, the arrow or the like may make the screen messy. Such a situation may be avoided in Example 4.

As in Example 1, the process according to Example 4 may be applied to a case where a function image related to a function is used. For example, if a function that is not capable of executing a cooperative function together with a first function is designated, a guide indicating a second function that is capable of executing a cooperative function together with the first function is presented.

Example 5

Figure 23:
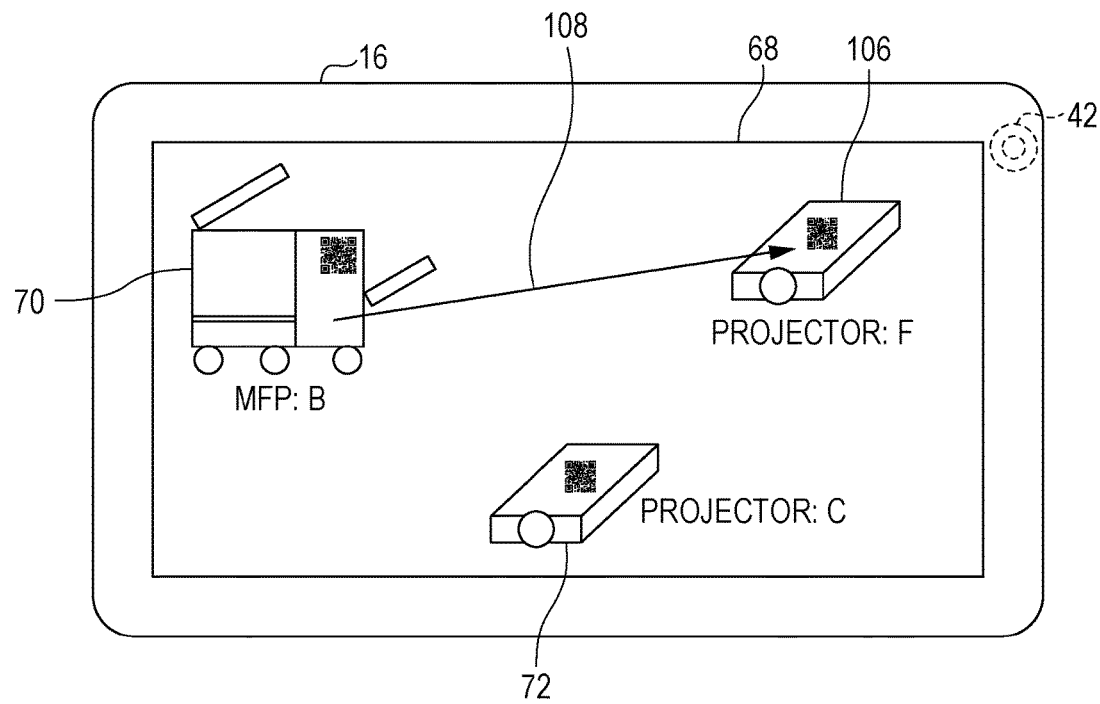
FIG. 23 is a diagram illustrating an example of a device display screen according to Example 5.
Figure 24:
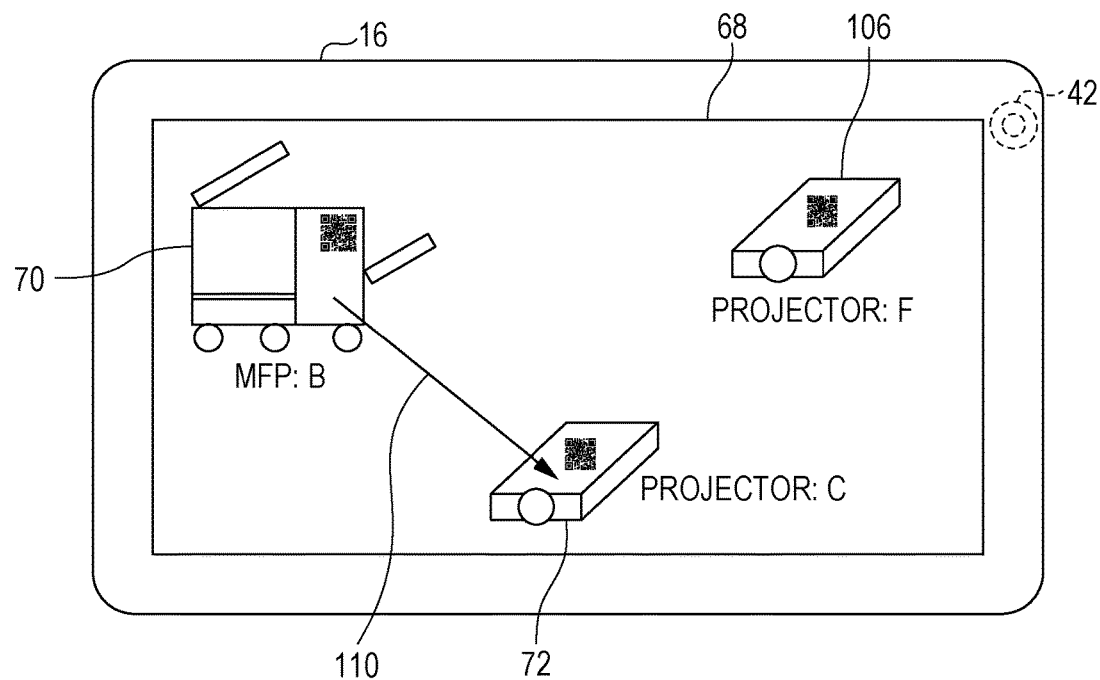
FIG. 24 is a diagram illustrating an example of a device display screen according to Example 5.
Figure 25:
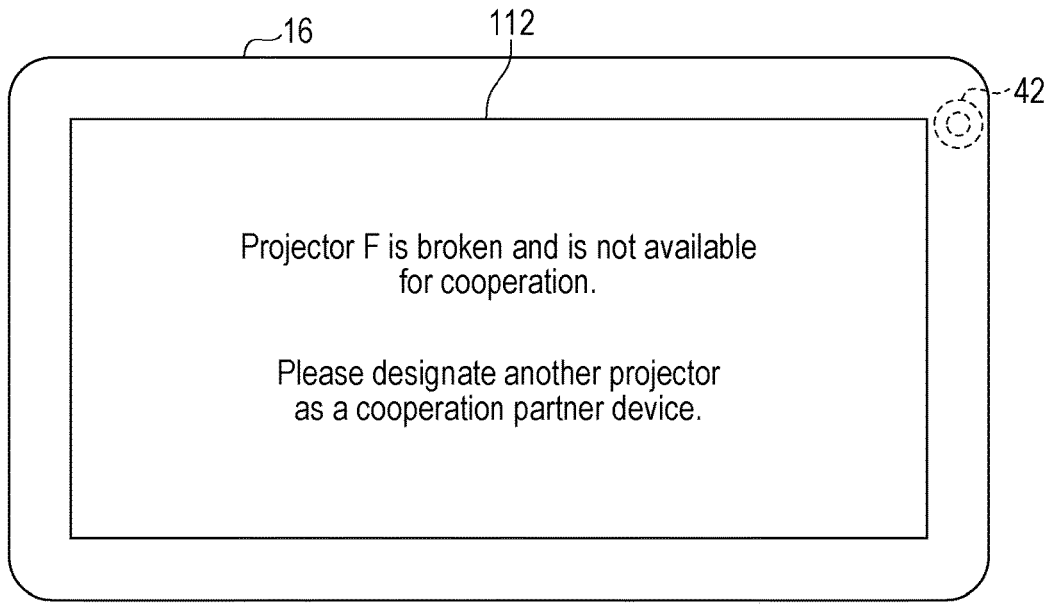
FIG. 25 is a diagram illustrating an example of a screen according to Example 5.

Example 5 will be described with reference to FIGS. 23 to 25. FIGS. 23 to 25 each illustrate an example of a screen according to Example 5. In Example 5, if a device designated as a cooperation partner device by a user is not capable of executing a cooperative function together with a first device because the device is broken or being used, a guide indicating another device that is capable of executing a cooperative function together with the first device is presented. In this case, a guide indicating a device of the same type as the device designated as a cooperation partner device by the user (for example, a device having the same type of function) may be preferentially presented. The controller 36 of the server 14 obtains information representing the operation statuses of individual devices (for example, whether the devices are executing a process, are broken, or are under maintenance) from the individual devices and manages the operation statuses of the individual devices.

For example, it is assumed that the MFP (B) and projectors (C) and (F) are identified as devices. As illustrated in FIG. 23, the device display screen 68 is displayed on the UI unit 46 of the terminal apparatus 16, and device images 70, 72, and 106 related to the identified devices (MFP (B) and projectors (C) and (F)) are displayed on the device display screen 68.

In this case, for example, if the MFP (B) is selected as a first device by a user and the device image 70 related to the MFP (B) is designated as a first image by the user, the MFP (B) is identified as the first device by the specifying unit 38 of the server 14. For example, it is assumed that the projectors (C) and (F) correspond to second devices that are capable of executing a cooperative function together with the MFP (B) as the first device. For example, it is assumed that the user designates the projector (F) as a cooperation partner device by designating the device image 106 related to the projector (F), performing an operation of linking the device image 70 related to the MFP (B) and the device image 106 related to the projector (F) to each other, superimposing the device image 70 on the device image 106, or putting an indicator on the device image 70 and then moving the indicator to the device image 106. In the example illustrated in FIG. 23, an operation of linking the device image 70 and the device image 106 to each other is performed by the user, as indicated by an arrow 108.

When the projector (F) is designated as a cooperation partner device by the user, the controller 36 of the server 14 receives the designation and checks the operation status of the projector (F). For example, if the projector (F) is broken or being used, the controller 36 of the server 14 performs control to present a guide indicating a device other than the projector (F), that is, another device that is capable of executing a cooperative function together with the first device. The controller 36 may preferentially present a guide indicating a device of the same type as the projector (F) (for example, a device having a function of the same type as the projector (F)). For example, if the projector (C) is a device of the same type as the projector (F), a guide indicating the projector (C) as a second device is preferentially presented. In this case, as illustrated in FIG. 24, for example, the controller 48 of the terminal apparatus 16 causes an arrow 110 indicating the projector (C) as a cooperation partner device to be displayed on the device display screen 68. The arrow 110 is, for example, an image linking the device image 70 related to the MFP (B) as the first device and the device image 72 related to the projector (C) as the second device to each other.

If a device that is broken or being used is designated as a cooperation partner device by the user, a screen 112 illustrated in FIG. 25 may be displayed on the UI unit 46 of the terminal apparatus 16 under control of the controller 36 of the server 14, showing a message indicating the reason for impossibility of cooperation.

If a device that is broken becomes available after being repaired or if a device that is executing a process completes the process and is not executing a process, the controller 36 of the server 14 identifies the device as a device that is capable of executing a cooperative function together with the first device.

According to Example 5, a guide indicating a device that is not broken or not being used is presented, and thus user convenience may be increased. Furthermore, a guide indicating a device of the same type as a device designated by the user is presented, and thus a guide indicating a device that is expected to be used by the user is presented.

Example 6

Figure 26:
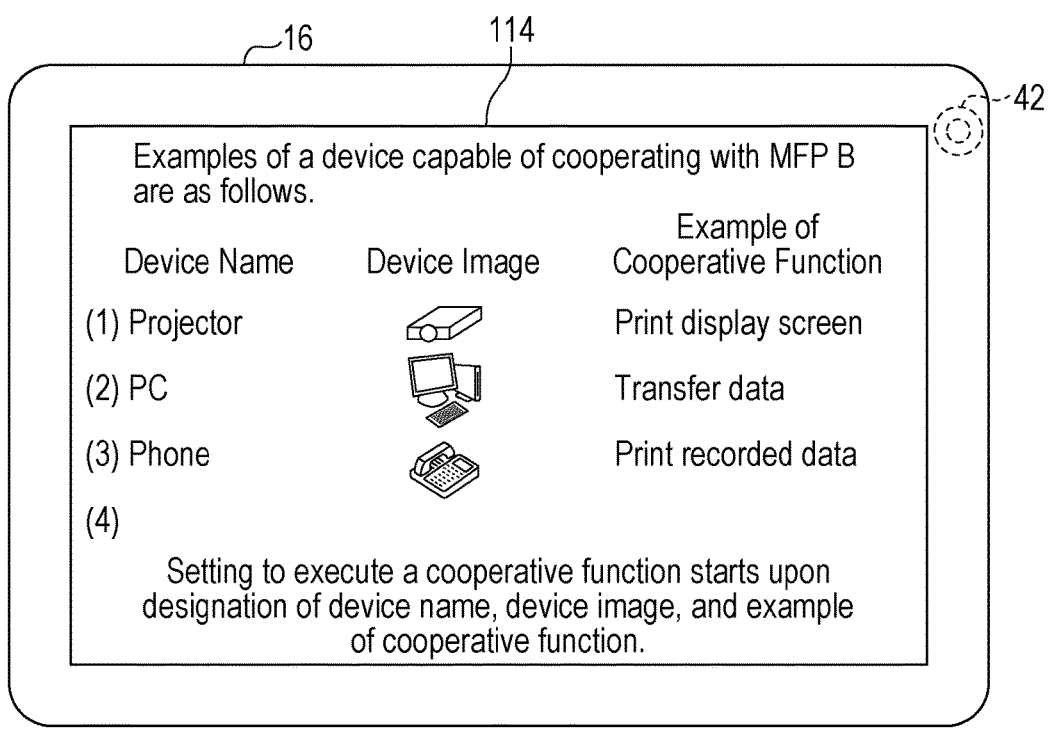
FIG. 26 is a diagram illustrating an example of a device selection screen according to Example 6.

A guiding process according to Example 6 will be described with reference to FIG. 26. FIG. 26 illustrates an example of a device selection screen. In Example 6, a candidate list snowing information about one or more second devices that are capable of executing a cooperative function together with a first device is displayed on the UI unit 46 of the terminal apparatus 16.

For example, it is assumed that the MFP (B) and the dryer (D) are identified as devices and the device image 70 related to the MFP (B) and the device image 76 related to the dryer (D) are displayed on the UI unit 46 of the terminal apparatus 16 as illustrated in FIG. 14A. In this case, for example, if the MFP (B) is selected as a first device by a user and the device image 70 related to the MFP (B) is designated by the user, the MFP (B) is identified as the first device by the specifying unit 38 of the server 14. For example, it is assumed that the dryer (D) is a device that is not capable of executing a cooperative function together with the MFP (B). In this case, for example, it is assumed that the user designates the dryer (D) as a cooperation partner device by designating the device image 76 related to the dryer (D), performing an operation of linking the device image 70 related to the MFP (B) and the device image 76 related to the dryer (D) to each other, superimposing the device image 70 on the device image 76, or putting an indicator on the device image 70 and then moving the indicator to the device image 76.

When the dryer (D), which is not capable of executing a cooperative function together with the MFP (B) as the first device, is designated as a cooperation partner device by the user, the controller 36 of the server 14 receives the designation and performs, as control to present a guide indicating one or more second devices that are capable of executing a cooperative function together with the MFP (B), control to display a candidate list showing information about the one or more second devices. Accordingly, a device selection screen 114 is displayed on the UI unit 46 of the terminal apparatus 16 as illustrated in FIG. 26, and the candidate list is displayed on the device selection screen 114. The message screen 78 illustrated in FIG. 14B may be displayed on the UI unit 46 of the terminal apparatus 16 before the device selection screen 114 is displayed.

As illustrated in FIG. 26, the candidate list includes the names of individual devices that are capable of executing a cooperative function together with the MFP (B), device images related to the individual devices, an example of cooperative functions (for example, the names of cooperative functions), and so forth. Of course, the candidate list may include at least one of these pieces of information. Each device image may be an image representing an appearance of the actual device (an image related to the device in a one-to-one relationship) or may be an image schematically depicting the device (for example, an icon). An image representing an appearance of the actual device is, for example, an image generated by photographing an appearance of the device and is an image representing the device itself. An image schematically depicting the device corresponds to an image representing the type of the device. As an example of a cooperative function, the name of one cooperative function or the names of plural cooperative functions are included in the candidate list. In a case where the names of plural cooperative functions are displayed, the names of the individual cooperative functions may be displayed in a display order corresponding to an order in which plural target devices that cooperate with each other are designated. For example, if a combination of an MFP and a projector is capable of executing plural cooperative functions (for example, cooperative functions A and B), the display order of the plural cooperative functions included in the candidate list may be different between when the MFP is designated as a first device and when the projector is designated as a first device. For example, if the MFP is designated as a first device, the names of the individual cooperative functions may be displayed in the order of cooperative function A and cooperative function B. If the projector is designated as a first device, the names of the individual cooperative functions may be displayed in the order of cooperative function B and cooperative function A.

An order in which the second devices are arranged in the candidate list may be determined based on, for example, a record of past usage of the individual second devices. For example, the controller 36 of the server 14 manages a record of usage of individual devices by obtaining, from each device, information representing a record of usage of the device. The controller 36 displays the second devices in the candidate list, in descending order of frequency in use (in descending order of the number of times of use), for example. The record of past usage may be a record of usage of a user who has designated a first image (for example, a user who uses the terminal apparatus 16 or a user who has logged in to the server 14) or may be a record of usage including a record of usage of another user.

For another example, the controller 36 may display the second devices in the candidate list in descending order of the number of executable cooperative functions. For example, if the number of cooperative functions that are executable by the projector and the MFP (B) is 3 and if the number of cooperative functions that are executable by the PC and the MFP (B) is 2, the projector is displayed above the PC in the candidate list.

If the functions of individual devices are updated and if the cooperative function management information 34 is updated, the controller 36 updates the display of the second devices in the candidate list in accordance with the update. For example, if a device that is not capable of executing a cooperative function together with the MFP before update becomes capable of executing a cooperative function together with the MFP after update, the controller 36 displays the device as a second device in the candidate list. Also, the record of usage of each device is updated with time, and the controller 36 updates the display order of the second devices in the candidate list on the basis of the updated record of usage.

The controller 36 of the server 14 may update the second devices included in the candidate list or may update the display order of the second devices in the candidate list in accordance with the operation statuses or surroundings of the first and second devices.

A device chat is capable of executing a cooperative function together with the MFP but is broken or being used is not necessarily displayed on the candidate list. Also in this case, the device is displayed on the candidate list if the device has been repaired or has become available.

If the user designates a device name or a device image included in the candidate list, the controller 48 of the terminal apparatus 16 may cause the UI unit 46 of the terminal apparatus 16 to display a list one or more cooperative functions that are executable by the MFP as the first device and the designated device under control of the controller 36 of the server 14. For example, if the projector in the candidate list is designated, the controller 48 of the terminal apparatus 16 causes the UI unit 46 to display a list of one or more cooperative functions that are executable by the MFP and the projector. If the user designates a cooperative function included in the candidate list, control is performed to execute the designated cooperative function.

Each second device displayed in the candidate list may be a device included in a group of devices registered in advance in the server 14, a device included in a group of devices identified by using the AR technologies or the like, a device included in a group of devices displayed on the UI unit 46 of the terminal apparatus 16, or a device included in a group of devices displayed in a specific area in the screen of the UI unit 46. For example, if the user operates a device image related to a device, the device image is displayed in the specific area. The first device may also be a device included in these groups of devices. The same applies to Examples 1 to 5 described above and Examples described below.

As in Example 1, the process according to Example 6 may be applied to a case where a function image related to a function is used. For example, if a device or function that is not capable of executing a cooperative function together with a first function is designated, a candidate list showing devices (candidate second devices) or functions (candidate second functions) that are capable of executing a cooperative function together with the first function may be displayed. For example, the names of the second functions, function images related to the second functions, an example of cooperative functions, and so forth are included in the candidate list. Alternatively, the candidate list may be displayed if a function that is not capable of executing a cooperative function together with the first device is designated.

According to Example 6, candidate second devices or candidate second functions are displayed as a candidate list, which may be convenient for the user.

Example 7

Example 7 will be described with reference to FIGS. 26 to 32. In Example 7, a candidate list is displayed on the UI unit 46 of the terminal apparatus 16, as in Example 6.

As in Example 6, it is assumed that the MFP (B) is designated as a first device by a user and a device that is not capable of executing a cooperative function together with the MFP (B) is designated by the user. The controller 36 of the server 14 receives the designation and performs, as control to present a guide indicating one or more second devices that are capable of executing a cooperative function together with the MFP (B), control to display a candidate list showing information about the one or more second devices. Accordingly, the device selection screen 114 is displayed on the UI unit 46 of the terminal apparatus 16 as illustrated in FIG. 26.

Figure 27:
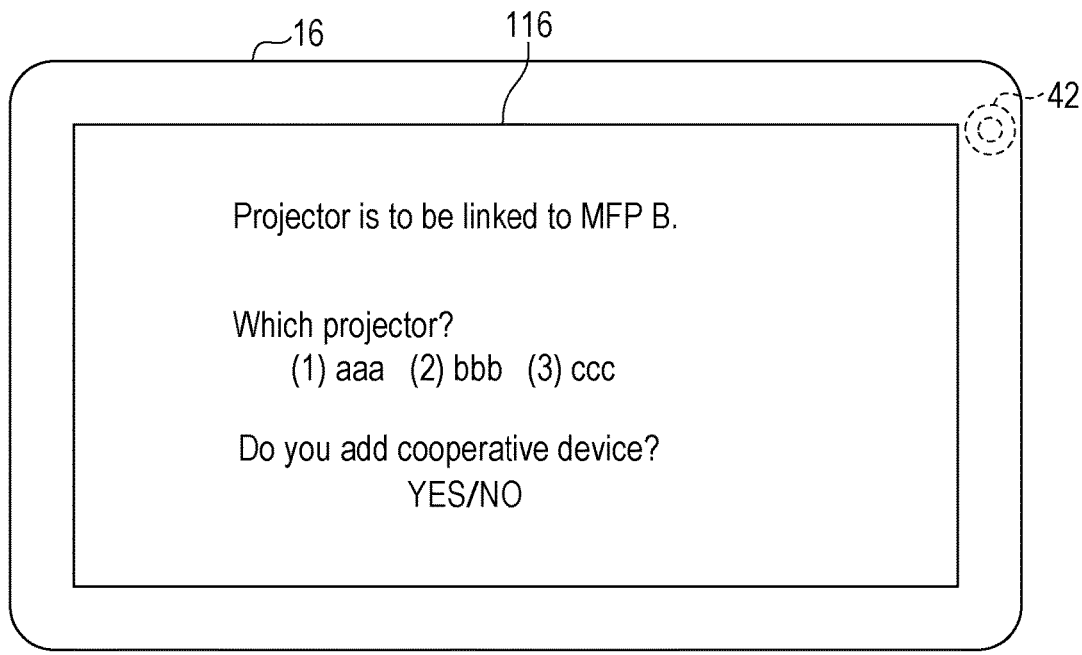
FIG. 27 is a diagram illustrating an example of a device selection screen according to Example 7.

For example, if the user designates a device name, the controller 48 of the terminal apparatus 16 causes the UI unit 46 of the terminal apparatus 16 to display a list of devices of the same type as the designated device (a list of second devices) under control of the controller 36 of the server 14. For example, if the user designates a projector, a device selection screen 116 is displayed on the UI unit 46 of the terminal apparatus 16 as illustrated in FIG. 27. A list of projectors as second devices is displayed on the device selection screen 116. For example, if projectors aaa, bbb, and ccc are specified (identified) as projectors corresponding to second devices by the specifying unit 38 of the server 14, a list showing these projectors is displayed. The user selects a projector to be used as a second device from this list.

Figure 28:
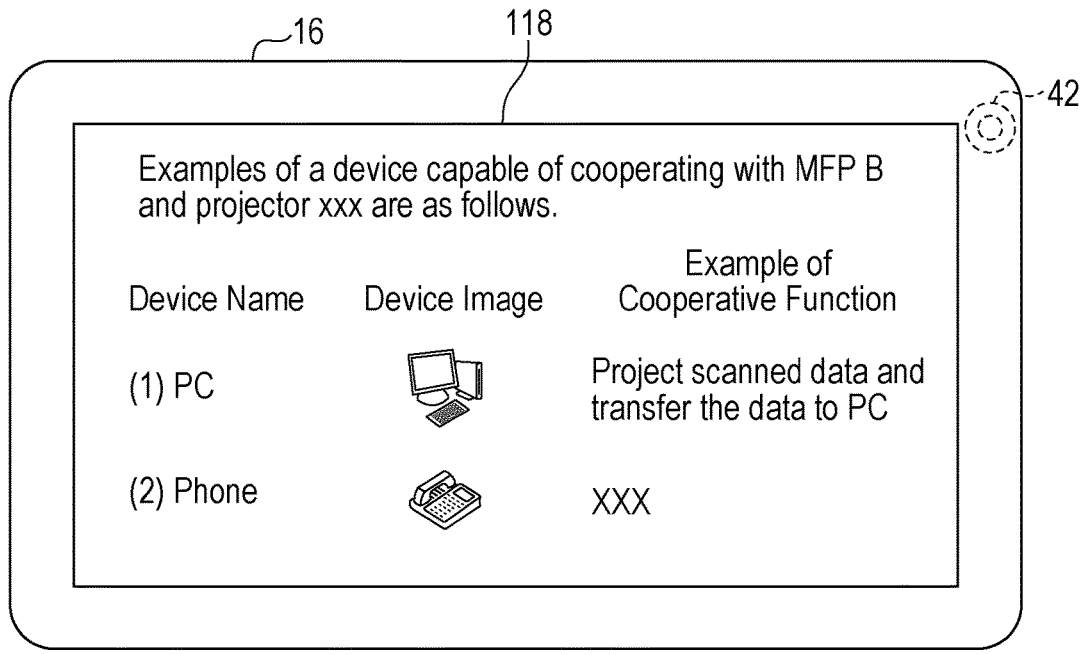
FIG. 28 is a diagram illustrating an example of a device selection screen according to Example 7.

Also, a message that asks the user whether or not to add a target device that cooperates is displayed on the device selection screen 116. For example, if a second device is designated by the user and then an instruction to add a target device that cooperates is provided by the user (for example, if "YES" in FIG. 27 is selected by the user), a device selection screen 118 is displayed on the UI unit 46 of the terminal apparatus 16 as illustrated in FIG. 28, and a candidate list showing information about one or more third devices that are capable of executing a cooperative function together with the first and second devices is displayed on the device selection screen 118. This candidate list has the same configuration as the candidate list showing information about one or more second devices. The display order of the third devices may be different from the display order in the candidate list of second devices. If a third device is designated by the user, a list of third devices is displayed as in the device selection screen 116 (see FIG. 27) that is displayed in response to designation of a second device. The same applies to the case of adding a fourth device; a fifth device, and so forth.

If an image schematically depicting a device (for example, an icon) is included as a device image in the candidate list and if the device image is designated by the user, a list of second devices (for example, projectors) related to the device image is displayed, as illustrated in FIG. 27. That is, the device image represents the type of the device and typically represents the device. Thus, if the device image is designated, a list of second devices related to the device image is displayed. On the other hand, an image representing an actual device (an image related to a device in a one-to-one relationship) is an image representing the device itself. Thus, if the device image is included in the candidate list and is designated by the user, the device itself is designated by the user. In this case, the list of second devices illustrated in FIG. 27 is not displayed, and only a message asking the user whether or not to add a target device that cooperates may be displayed.

Figure 29:
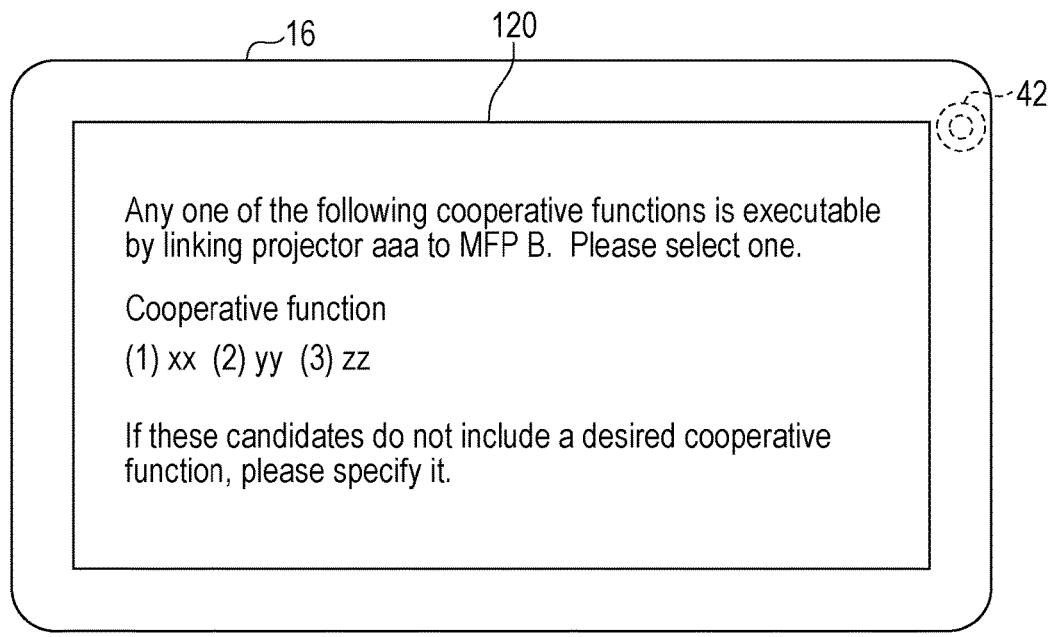
FIG. 29 is a diagram illustrating an example of a function selection screen according to Example 7.

If no target devices that cooperate are to be added (for example, if "NO" in FIG. 27 is designated by the user), the controller 48 of the terminal apparatus 16 causes the UI unit 46 of the terminal apparatus 16 to display a function selection screen 120 illustrated in FIG. 29 under control of the controller 36 of the server 14. A list of cooperative functions that are executable by the plural devices designated by the user is displayed on the function selection screen 120. For example, if the MFP (B) is designated as a first device and if the projector aaa is designated as a second device, a list of cooperative functions that are executable by the MFP (B) and the projector aaa is displayed. If the user designates a cooperative function from the list and provides an instruction to execute the cooperative function, the cooperative function is executed by the MFP (B) and the projector aaa.

Figure 30:
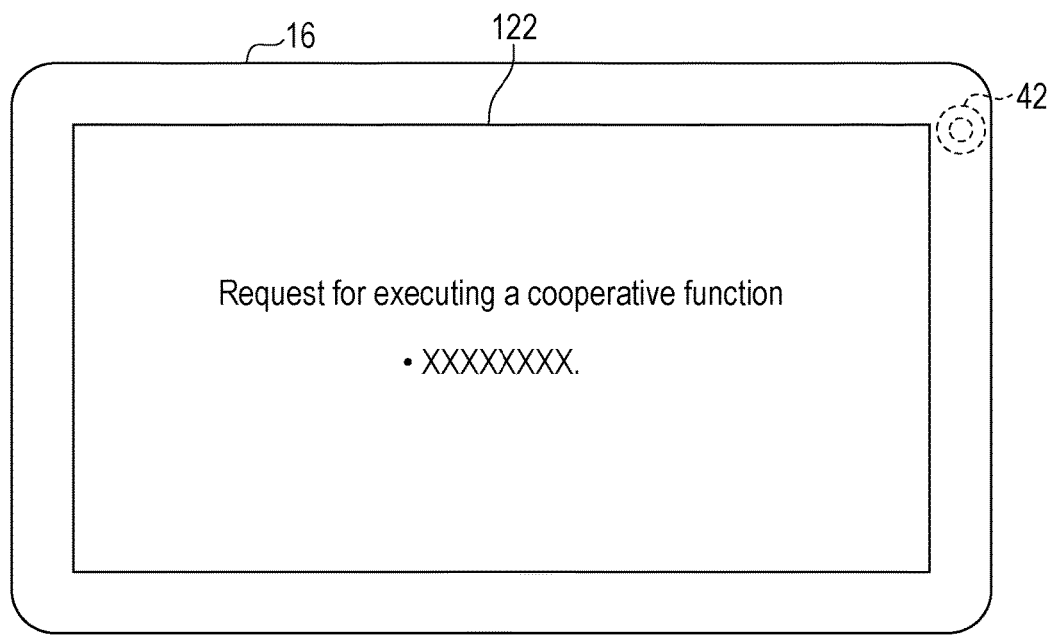
FIG. 30 is a diagram illustrating an example of a screen according to Example 7.
Figure 31:
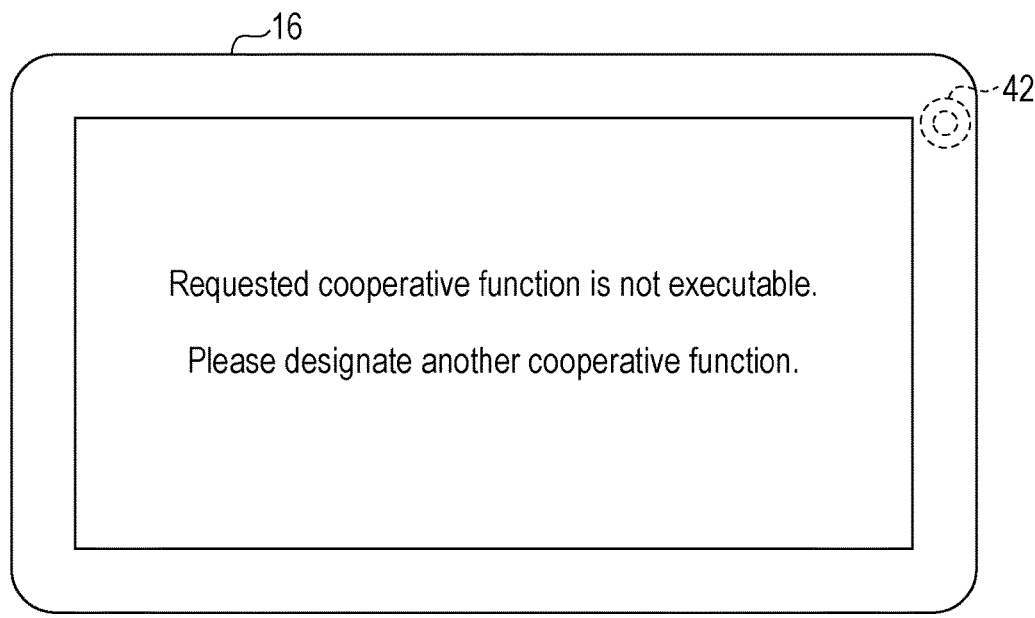
FIG. 31 is a diagram illustrating an example of a message according to Example 7.
Figure 32:
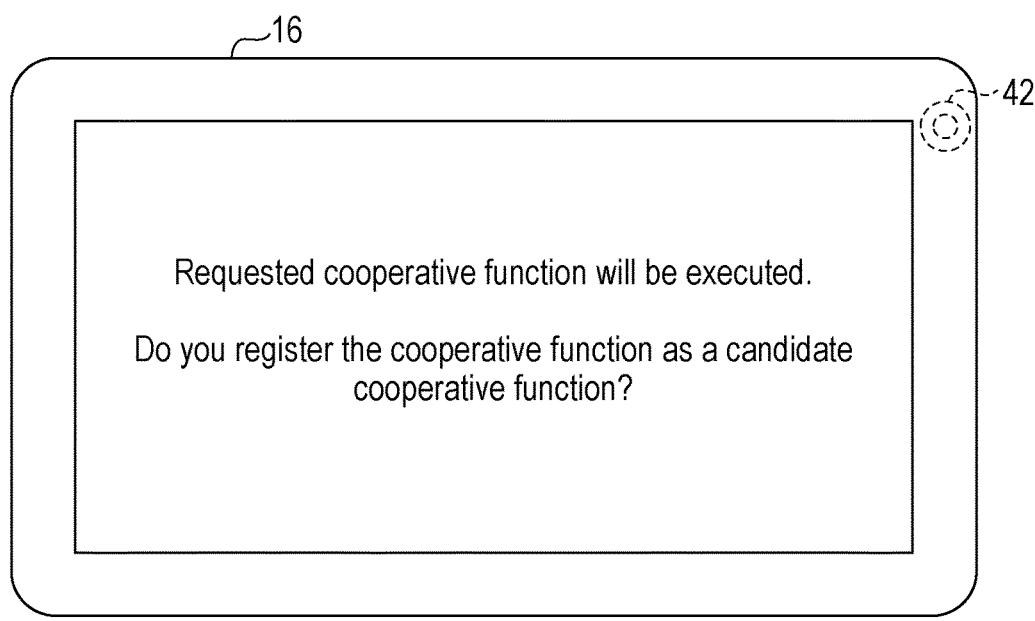
FIG. 32 is a diagram illustrating an example of a message according to Example 7.

On the other hand, in the case of executing a cooperative function that is not included in the list of cooperative functions, the user requests the execution of the cooperative function. For example, as illustrated in FIG. 30, a screen 122 for making the request is displayed on the UI unit 46 of the terminal apparatus 16, and the user inputs the name of the cooperative function to be executed on the screen 122. The information representing the request is transmitted from the terminal apparatus 16 to the server 14. In response to receipt of the request, the controller 36 of the server 14 determines whether or not the cooperative function related to the request is executable by the designated devices (for example, first and second devices). If the cooperative function related to the request is not executable, the controller 48 of the terminal apparatus 16 causes the UI unit 46 of the terminal apparatus 16 to display a message indicating that the cooperative function related to the request is not executable, under control of the controller 36 of the server 14, as illustrated in FIG. 31. If the cooperative function related to the request is executable, the controller 48 of the terminal apparatus 16 causes the UI unit 46 of the terminal apparatus 16 to display a message indicating that the cooperative function related to the request is to be executed, under control of the controller 36 of the server 14, as illustrated in FIG. 32. If an execution instruction is provided by the user, the cooperative function is executed. Furthermore, the cooperative function requested by the user may be registered. For example, as illustrated in FIG. 32, the controller 48 of the terminal apparatus 16 causes the UI unit 46 of the terminal apparatus 16 to display a message asking the user whether or not to register the requested cooperative function as a candidate cooperative function from now on, under control of the controller 36 of the server 14. If "register" is selected by the user, information about the requested cooperative function is registered in the cooperative function management information 34 and is displayed while being included in the list of cooperative functions from now on. If "not register" is selected by the user, information about the requested cooperative function is not registered and is not included in the list of cooperative functions. The requested cooperative function is not registered, for example, if the requested cooperative function corresponds to an exceptional process, if the usage frequency of other cooperative functions is higher, or if the user wants to prevent a situation where the number of cooperative functions included in the list increases and the list becomes complicated.

As in Example 1, the process according to Example 7 may be applied to a case where a function image related to a function is used.

According to Example 7, candidate second devices or candidate second functions are displayed as a candidate list, which may be convenient for the user. Furthermore, a target device that cooperates may be easily increased by using a candidate list.

Example 8

Example 8 will be described with reference to FIGS. 33 to 35. In Example 8, a candidate list, is displayed on the UI unit 46 of the terminal apparatus 16, as in Examples 6 and 7.

As in Examples 6 and 7, it is assumed that the MFP (B) is designated as a first device by a user and a device that is not capable of executing a cooperative function together with the MFP (B) is designated by the user. In this case, the device selection screen 114 is displayed on the UI unit 46 of the terminal apparatus 16 as illustrated in FIG. 26.

Figure 33:
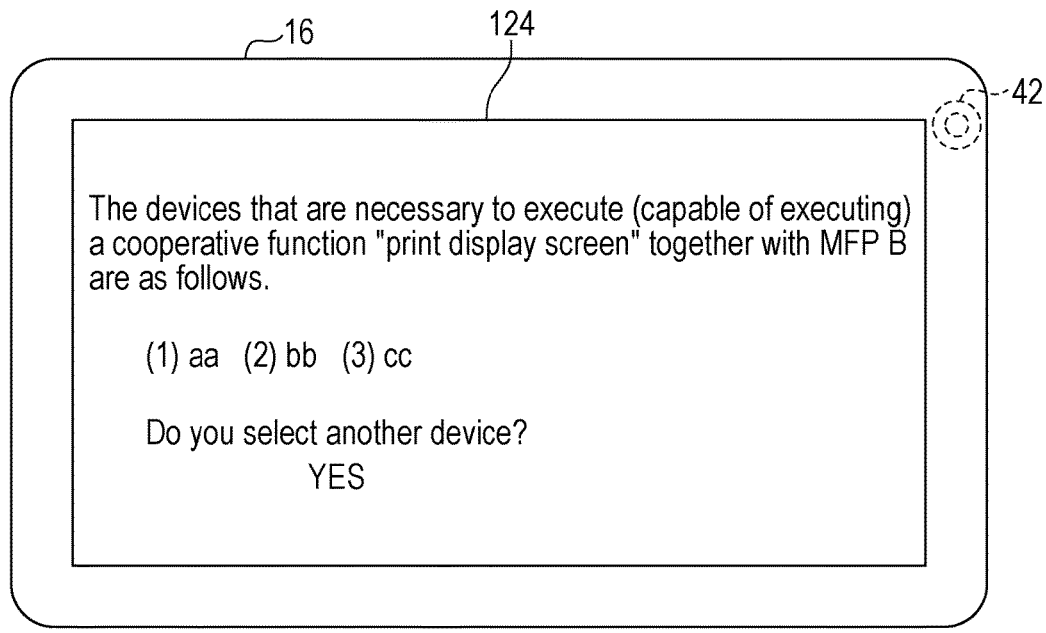
FIG. 33 is a diagram illustrating an example of a device selection screen according to Example 8.

If a cooperative function (for example, "print display screen") is designated by the user on the device selection screen 114, the controller 48 of the terminal apparatus 16 causes the UI unit 46 of the terminal apparatus 16 to display a device selection screen 124 illustrated in FIG. 33 under control of the controller 36 of the server 14. On the device selection screen 124, a list of devices (a list of second devices) that are necessary to execute the cooperative function designated by the user (for example, "print display screen"), that is, devices capable of executing the cooperative function, is displayed. If a device (second device) is designated in the list by the user and if an instruction to execute the cooperative function is provided by the user, the cooperative function designated by the user is executed by the first and second devices designated by the user.

Figure 34:
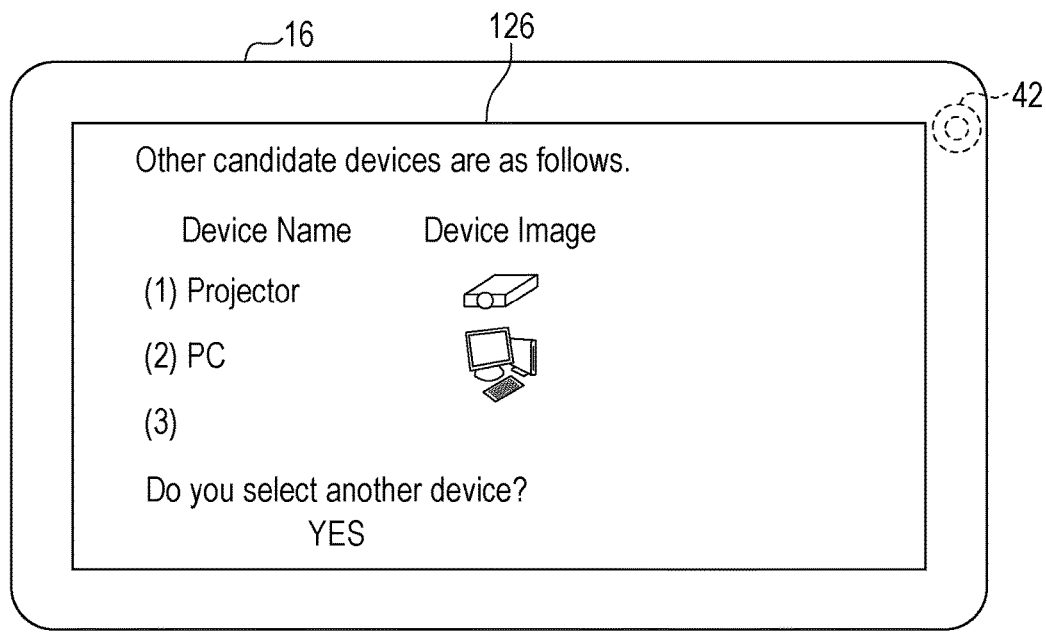
FIG. 34 is a diagram illustrating an example of a device selection screen according to Example 8.

If an instruction to select a device that is not included in the list of devices displayed on the device selection screen 124 is provided by the user (if "YES" is selected in response to the inquiry "Do you select another device?"), the controller 48 of the terminal apparatus 16 causes the UI unit 46 of the terminal apparatus 16 to display a device selection screen 126 illustrated in FIG. 34 under control of the controller 36 of the server 14. On the device selection screen 126, a list of candidates of another device that is capable of executing the cooperative function designated by the user is displayed. If a device (second device) is designated by the user and if an instruction to execute the cooperative function is provided by the user on the device selection screen 126, the cooperative function designated by the user is executed by the first and second devices designated by the user.

Figures 35, 36:
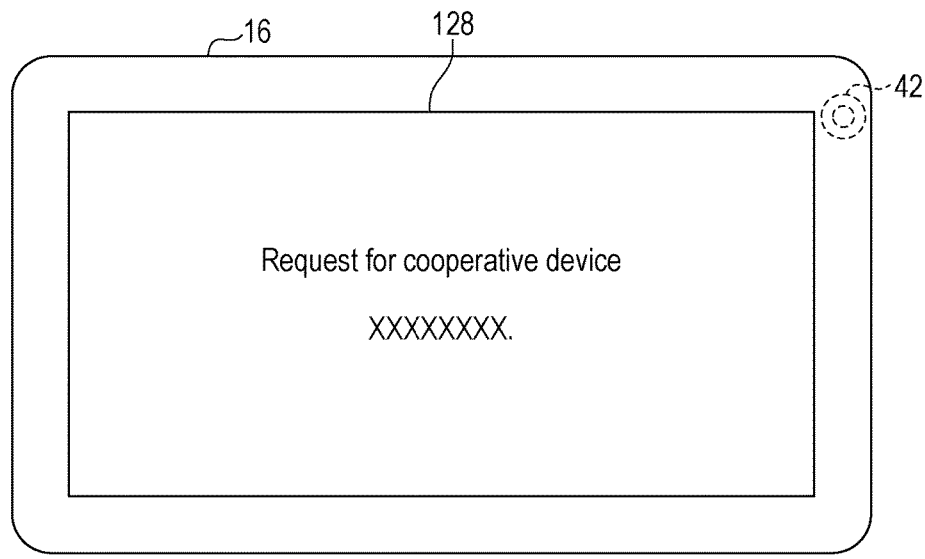
FIG. 35 is a diagram illustrating an example of a screen according to Example 8.
FIG. 36 is a diagram illustrating an example of a cooperative function management table.

If an instruction to select a device that is not included in the list of devices displayed on the device selection screen 126 is provided by the user (if "YES" is selected in response to the inquiry "Do you select another device?"), the controller 48 of the terminal apparatus 16 causes the UI unit 46 of the terminal apparatus 16 to display a screen 128 for inputting information about a target device that cooperates illustrated in FIG. 35 under control of the controller 36 of the server 14. The user inputs information about a target device that cooperates (for example, the name or type of the device) on the screen 128. The information about the target device input by the user is transmitted from the terminal apparatus 16 to the server 14. In response to receipt of the information, the controller 36 of the server 14 determines whether or not the cooperative function designated by the user is executable by the first device and the target device designated by the user. If the cooperative function is not executable, the controller 48 of the terminal apparatus 16 causes the UI unit 46 of the terminal apparatus 16 to display a screen for setting another device as a target device, under control of the controller 36 of the server 14. If the cooperative function is executable and if an instruction to execute the cooperative function is provided, the cooperative function designated by the user is executed by the first and second devices (target devices that cooperate with each other) designated by the user.

As in Example, 1, the process according to Example 8 may be applied to a case where a function image related to a function is used.

According to Example 8, when a cooperative function is designated in a candidate list, the devices that are necessary to execute the cooperative function are displayed, and thus the user convenience of selecting a device may be increased.

The exemplary embodiment, may be applied to an environment where plural devices are used by plural users. For example, even if a user interface such as a touch screen is removed from a device, the terminal apparatus 16 is used as a user interface. In another case, for example, if a device is temporarily used by a user on the go, a user interface suitable for the user, that is, a user interface displaying one or more functions of a device designated by the user and one or more cooperative functions that use the device is implemented by the terminal apparatus 16.

Hereinafter, processes related to Examples 1 to 8 will be described.

Process of Switching Display of Information about Cooperative Functions

In the exemplary embodiment, display of information about cooperative functions may be switched in accordance with an order in which device images related to devices are linked to each other. In this case, if a device designated as a cooperation partner device is not capable of executing a cooperative function together with a first device, control is performed to present a guide indicating a second device that is capable of executing a cooperative function together with the first device as in Examples 1 to 8 described above. On the other hand, if a second device that is capable of executing a cooperative function together with the first device is designated by the user, display of information about cooperative functions is switched in accordance with an order in which the device images are linked to each other. Hereinafter, this process will be described in detail with reference to FIGS. 36 to 38B.

FIG. 36 illustrates a cooperative function management table as another example of the cooperative function management information 34. In this cooperative function management table, for example, information representing a combination of device IDs, information representing the names (types) of target devices that cooperate with each other, information representing one or more cooperative functions (cooperative function information), information representing a linkage order, and information representing an order of priority are associated with each other. The linkage order corresponds to an order in which device images related to devices are linked to each other. The order of priority is an order of priority in which information about cooperative functions is displayed. For example, the device having a device ID "A" is a PC, and the device having a device ID "B" is an MFP. The cooperation between the PC (A) and the MFP (B) implements, for example, a scan and transfer function and a print function as cooperative functions. The scan and transfer function is a function of transferring image data generated through scanning by the MFP (B) to the PC (A). The print function is a function of transmitting data (for example, image data or document data) stored in the PC (A) to the MFP (B) and printing the data by the MFP (B). For example, if a link is made from the MFP (B) to the PC (A), that is, if a link is made from a device image related to the MFP (B) to a device image related to the PC (A), the order of priority of the scan and transfer function is "1" and the order of priority of the print function is "2". In this case, information about the scan and transfer function is displayed with priority over information about the print function. On the other hand, if a link is made from the PC (A) to the MFP (B), that is, if a link is made from a device image related to the PC (A) to a device image related to the MFP (B), the order of priority of the print function is "1" and the order of priority of the scan and transfer function is "2". In this case, information about the print function is displayed with priority over information about the scan and transfer function.

Figure 37A:
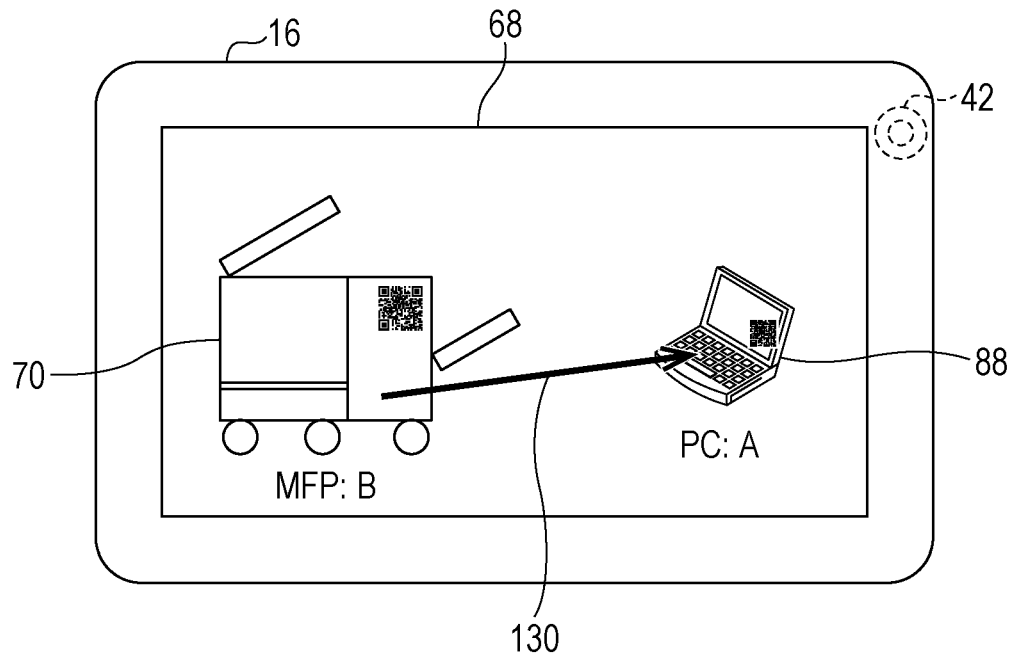
FIGS. 37A and 37B are diagrams illustrating an example of a device display screen and an example of a function display screen, respectively.

FIGS. 37A to 38B each illustrate an example of a screen displayed on the UI unit 46 of the terminal apparatus 16. For example, it is assumed that the MFP (B) and the PC (A) are identified. As illustrated in FIG. 37A, the device display screen 68 is displayed on the UI unit 46 of the terminal apparatus 16, and the device image 70 related to the MFP (B) and the device image 88 related to the PC (A) are displayed on the device display screen 68. In this state, the user links the device images representing the target devices to each other by using an indicator (for example, a user's finger, a pen, or a stylus). The controller 48 of the terminal apparatus 16 detects the touch of the indicator on the device display screen 68 and detects the movement of the indicator on the device display screen 68. For example, as indicated by an arrow 130, the user touches the device image 70 on the device display screen 68 by using an operator and moves the operator to the device image 88 on the device display screen 68, and thereby links the device image 70 to the device image 88. Accordingly, the MFP (B) related to the device image 70 and the PC (A) related to the device image 88 are designated as the target devices that cooperate with each other and a linkage order is designated. The order in which the device images are linked corresponds to the linkage order. The MFP (B) corresponds to a first device and the PC (A) corresponds to a second device. In the example illustrated in FIG. 37A, a link is made from the device image 70 to the device image 88, that is, from the MFP (B) to the PC (A). The information representing the linkage order of the devices is transmitted from the terminal apparatus 16 to the server 14. The controller 48 of the terminal apparatus 16 may cause an image representing the trail of the movement performed by the user to be displayed on the device display screen 68. After the devices are linked to each other, the controller 48 of the terminal apparatus 16 may replace the trail with a predetermined straight line or the like and may cause the straight line to be displayed on the device display screen 68.

When the target devices that cooperate with each other (for example, the MFP (B) and the PC (A)) are designated in the above-described manner, the specifying unit 38 of the server 14 specifies the cooperative functions associated with the combination of the PC (A) and the MFP (B) in the cooperative function management table illustrated in FIG. 36. Accordingly, the cooperative functions that are executed through cooperation between the PC (A) and the MFP (B) are specified. When the linkage order of the devices is designated by the user, the specifying unit 38 specifies the order of priority associated with the linkage order in the cooperative function management table. Specifically, with reference to FIG. 36, since the PC (A) and the MFP (B) are designated as the target devices that cooperate with each other, the cooperative functions that are executed by these devices are a scan and transfer function and a print function. Furthermore, since the link is made from the MFP (B) to the PC (A) (B→A), the order of priority of the scan and transfer function is "1" and the order of priority of the print function is "2".

The information about the specified cooperative functions and the information about the specified order of priority are transmitted from the server 14 to the terminal apparatus 16. The controller 48 of the terminal apparatus 16 causes the UI unit 46 to display the information about the cooperative functions as the information about candidate cooperative functions in accordance with the order of priority.

Figure 37B:
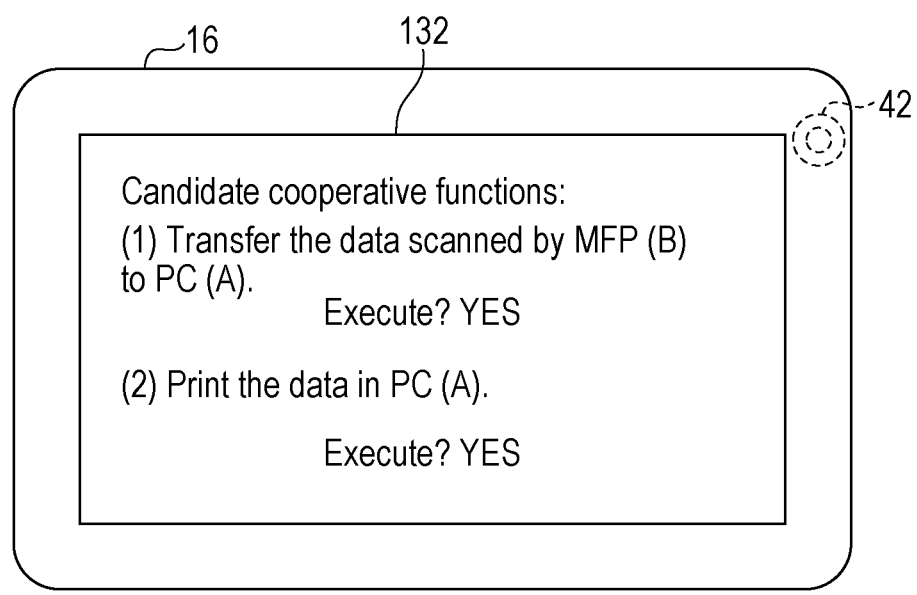

For example, as illustrated in FIG. 37B, the controller 48 of the terminal apparatus 16 causes the UI unit 46 to display a cooperative function display screen 132 and to display the information about the candidate cooperative functions on the cooperative function display screen 132. Since the order of priority of the scan and transfer function is "1" and the order of priority of the print function is "2", the information about the scan and transfer function is displayed with priority over (for example, above) the information about the print function. For example, as the information about the scan and transfer function, an explanation of the scan and transfer function "transfer the data scanned by MFP (B) to PC (A)" is displayed. Also, as the information about the print function, an explanation of the print function "print the data in PC (A)" is displayed.

If a cooperative function is designated by the user and an execution instruction is provided, the designated cooperative function is executed. For example, if a "YES" button is pressed by the user, the cooperative function related to the "YES" button is executed. Also, a "back" button is displayed on the cooperative function display screen 132. If the "back" button is pressed by the user, the process of connecting the devices is stopped.

The process of specifying cooperative functions and the process of specifying an order of priority may be performed by the terminal apparatus 16.

The target devices that cooperate with each other may be designated and the linkage order thereof may be designated by drawing circles around the device images, instead of moving the operator between the device images. For example, an order of a drawing operation corresponds to the linkage order. Alternatively, the target devices that cooperate with each other and the linkage order thereof may be designated in accordance with a voice instruction provided by the user.

Figure 38A:
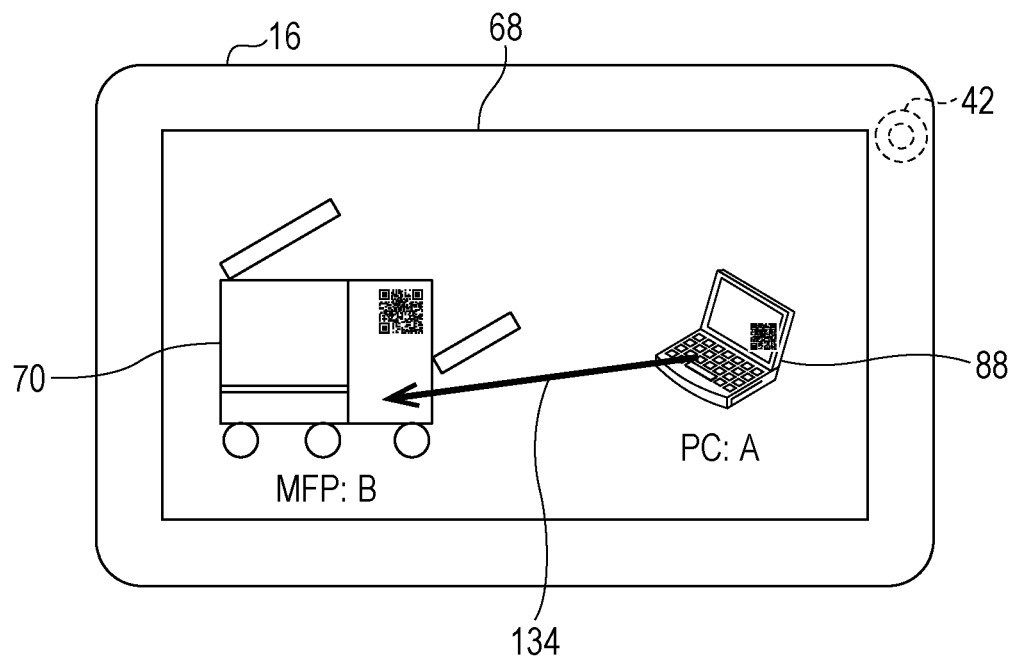
FIGS. 38A and 38B are diagrams illustrating an example of a device display screen and an example of a function display screen, respectively.
Figure 38B:
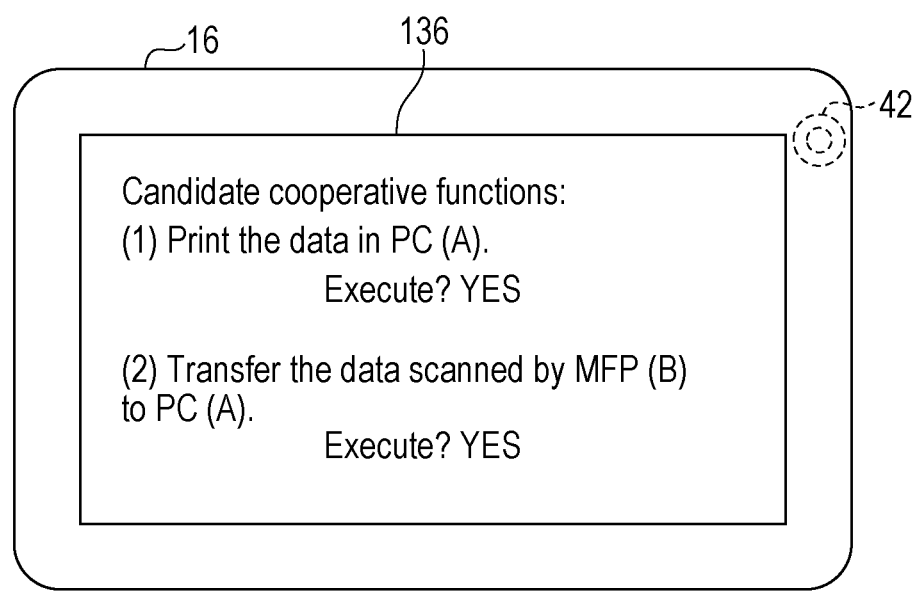

FIGS. 38A and 38B illustrate an example of another operation. For example, as illustrated in FIG. 38A, the user touches the device image 88 on the device display screen 68 by using an operator and moves the operator to the device image 70 in the direction indicated by an arrow 134, and thereby links the device image 88 to the device image 70. Accordingly, the PC (A) related to the device image 88 and the MFP (B) related to the device image 70 are designated as the target devices that cooperate with each other, and also the linkage order is designated. In this example, a link is made from the device image 88 to the device image 70, that is, from the PC (A) to the MFP (B). With reference to the cooperative function management table illustrated in FIG. 36, the order of priority of the print function is "1" and the order of priority of the scan and transfer function is "2". In this case, as illustrated in FIG. 38B, the information about the print function is displayed with priority over (for example, above) the information about the scan and transfer function on a cooperative function display screen 136.

As described above, device images related to devices are linked to each other and thereby cooperative functions that use functions of the devices are specified. In accordance with the order in which the images are linked to each other, that is, the order in which the devices are linked to each other, the display order of information about the cooperative functions is changed. The linkage order of the devices is also regarded as an order in which functions are used in the individual devices or an order in which the data is moved between the devices that cooperate with each other. The operation of linking the devices (the operation of linking the images) is also regarded as the operation of designating an order in which functions are used or an order in which data is moved. Thus, as a result of changing the display order of the information about the cooperative functions in accordance with the linkage order, the information about the cooperative function that is expected to be used by the user is preferentially displayed. In other words, the information about the cooperative function that is more likely to be used by the user is preferentially displayed. For example, if a link is made from the MFP (B) to the PC (A), it is expected that the user will use the cooperative function of "using the function of the MFP (B) first and then transferring data from the MFP (B) to the PC (A)". On the other hand, if a link is made from the PC (A) to the MFP (B), it is expected that the user will use the cooperative function of "using the function of the PC (A) first and then transferring data from the PC (A) to the MFP (B)". Thus, as a result of changing the display order of the information about the cooperative functions in accordance with the linkage order of the images, the information about the cooperative function that is more likely to be used by the user is preferentially displayed. Furthermore, an order in which functions are used or an order in which data is moved is designated without a special operation other than an operation of linking the device images, and the information about the cooperative function that is expected to be used by the user is displayed.

The above-described display switch process may be applied to a case where a function image related to a function is used. For example, display of information about cooperative functions is switched in accordance with an order in which a function image related to a first function and a function image related to a second function are designated.

The above-described display switch process may be applied to information about cooperative functions displayed in the candidate list according to Example 6 and so forth (for example, see FIG. 26). That is, if the MFP (B) is designated as a first device, the PC (A) is displayed as a candidate second device (candidate cooperation partner) in the candidate list, and pieces of information about plural cooperative functions are displayed in the order illustrated in FIG. 37B as information about the cooperative functions related to the PC (A) (information about the cooperative functions that are executable by the MFP (B) and the PC (A)). On the other hand, if the PC (A) is designated as a first device, the MFP (B) is displayed as a candidate second device (candidate cooperation partner) in the candidate list, and pieces of information about plural cooperative functions are displayed in the order illustrated in FIG. 38B as information about the cooperative functions related to the MFP (B).

Cooperative Process Using Partial Images

A function of a device assigned to a cooperative function may vary according to a position in a device image related to the device. When a specific position in a device image is designated by a user, information about a cooperative function that uses the function corresponding to the specific position is preferentially displayed. Hereinafter, this process will be described in detail.

FIG. 39 illustrates an example of a device function management table. The data of the device function management table is stored as the device function management information 32 in the server 14. In the device function management table, for example, a device ID, information representing the name (for example, the type) of the device, information representing a position in a device image, information representing a function corresponding to the position (function information), and an image ID are associated with each other. A position in a device image is a specific position (specific portion) in a device image related to a device, for example, a specific position in the device image schematically representing the device or a specific position in the device image captured by a camera. A different function is associated with each specific position in the device image.

Figure 40A:
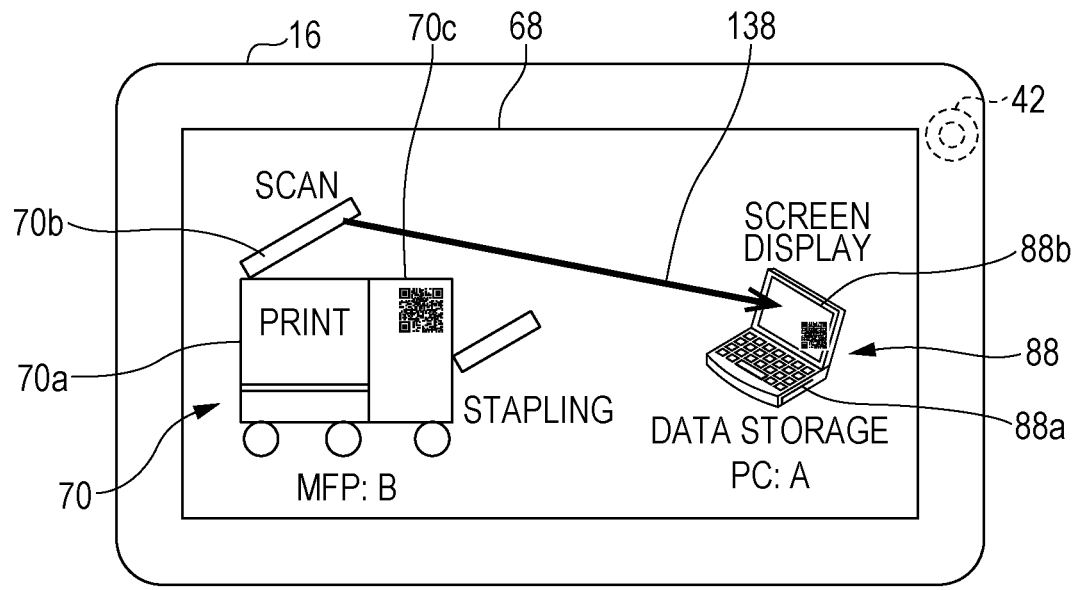
FIGS. 40A and 40B are diagrams illustrating an example of a device display screen and an example of a function display screen, respectively.
Figure 40B:
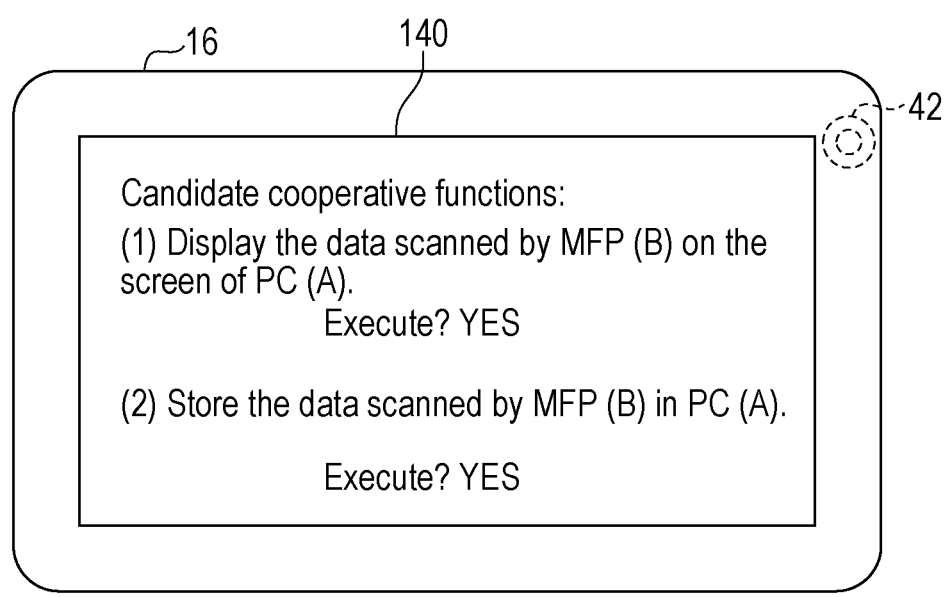

FIGS. 40A and 40B each illustrate an example of a screen displayed on the UI unit 46 of the terminal apparatus 16. For example, it is assumed that the MFP (B) and the PC (A) are identified. As illustrated in FIG. 40A, the device display screen 68 is displayed on the UI unit 46 of the terminal apparatus 16, and the device images 70 and 88 are displayed on the device display screen 68. For example, in the device image 70, a specific position (partial image 70a) corresponding to a body part of the MFP (B) is assigned with a print function. In the device image 70, a specific position (partial image 70b) corresponding to a document cover, a document glass, and an automatic document feeder of the MFP (B) is assigned with a scan function. In the device image 70, a specific position (partial image 70c) corresponding to a post-processing apparatus is assigned with a stapling function. The stapling function is a function of stapling output sheets. In the device image 88, a specific position (partial image 88a) corresponding to a body part of the PC (A) is assigned with a data storage function. In the device image 88, a specific position (partial image 88b) corresponding to a display part of the PC (A) is assigned with a screen display function. The data storage function is a function of storing data received from another apparatus in the PC (A). The screen display function is a function of displaying data received from another apparatus in the PC (A).

The controller 48 of the terminal apparatus 16 may cause the names of functions assigned to specific positions in a device image (for example, print, scan, and so forth) to be displayed on the device display screen 68. Accordingly, the user is provided with information clearly representing the correspondence between specific positions and functions. Of course, the names of functions are not necessarily displayed.

When positions in device images to which functions are assigned are designated by the user, the functions assigned to the designated positions are designated as the target functions that cooperate with each other. The user links, by using an indicator, the specific positions (partial images) to which the functions are assigned in the device images representing the target devices that cooperate with each other. For example, as indicated by an arrow 138, the user touches, by using an operator, the partial image 70b on the device display screen 68 and moves the operator to the partial image 88b, thereby linking the partial image 70b to the partial image 88b. Accordingly, the MFP (B) related to the device image 70 including the partial image 70b and the PC (A) related to the device image 88 including the partial image 88b are designated as the target devices that cooperate with each other, and the scan function assigned to the partial image 70b and the screen display function assigned to the partial image 88b are designated. Also, a linkage order may be designated through the linkage operation. In this case, an order in which the partial images are linked corresponds to the linkage order. In the example illustrated in FIG. 40A, a link is made from the partial image 70b to the partial image 88b, that is, from the MFP (B) to the PC (A). The scan function and the screen display function are designated as the functions used for a cooperative function. The information representing the linkage order of the devices and the information representing the specific positions designated in the device images by the user are transmitted from the terminal apparatus 16 to the server 14.

When the target devices that cooperate with each other (for example, the PC (A) and the MFP (B)) are identified, the specifying unit 38 of the server 14 specifies the cooperative functions that are implemented through cooperation between the PC (A) and the MFP (B) in the cooperative function management table illustrated in FIG. 7. Also, the specifying unit 38 specifies the functions assigned to the specific positions designated in the device images by the user with reference to the device function management table illustrated in FIG. 39. Also, the specifying unit 38 assigns a higher priority to the cooperative function that uses the functions assigned to the positions designated by the user and assigns a lower priority to the cooperative function that does not use the functions, among the cooperative functions that are implemented through cooperation between the PC (A) and the MFP (B).

The information about the cooperative functions specified in the above-described manner and the information representing the order of priority are transmitted from the server 14 to the terminal apparatus 16. The controller 48 of the terminal apparatus 16 causes the UI unit 46 to display the information about the cooperative functions, as the information about candidate cooperative functions, in accordance with the order of priority.

For example, as illustrated in FIG. 40B, the controller 48 of the terminal apparatus 16 causes the display of the UI unit 46 to display a cooperative function display screen 140 and to display the information about candidate cooperative functions on the cooperative function display screen 140. Since the scam function and the screen display function are designated in this order by the user, the information about a scan, transfer, and display function, which is a cooperative function executed through cooperation between the scan function and the screen display function, is displayed with priority over (for example, above) the information about the other cooperative functions. For example, the information about the scan, transfer, and display function is displayed with priority over the information about a scan, transfer, and storage function, which is a cooperative function executed through cooperation between the scan function and the data storage function. The scan, transfer, and display function is a function of transferring the data generated through scanning by the MFP (B) to the PC (A) and displaying the data on the screen of the PC (A). The scan, transfer, and storage function is a function of transferring the data generated through scanning by the MFP (B) to the PC (A) and storing the data in the PC (A). In the example illustrated in FIG. 40B, explanations of the individual cooperative functions are displayed as the information about the individual cooperative functions.

According to the cooperative process using partial images, in a case where each of the target devices that cooperate with each other has plural functions, functions are individually designated and the information about a cooperative function that uses the designated functions is preferentially displayed. Accordingly, a cooperative function that is expected to be used by the user is preferentially displayed.

A cooperative function may be a function that uses a combination of parts of devices, a function that uses a combination of a whole device and a part of a device, or a function that uses a combination of whole devices.

A cooperative process that uses partial images may be applied to a case where a function image related to a function is used. For example, different functions are assigned to positions in a function image, and a cooperative function that uses functions assigned to positions designated by the user is specified.

Examples 1 to 8 described above may also be applied to a cooperative process that uses partial images. For example, if a partial image included in a first image related to a first device is designated by a user, control may be performed to present a guide indicating the whole or part of a second device that is capable of executing a cooperative function together with the function assigned to the part related to the partial image. For another example, if a whole first image related to a first device is designated by the user, control may be performed to present a guide indicating a part of a second device that is capable of executing a cooperative function together with the first device. To present the guide, the whole or part of the second device may be displayed while included in the candidate list described above in Example 6. If the whole or part of the first device is designated by the user, a guide indicating the whole or part of the second device that is capable of executing a cooperative function together with the whole or part of the first device may be presented. If the whole or part of the second device that is not capable of executing a cooperative function together with the whole or part of the first device designated by the user is designated, a guide indicating the whole or part of the second device that is capable of executing a cooperative function together with the whole or part of the first device may be presented. Hereinafter, these processes will be described in detail.

For example, when a first image (whole image) related to a first device is designated, the controller 48 of the terminal apparatus 16 presents a guide indicating one or plural functions of a second device, the functions being capable of executing a cooperative function together with the first device, under control of the controller 36 of the server 14. More specifically, the controller 48 of the terminal apparatus 16 presents a guide indicating one or plural partial images related to one or plural parts included in the second device (one or plural partial images in a second image related to the second device), the one or plural partial images related to the one or plural parts being assigned with functions that are capable of executing a cooperative function together with the first device. For example, as in Examples 1 to 8, the controller 48 of the terminal apparatus 16 causes the UI unit 46 of the terminal apparatus 16 to display an image depicting an arrow serving as a guide, presents a guide by using a sound, or causes the UI unit 46 to display a character string serving as the guide. Referring to FIG. 40A, if the device image 70 related to the MFP (B) is designated as a first image by a user, a guide indicating a partial image related to a part assigned with a function of the PC (A) capable of executing a cooperative function together with the MFP (B) is presented. For example, if the screen display function of the PC (A) is a function that is capable of executing a cooperative function together with the MFP (B), a guide indicating the partial image 88*b* related to the screen display function is presented. For example, an arrow that links the device image 70 related to the MFP (B) and the partial image 88*b* to each other is displayed, a guide indicating the screen display function is presented by using a sound, a character string representing the screen display function is displayed, or the partial image 88*b* is displayed such that the partial image 88*b* is distinguishable from another partial image. The guide may be presented when the device image 70 as a first image is designated by the user or when a part of the PC (A) assigned with a function that is not capable of executing a cooperative function together with the MFP (B) is designated by the user.

For another example, if a partial image included in a first image related to a first device is designated, the controller 48 of the terminal apparatus 16 may present a guide indicating a second device (whole device) that is capable of executing a cooperative function together with a function assigned to the part related to the partial image (a function of the first device), under control of the controller 36 of the server 14. Referring to FIG. 40A, for example, if the partial image 70*a* related to the MFP (B) is designated by a user, a guide indicating a second image related to a second device that is capable of executing a cooperative function together with the print function assigned to the part related to the partial image 70*a* is presented. For example, if the PC (A) is a device that is capable of executing a cooperative function together with the MFP (B), a guide indicating the device image 88 related to the PC (A) is presented. For example, an arrow that links the partial image 70*a* and the device image 88 to each other is displayed, a guide indicating the PC (A) is presented, by using a sound, a character string representing the PC (A) is displayed, or the device image 88 is displayed such that the device image 88 is distinguishable from another device image. The guide may be presented when a partial image included in the device image 70 is designated by the user or when a device image related to a device that is not capable of executing a cooperative function together with the function related to the partial image is designated by the user.

For another example, if a partial image (first partial image) included in a first image related to a first device is designated, the controller 48 of the terminal apparatus 16 presents a guide indicating one or plural functions of a second device that are capable of executing a cooperative function together with a function (of the first device) assigned to a part related to the first partial image, under control of the controller 36 of the server 14. More specifically, the controller 48 of the terminal apparatus 16 presents a guide indicating one or plural partial images related to one or plural parts included in the second device (one or plural partial images included in a second image related to the second device, referred to as second partial images), that is, one or plural second partial images related to one or plural parts assigned with one or plural functions that are capable of executing a cooperative function together with the function assigned to the part related to the first partial image. Referring to FIG. 40A, for example, if the partial image 70*a* related to the MFP (B) is designated by a user, a guide indicating a second partial image related to a part assigned with a function of the PC (A) that is capable of executing a cooperative function together with the print function assigned to the part related to the partial image 70*a* is presented. For example, if the screen display function of the PC (A) is a function that is capable of executing a cooperative function together with the print function, a guide indicating the partial image 88*b* related to the screen display function is presented. For example, an arrow that links the partial image 70*a* and the partial image 88*b* to each other is displayed, a guide indicating the screen display function is presented by using a sound, a character string representing the screen display function is displayed, or the partial image 88*b* is displayed such that the partial image 88*b* is distinguishable from another partial image. The guide may be presented when a partial image included in the device image 70 is designated by the user or when a partial image related to a function that is not capable of executing a cooperative function together with the function related to the partial image is designated by the user.

Three or more partial images may be designated and thereby three or more functions may be designated by a user. For example, if two partial images (two functions: first function and second function) are designated by the user, a guide indicating a part assigned with a function (third function) that is capable of executing a cooperative function together with the two functions may be presented. In this case, the specifying unit 38 of the server 14 may change the third function for which a guide is presented, in accordance with an order in which the partial image related to the first function and the partial image related to the second function are designated.

Plural functions of the same device may be designated as target functions that cooperate with each other. For example, the screen display function and the data storage function of the PC (A) may be designated by the user as target functions that cooperate with each other, or the scan function of the MFP (B) and the screen display function and the data storage function of the PC (A) may be designated by the user as target functions that cooperate with each other. Also in this case, a guide indicating a part assigned with a function (for example, a second function) that is capable of executing a cooperative function together with a function designated first (for example, a first function) is presented. The specifying unit 38 of the server 14 may specify a cooperative function that uses the individual functions in accordance with the order of the designation and may assign higher priority to the cooperative function.

Another Example of Cooperative Process Using Partial Images

Hereinafter, another example of the cooperative process using partial images will be described with reference to FIGS. 41 and 42.

FIG. 41 illustrates an example of a device function management table. The data of the device function management table is stored as the device function management information 32 in the server 14. In the device function management table, for example, a device ID, information representing the name of the device (for example, the type of the device), information representing the name of a part of the device (for example, the type of a part), a part ID as part identification information for identifying the part, information representing a function assigned to the part (a function of the part), and a partial image ID for identifying a partial image related to the part are associated with each other. A partial image is an image representing an appearance of a part of a device obtained through photography by a camera. Of course, a partial image schematically representing a part of a device may be associated with the part. For example, different functions are assigned to individual parts of a device.

Specifically, a screen display function is assigned to a display part of the PC (A), and information representing the screen display function is associated with a partial image ID of a partial image related to the display part. The screen display function is a function of displaying information on the PC (A). A data storage function is assigned to a body part of the PC (A), and information representing the data storage function is associated with a partial image ID of a partial image related to the body part. The data storage function is a function of storing data in the PC (A).

A print function is assigned to a body part of the MFP (B), and information representing the print function is associated with a partial image ID of a partial image related to the body part. A scan function is assigned to a reading part of the MFP (B) (for example, a part corresponding to a document cover, a document glass, and an automatic document feeder of the MFP (B)), and information representing the scan function is associated with a partial image ID of a partial image related to the reading part. A stapling function is assigned to a post-processing apparatus of the MFP (B), and information representing the stapling function is associated with a partial image ID of a partial image related to the post-processing apparatus. The stapling function is a function of stapling output sheets.

A function assigned to a part of a device is specified (identified) by using, for example, the markerless AR technology. For example, if a part of a device is photographed by a camera (for example, the camera 42 of the terminal apparatus 16), appearance image data representing the part is transmitted from the terminal apparatus 16 to the server 14. The specifying unit 38 of the server 14 specifies (identifies) a function associated with the appearance image data in the device function management table. Accordingly, the function assigned to the photographed part is specified (identified). For example, if the body part of the MFP (B) is photographed by the camera 42, the appearance image data representing the body part of the MFP (B) is transmitted from the terminal apparatus 16 to the server 14. The specifying unit 38 of the server 14 specifies the print function associated with the appearance image data in the device function management table. Accordingly, it is specified that the function assigned to the body part of the MFP (B) is the print function.

Of course, a function assigned to a part of a device may be specified (identified) by using the marker-based AR technology. For example, each part of a device is provided with a marker, such as a two-dimensional barcode obtained by coding part identification information (for example, part ID) for identifying the part. If the marker on the part is photographed by a camera and the marker-based AR technology is applied thereto, the part identification information (for example, the part ID) of the part is obtained. The application of the marker-based AR technology may be performed by the terminal apparatus 16 or the server 14. After the part identification information is obtained in this way, the specifying unit 38 of the server 14 specifies (identifies) a function associated with the part identification information (for example, the part ID) in the device function management table.

FIG. 42 illustrates an example of a cooperative function management table. The data of the cooperative function management table is stored as the cooperative function management information 34 in the server 14. The cooperative function management table is information representing cooperative functions, each using functions of plural parts. In the cooperative function management table, for example, information representing a combination of parts of devices, information representing a combination of part IDs, and information representing a cooperative function that uses functions of plural parts included in the combination are associated with each other. Of course, in the cooperative function management table, information representing a combination of a part of a device and a whole device, and information representing a cooperative function that uses a function of the part of the device and a function of the whole device may be associated with each other.

Specifically, a print function as a cooperative function is assigned to a combination of the display part of the PC (A) and the body part of the MFP (B), and information representing the print function as a cooperative function is associated with information representing a combination of the part ID of the display part of the PC (A) and the part ID of the body part of the MFP (B). The print function as a cooperative function is, for example, a function of transmitting data stored in the PC (A) to the MFP (B) and printing the data by the MFP (B).

A print function as a cooperative function is assigned to a combination of the body part of the MFP (B) and the body part of the projector (C), and information representing the print function as a cooperative function is associated with information representing a combination of the part ID of the body part of the MFP (B) and the part ID of the body prat of the projector (C). The print function as a cooperative function is, for example, a function of transmitting data projected by the projector (C) to the MFP (B) and printing the data by the MFP (B).

A scan and projection function as a cooperative function is assigned to a combination of the reading part of the MFP (B) and the body prat of the projector (C), and information representing the scan and projection function as a cooperative function is associated with information representing a combination of the part ID of the reading part of the MFP (B) and the part ID of the body prat of the projector (C). The scan and projection function as a cooperative function is, for example, a function of transmitting data generated through scanning by the MFP (B) to the projector (C) and projecting the data by the projector (C).

The cooperative function may be a function that uses functions of plural parts included in the same device, or may be a function that uses functions of parts included in plural different devices. The cooperative function may be a function that uses functions of three or more parts.

For example, after plural parts of a device (for example, plural parts of plural different devices or plural parts of the same device) are specified (identified) by using the marker-based AR technology or the markerless AR technology, the specifying unit 38 of the server 14 specifies (identifies) a cooperative function associated with a combination of the identified plural parts in the cooperative function management table. Accordingly, a cooperative function that uses the functions of the plural identified (for example, photographed) parts is specified (identified). For example, if the body prat of the MFP (B) and the body part of the projector (C) are photographed by the camera 42 of the terminal apparatus 16 and if the body part of the MFP (B) and the body part of the projector (C) are identified, the specifying unit 38 of the server 14 specifies a print function and so forth as a cooperative function associated with a combination of the body part of the MFP (B) and the body part of the projector (C) in the cooperative function management table.

Examples 1 to 8 described above may also be applied to such a cooperative process. For example, if a first part of a device is specified (identified), the controller 48 of the terminal apparatus 16 presents a guide indicating a second part of a device that is capable of executing a cooperative function together with the function assigned to the first part, under control of the controller 36 of the server 14.

Designation of Target Devices That Cooperate with Each Other by Superimposing Device Images The target devices that cooperate with each other may be designated by superimposing plural device images on one another. Hereinafter, this process will be described with reference to FIGS. 43A to 44B. FIGS. 43A to 44B each illustrate an example of a screen displayed on the UI unit 46 of the terminal apparatus 16.

Figure 43A:
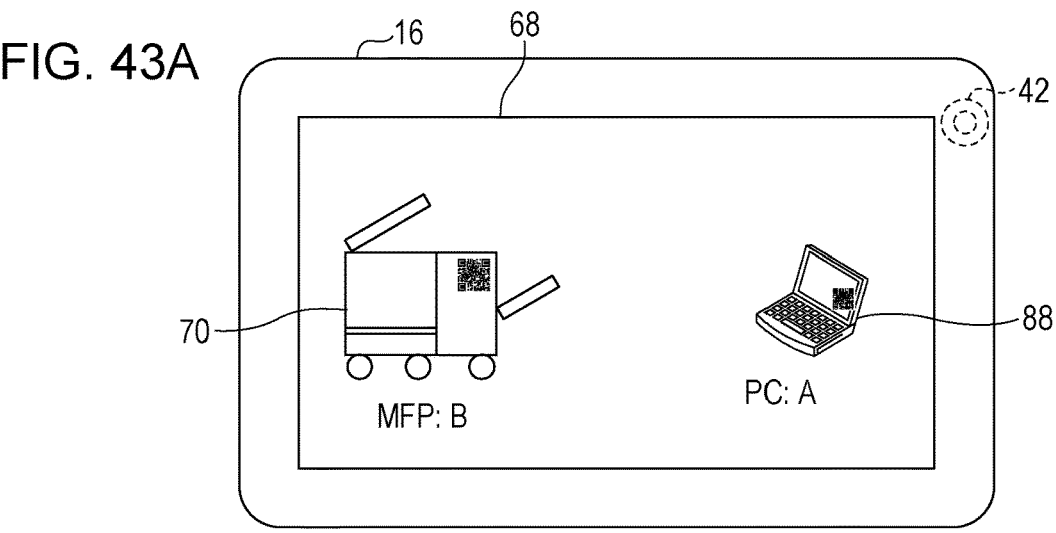
FIGS. 43A to 43C are diagrams illustrating an example of screens displayed on the terminal apparatus.
Figure 43B:
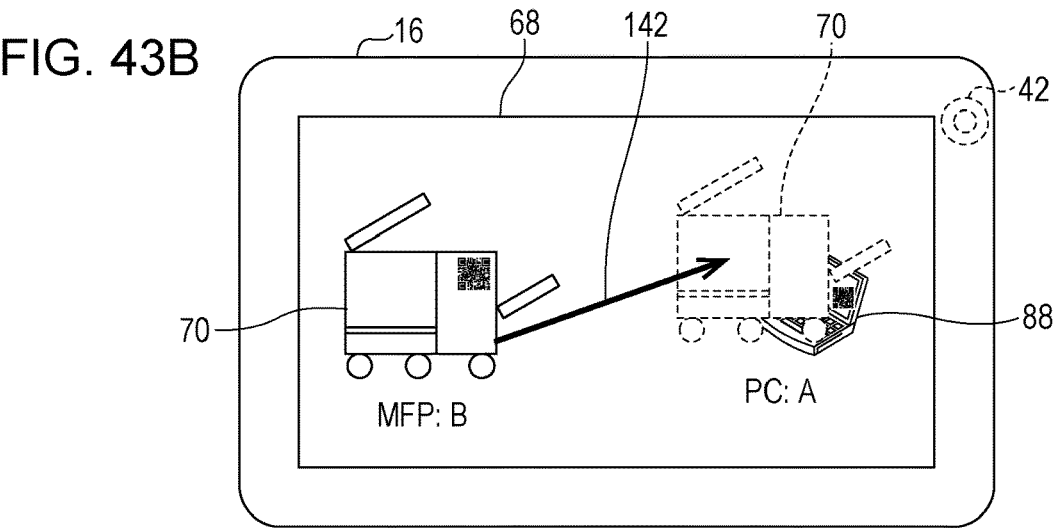

For example, it is assumed that the MFP (B) and the PC (A) are identified. As illustrated in FIG. 43A, the device display screen 68 is displayed on the UI unit 46 of the terminal apparatus 16, and the device images 70 and 88 related to the identified devices are displayed on the device display screen 68. In this state, a user superimposes the device image related to a first device on the device image related to a cooperation partner device (second device) by using an indicator (for example, a user's finger, a pen, or a stylus). For example, as illustrated in FIG. 43B, the user designates the device image 70 by using an operator and superimposes the device image 70 on the device image 88 as indicated by an arrow 142. For example, the user superimposes the device images on one another by performing a drag-and-drop operation. Specifically, the user drags the device image 70 and drops it at the position where the device image 70 is superimposed on the device image 88. This drag-and-drop operation is a technique according to the related art. Alternatively, the device images to be superimposed on one another may be designated in accordance with a voice instruction provided by the user. For example, the device images 70 and 88 may be designated as the target device images and may be superimposed on one another in accordance with a voice instruction provided by the user.

As a result of superimposing the device images 70 and 88 on one another, the MFP (B) related to the device image 70 and the PC (A) related to the device image 88 are designated as the target devices that cooperate with each other. For example, the MFP (B) that is designated first corresponds to a first device. If the PC (A) that is designated second is a device that is not capable of executing a cooperative function together with the MFP (B), a guide indicating a device that is capable of executing a cooperative function together with the MFP (B) is presented as in Examples 1 to 8 described above.

The controller 48 of the terminal apparatus 16 may cause a device image that is being dragged to be displayed on the UI unit 46 in an identifiable manner. For example, a device image that is being dragged may be displayed translucently or in a specific color.

Figure 43C:
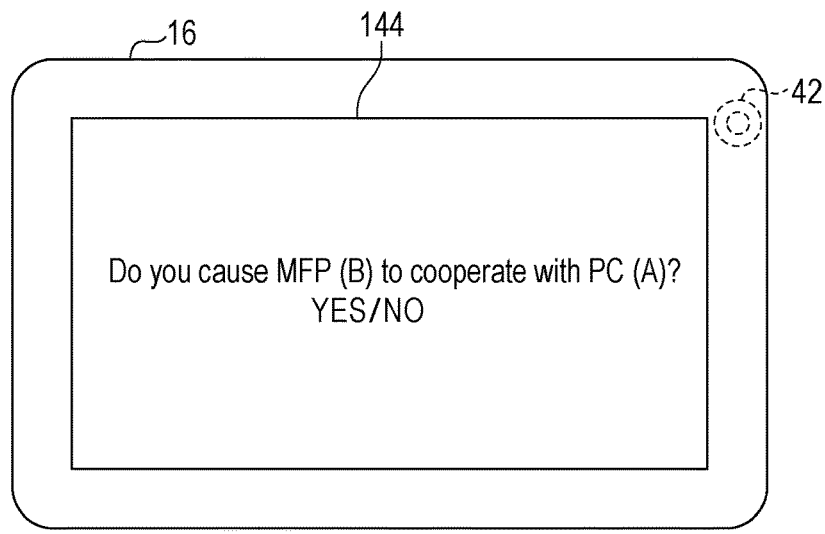

If the device image 70 is superimposed on the device image 88 and if the PC (A) is capable of executing a cooperative function together with the MFP (B), a confirmation screen 144 is displayed on the UI unit 46 of the terminal apparatus 16 as illustrated in FIG. 43C. The confirmation screen 144 is a screen for confirming whether or not to cause the designated devices to cooperate with each other. If a cooperation instruction is provided by the user on the confirmation screen 144 (for example, if a "YES" button is pressed by the user), information about cooperative functions is displayed on the UI unit 46 of the terminal apparatus 16.

Figure 44A:
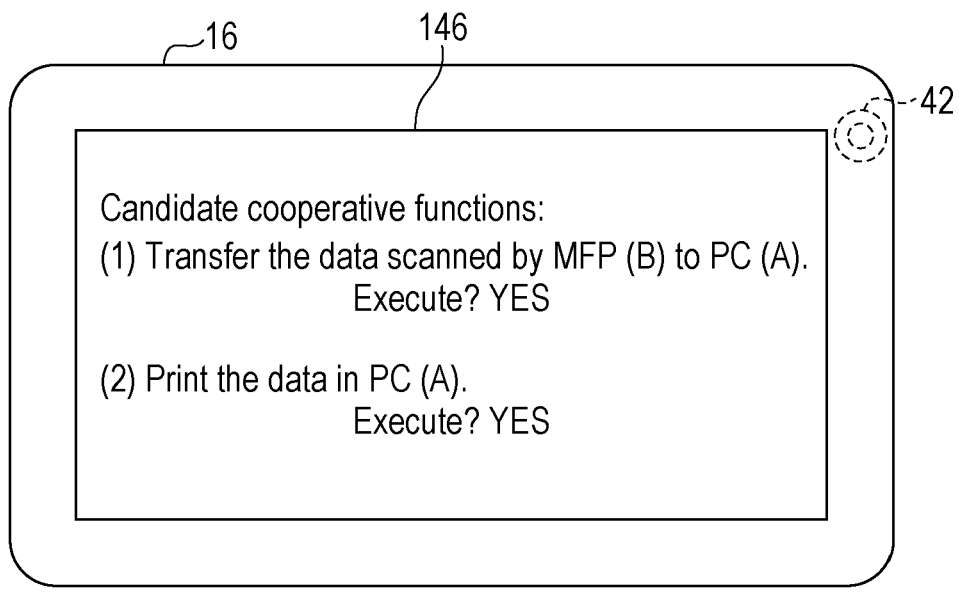
FIGS. 44A and 44B are diagrams illustrating an example of screens displayed on the terminal apparatus.

For example, as illustrated in FIG. 44A, the controller 48 of the terminal apparatus 16 causes the UI unit 46 to display a cooperative function display screen 146 and to display the information about the candidate cooperative functions on the cooperative function display screen 146. With the PC (A) and the MFP (B) being caused to cooperate with each other, for example, a scan and transfer function and a print function are implemented. Thus, the information about the scan and transfer function and the information about the print function are displayed on the cooperative function display screen 146.

Figure 44B:
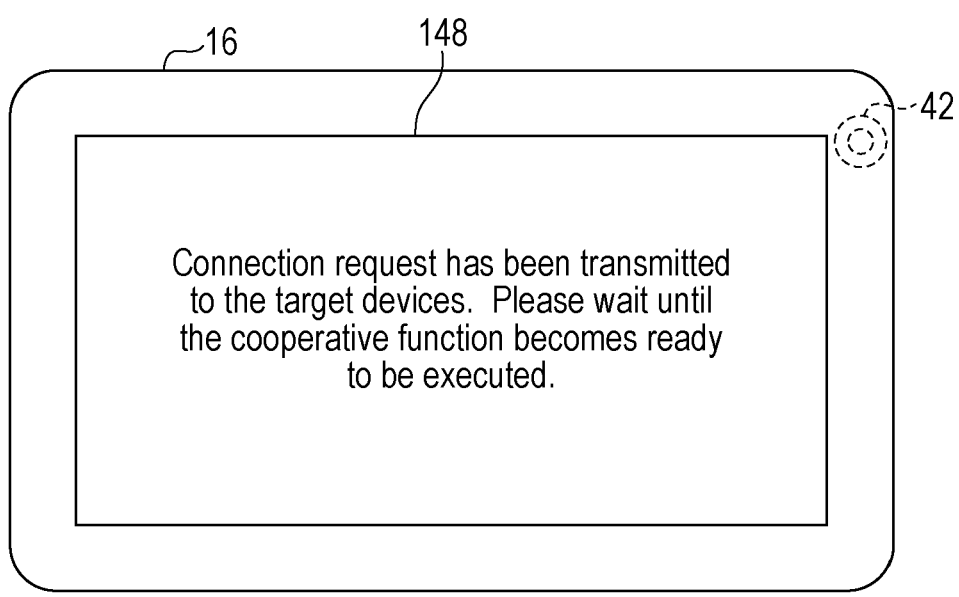

If a cooperative function is designated by the user and an execution instruction is provided by the user, a connection request is transmitted from the terminal apparatus 16 to the target devices that cooperate with each other. As illustrated in FIG. 44B, a waiting screen 148 is displayed on the UI unit 46 of the terminal apparatus 16 while the connection request is being processed. When the connection between the terminal apparatus 16 and the target devices is successfully established, the designated cooperative function is executed.

As described above, device images related to devices are superimposed on one another, and thereby cooperative functions that use the functions of the devices are specified. Thus, the functions may be caused to cooperate with each other without a special operation other than an image operation, and cooperation between the functions may be performed with a simple operation. Also in this case, a guide indicating a second device that is capable of executing a cooperative function together with a first device is presented, and thus user's convenience of using a cooperative function may be increased compared to a case where the guide is not presented.

Figure 45A:
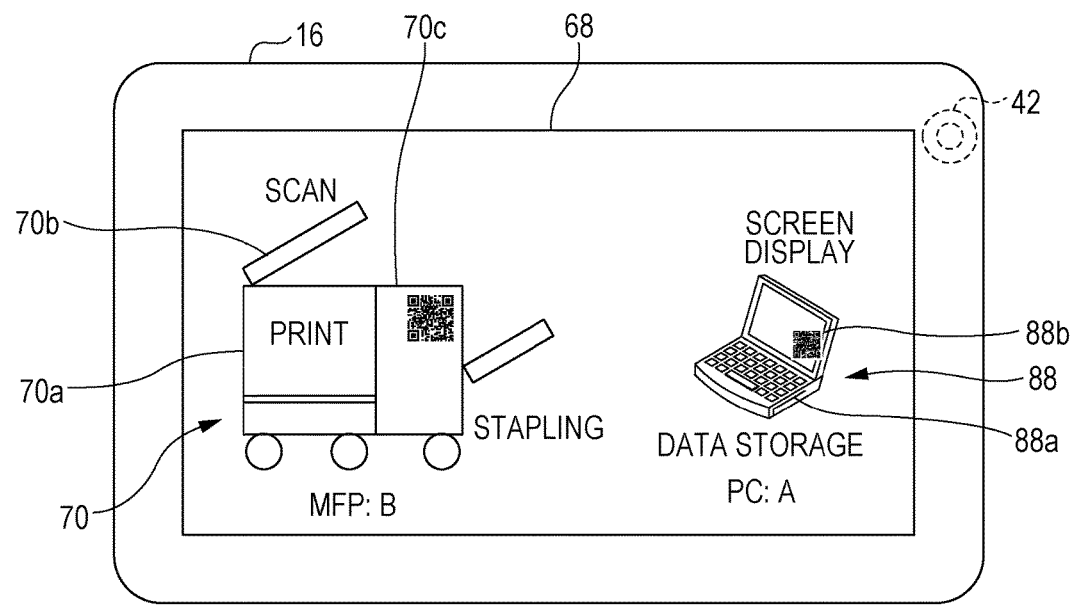
FIGS. 45A and 45B are diagrams illustrating an example of screens displayed on the terminal apparatus.
Figure 45B:
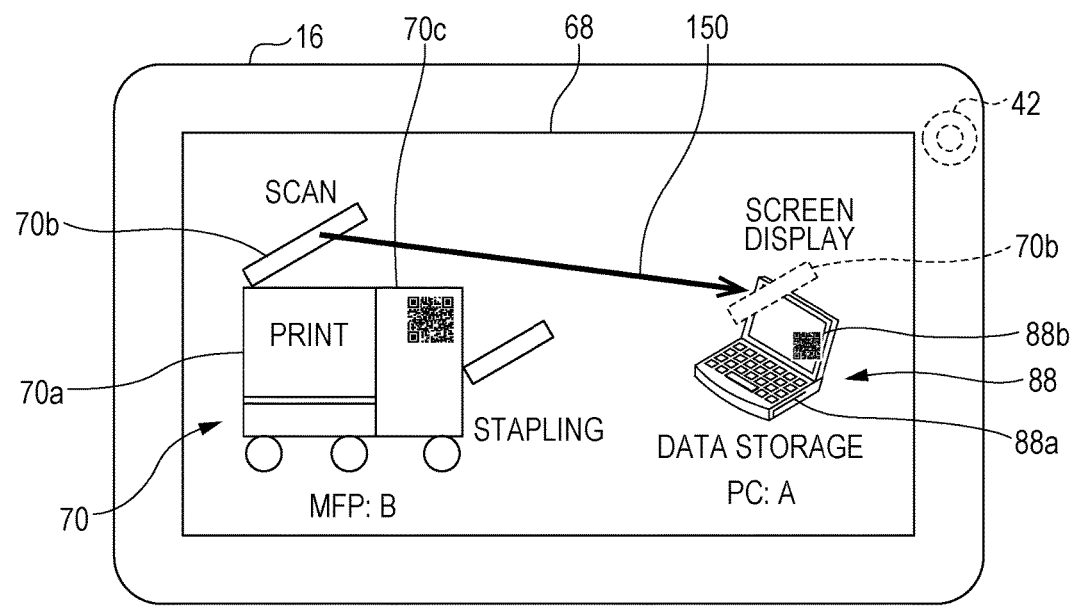

A cooperative function may be specified by superimposing a partial image on a device image or a partial image. This process will be described with reference to FIGS. 45A and 45B. FIGS. 45A and 45B each illustrate an example of a screen displayed on the UI unit 46 of the terminal apparatus 16.

As in the above-described cooperative process using partial images, a function of a device varies according to a position in a device image related to the device. With a partial image included in a device image being superimposed on a partial image included in the same or different device image, a cooperative function that uses the functions related to both the partial images is specified. Hereinafter, this process will be described in detail.

For example, it is assumed that the MFP (B) and the PC (A) are identified. As illustrated in FIG. 45A, the device display screen 68 is displayed on the UI unit 46 of the terminal apparatus 16, and the device images 70 and 88 are displayed on the device display screen 68. For example, each of the partial images 70*a*, 70*b*, 70*c*, 88*a*, and 88*b* is displayed as an image that is able to be moved separately from another partial image.

If a partial image is designated by the user and if the partial image is superimposed on another partial image, cooperative functions that use the functions related to both the partial images are specified, and the information about the cooperative functions is displayed, on the UI unit 46 of the terminal apparatus 16. This specification process may be performed by the specifying unit 38 of the server 14 or the terminal apparatus 16.

For example, as indicated by an arrow 150 in FIG. 45B, if the user drags the partial image 70*b* and drops it on the partial image 88*b* by using an operator, the MFP (B) related to the device image 70 including the partial image 70*b* and the PC (A) related to the device image 88 including the partial image 88*b* are designated as the target devices that cooperate with each other, and also the scan function assigned to the partial image 70*b* and the screen display function assigned to the partial image 88*b* are designated as the target functions that cooperate with each other.

In the server 14, the functions assigned to the individual partial images are managed. For example, identification information for identifying a partial image, function information representing a function associated with the partial image, and cooperative function information representing a cooperative function executed through cooperation between functions are stored in the server 14 in association with each other. If a partial image is selected on the device display screen 68 and is superimposed on another partial image, the pieces of identification information representing the partial images superimposed on one another are transmitted from the terminal apparatus 16 to the server 14. In the example illustrated in FIG. 45B, the pieces of identification information representing the partial images 70b and 88b are transmitted from the terminal apparatus 16 to the server 14. The specifying unit 38 of the server 14 specifies the functions assigned to the partial images 70b and 88b on the basis of the pieces of identification information and specifies a cooperative function that uses the functions. The information about the cooperative function is transmitted from the server 14 to the terminal apparatus 16 and is displayed on the terminal apparatus 16.

As described above, in a case where each of the target devices that cooperate with each other has plural functions, a function is selected in each of the target devices, and information about a cooperative function that uses the designated functions is preferentially displayed. Accordingly, the cooperative function expected to be used by the user is preferentially displayed.

The order of priority in which cooperative functions are displayed may be changed in accordance with an order in which partial images are superimposed on one another. In this case, the information about a cooperative function that uses the functions related to the superimposed partial images is preferentially displayed.

In a case where partial images are superimposed on one another, a partial image designated first corresponds to a first image, and a function related to the partial image corresponds to a first function. A partial image designated second (a partial image on which the first image is superimposed) corresponds to a second image, and a function related to the partial image corresponds to a second function. If the function designated second is not capable of executing a cooperative function together with the function designate first, a guide indicating a function that is capable of executing a cooperative function together with the function designated first is presented as in Examples 1 to 8 described above. In the above-described example, if the screen display function related to the partial image 88b designated second is not capable of executing a cooperative function together with the scan function related to the partial image 70b designated first, a guide indicating a function that is capable of executing a cooperative function together with the scan function designated first is presented. In this case, a guide indicating the whole device (for example, the device image itself) that is capable of executing a cooperative function together with the function designated first (for example, scan function) may be presented, or a guide indicating a part of a device assigned with a function that is capable of executing a cooperative function together with the function that is designated first (for example, a partial image) may be presented.

Process of Switching Display of Single-Device Function and Cooperative Function

In the exemplary embodiment, control of switching between display of a function in which a single device is used alone (hereinafter referred to as a "single-device function") and display of a cooperative function may be performed.

For example, if only one device is identified within a predetermined identification period, the controller 48 of the terminal apparatus 16 causes the UI unit 46 of the terminal apparatus 16 to display information about one or more functions of the one device (for example, the image forming apparatus 10) as single-device function information. The length of the identification period may be changed by a user. The device may be identified by applying the AR technologies or other technologies. The process of identifying the device may be performed by the server 14 or the terminal apparatus 16. The starting point of the identification period may be, for example, a time point at which the one device is identified or a time point designated by the user (for example, a time point at which an identification process is started).

For example, if another device is not identified within the identification period from the time point at which the one device is identified, the controller 48 of the terminal apparatus 16 causes the UI unit 46 of the terminal apparatus 16 to display information about one or more functions of the one device as single-device function information. In this case, the one device is handled as a device identified within the identification period. The information about the device may be information transmitted from the server 14 to the terminal apparatus 16 or information stored in the terminal apparatus 16 in advance.

For another example, if only one device is identified within an identification period which starts from a time point designated by a user, the controller 48 of the terminal apparatus 16 causes the UI unit 46 of the terminal apparatus 16 to display information about one or more functions of the one device as single-device function information.

For another example, if an instruction to display a single-device function is provided after one device is identified, the controller 48 of the terminal apparatus 16 may cause the UI unit 46 of the terminal apparatus 16 to display information about one or more functions of the one device as single-device function information. The controller 48 of the terminal apparatus 16 causes the UI unit 46 of the terminal apparatus 16 to display a button image to be used for providing an instruction to display a single-device function, constantly or if one device is photographed (or if one device is identified). If the button image is pressed by a user, the controller 48 causes the UI unit 46 to display information about one or more functions of the one device.

The controller 48 of the terminal apparatus 16 may cause the UI unit 46 of the terminal apparatus 16 to display a confirmation screen when the identification period has elapsed. The confirmation screen is, for example, a screen used by a user to provide an instruction to extend the identification period. If the user provides an instruction to extend the identification period through the confirmation screen and if another device is not photographed within the extended period, the controller 48 of the terminal apparatus 16 causes the UI unit 46 of the terminal apparatus 16 to display information about one or more functions of the identified device.

A further description will be given of display control of single-device function information. For example, it is assumed that a device is identified by using the marker-based AR technology or the markerless AR technology. For example, if only one device is photographed within a predetermined photography period, the controller 48 of the terminal apparatus 16 causes the UI unit 46 of the terminal apparatus 16 to display information about one or more functions of the one device as single-device function information. The starting point of the photography period may be a time point at which the one device is photographed or a time point designated by a user (for example, photography starting point). The length of the photography period may be changed by the user. After the one device is photographed, the one device is identified by using the marker-based AR technology or the markerless AR technology. The identification process may be performed by the server 14 or the terminal apparatus 16.

For example, if another device is not photographed within the photography period from the time point at which the one device is photographed, the controller 48 of the terminal apparatus 16 causes the UI unit 46 of the terminal apparatus 16 to display information about one or more functions of the one device as single-device function information. In this case, the one device is handled as a device photographed within the photography period.

For another example, if only one device is photographed within a photography period which starts from a time point designated by a user, the controller 48 of the terminal apparatus 16 causes the UI unit 46 of the terminal apparatus 16 to display information about one or more functions of the one device as single-device function information.

For another example, if an instruction to display a single-device function is provided after one device is photographed, the controller 48 of the terminal apparatus 16 may cause the UI unit 46 of the terminal apparatus 16 to display information about one or more functions of the one device as single-device function information.

For example, if only one device is photographed within a photography period (for example, if a second device is not photographed within a photography period from a time point at which a first device is photographed or if only one device is photographed within a photography period from a starting point designated by a user), the controller 48 of the terminal apparatus 16 transmits image data generated through the photography to the server 14. The photography period may be measured by the controller 48 or a timer. The specifying unit 38 of the server 14 specifies (identifies) a device on the basis of the image data and specifies one or more functions of the device. Information about the one or more functions is transmitted from the server 14 to the terminal apparatus 16 and is displayed on the UI unit 46 of the terminal apparatus 16. Of course, the server 14 may manage the time instead of the terminal apparatus 16 and may transmit information about one or more functions of an identified device to the terminal apparatus 16.

The controller 48 of the terminal apparatus 16 may cause the UI unit 46 of the terminal apparatus 16 to display a confirmation screen when the photography period has elapsed. The confirmation screen is, for example, a screen used by a user to provide an instruction to extend the photography period. If the user provides an instruction to extend the photography period through the confirmation screen and if another device is not photographed within the extended period, the controller 48 of the terminal apparatus 16 transmits image data obtained through the photography to the server 14 and causes the UI unit 46 of the terminal apparatus 16 to display one or more functions of the one device. The length of the extended period may be changed by the user.

For another example, if an instruction to display a single-device function is provided after one device is photographed, the controller 48 of the terminal apparatus 16 may transmit image data generated through the photography to the server 14 and accordingly may receive information about one or more functions of the photographed device from the server 14.

For still another example, the controller 48 of the terminal apparatus 16 may transmit image data to the server 14 every time image data is generated by photographing a device, and accordingly may receive information about one or more functions of the photographed device from the server 14. In this case, if only one device is photographed within a photography period, the controller 48 of the terminal apparatus 16 causes the UI unit 46 of the terminal 16 to display information about the one device as single-device function information.

On the other hand, if plural devices are identified within an identification period, the controller 36 of the server 14 executes a cooperative function mode. In the cooperative function mode, a guide indicating a second device that is capable of executing a cooperative function together with a first device is presented as in Examples 1 to 8 described above.

For example, if a second device is identified within an identification period from a time point at which a first device is identified, the cooperative function mode is executed. In this case, the first device is also handled as a device identified within the identification period. Also, if a second device is identified within an identification period from a time point at which a first device is identified, the controller 36 of the server 14 may set a new identification period which starts from a time point at which the second device is identified. The same applies to the following period, that is, if a third device is identified within the new identification period, another new identification period is set.

For another example, if plural devices are photographed within an identification period which starts from a time point designated by a user, the cooperative function mode may be executed.

For another example, if an instruction to display a cooperative function is provided after plural devices are identified, the cooperative function mode may be executed. The controller 48 of the terminal apparatus 16 causes the UI unit 46 to display a button image to be used for providing an instruction to display one or more cooperative functions, constantly or if plural devices are photographed (or if plural devices are identified). If the button image is pressed by a user, the cooperative function mode is executed.

For another example, if a second device is identified during a period in which an instruction to execute a function of a first device is not provided after the first device is identified, the cooperative function mode may be executed.

A further description will be given of execution of the cooperative function mode. For example, it is assumed that plural devices are identified by using the marker-based AR technology or the markerless AR technology. For example, if plural devices are photographed within a predetermined photography period, the cooperative function mode is executed. For example, if a second device is photographed within the photography period from the time point at which a first device is photographed, the cooperative function mode is executed. In this case, the first device is also handled as a device photographed within the photography period. Also, if a second device is photographed within a photography period from a time point at which a first device is photographed, the controller 36 of the server 14 may set a new photography period which starts from a time point at which the second device is photographed. The same applies to the following period, that is, if a third device is photographed within the new photography period, another new photography period is set.

For another example, if plural devices are photographed within a photography period which starts from a time point designated by a user, the cooperative function mode may be executed.

For another example, if an instruction to display a cooperative function is provided after plural devices are photographed, the cooperative function mode may be executed.

For another example, if a second device is photographed during a period in which an instruction to execute a function of a first device is not provided after the first device is photographed, the cooperative function mode may be executed.

As described above, in the process of switching display of a single-device function and a cooperative function, if one device is identified (for example, photographed), information about one or more functions of the one device is displayed, and if plural devices are identified (for example, photographed), the cooperative function mode is executed. Accordingly, information about a function executable using an identified (for example, photographed) device is provided to a user, which may be convenient for the user.

Because a single-device function or cooperative function becomes available only by identifying a device or devices by applying the AR technologies, each function is available through a simple operation compared to a case where a user manually makes settings for executing a function, and the time and effort of the user may be decreased.

In the exemplary embodiment, device images related to identified devices and device images superimposed on one another may be three-dimensionally displayed so as to be distinguished from a background image. That is, these images may be displayed as three-dimensional images. For example, the background image is two-dimensionally displayed and the device images are three-dimensionally displayed. Accordingly, the visibility of the device images may increase. Furthermore, the color of a device image designated by the user may be changed or the designated device image may be blinked so that the designated device image is distinguished from the other device images.

According to the exemplary embodiment, cooperative functions that use the functions of the target devices that cooperate with each other are specified by applying the AR technologies, and information about the cooperative functions is displayed. Accordingly, even if the user does not know which cooperative function may be executed by the target devices that cooperate with each other from the appearances of the devices, the user is provided with information about the cooperative function. Also, a function that is not executable by a single device becomes available by causing plural devices to cooperate with each other, which may be convenient. Furthermore, a cooperative function becomes available only by identifying the target devices that cooperate with each other by applying the AR technologies. Thus, the cooperative function becomes available through a simple operation compared to a case where the user manually performs settings for executing the cooperative function, and the time and effort of the user may be decreased.

Each of the image forming apparatus 10, the server 14, and the terminal apparatus 16 is implemented through cooperation between hardware and software resources, for example. Specifically, each of the image forming apparatus 10, the server 14, and the terminal apparatus 16 includes one or plural processors, such as a central processing unit (CPU), which are not illustrated. The one or plural processors read and execute a program stored in a storage apparatus (not illustrated), and thereby the functions of the individual units of the image forming apparatus 10, the server 14, and the terminal apparatus 16 are implemented. The program is stored in the storage apparatus through a recording medium, such as a compact disc (CD) or a digital versatile disc (DVD), or through a communication path, such as a network. Alternatively, the individual units of the image forming apparatus 10, the server 14, and the terminal apparatus 16 may be implemented by hardware resources such as a processor, an electronic circuit, or an application specific integrated circuit (ASIC). An apparatus such as a memory may be used for the implementation. Alternatively, the individual units of the image forming apparatus 10, the server 14, and the terminal apparatus 16 may be implemented by a digital signal processor (DSP) or a field programmable gate array (FPGA).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor programmed to:
   display a plurality of images including a first image representing a first device, a second image representing a second device, a third image representing a third device and a fourth image representing a fourth device, the first device being capable of executing a cooperative function with the second device but not with the third device, the fourth device being capable of executing the cooperative function with the first device and the second device;
   when the first image is designated by a user, display a first guide with reference to the first, second, third and fourth images so as to indicate that the first device is capable of executing the cooperative function with the second device and the fourth device but not with the third device; and
   when the second image is subsequently designated while the first guide is displayed, replace the display of the first guide with display of a second guide that indicates that the fourth device is capable of executing the cooperative function with both the first device and the second device.

2. The information processing apparatus according to claim 1, wherein the processor is programmed to:
   when the third image representing the third device that is not capable of executing the cooperative function with the first device is designated by the user, display a message indicating that the third device is not capable of executing the cooperative function with the first device.

3. The information processing apparatus according to claim 2, wherein the processor is programmed to:
   when an operation of linking the first image and the third image representing the third device that is not capable of executing the cooperative function with the first device is performed by the user, display the message.

4. The information processing apparatus according to claim 2, wherein the processor is programmed to:
when the first image and the third image representing the third device that is not capable of executing the cooperative function with the first device are superimposed on one another, display the message.

5. The information processing apparatus according to claim 1, wherein the processor is programmed to:
when a partial image included in the first image is designated by the user, display the first guide indicating that the second device and the fourth device are capable of executing the cooperative function with a specific function of the first device corresponding to the partial image.

6. The information processing apparatus according to claim 1, wherein the processor is programmed to:
display a candidate list of a plurality of images representing a plurality of devices that are capable of executing the cooperative function with the first device, the plurality of images including the second image and the fourth image.

7. The information processing apparatus according to claim 6, wherein the processor is programmed to:
when a respective one of the plurality of images in the candidate list is designated by the user, display information about the cooperative function that uses a respective one of the plurality of devices corresponding to the designated respective image.

8. The information processing apparatus according to claim 1, wherein the processor is programmed to:
display a different cooperative function depending on an order in which the first image representing the first device and the second image representing the second device are designated by the user.

9. The information processing apparatus according to claim 1, wherein the processor is programmed to:
when the second image is designated after the first image is designated, display the second guide in reference to the first image, the second image, and the fourth image indicating that the fourth device is capable of executing another cooperative function together with the first device and the second device.

10. The information processing apparatus according to claim 1, wherein the processor is programmed to:
display a different guide while changing the fourth device in accordance with an order in which the first device and the second device are designated.

11. An information processing apparatus comprising:
a processor programmed to:
display a plurality of images including a first image representing a first function, a second image representing a second function, a third image representing a third function and a fourth image representing a fourth function, the first function being capable of executing a cooperative function with the second function but not with the third function, the fourth function being capable of executing the cooperative function with the first function and the second function;
when the first image is designated by a user, display a first guide with reference to the first, second, third and fourth images so as to indicate that the first function is capable of executing the cooperative function with the second function and the fourth function but not with the third function; and
when the second image is subsequently designated while the first guide is displayed, replace the display of the first guide with display of a second guide that indicates that the fourth function is capable of executing the cooperative function with both the first function and the second function.

12. The information processing apparatus according to claim 11, wherein the processor is programmed to:
when the third image is designated by the user, display a message indicating that the third function is not capable of executing the cooperative function with the first function.

13. The information processing apparatus according to claim 12, wherein the processor is programmed to:
when an operation of linking the first image and the third image is performed by the user, display the message.

14. The information processing apparatus according to claim 12, wherein the processor is programmed to:
when the first image and the third image are superimposed on one another, display the message.

15. The information processing apparatus according to claim 11, wherein the processor is programmed to:
display a candidate list of a plurality of images representing a plurality of functions that are capable of executing the cooperative function with the first function, the plurality of images including the second image and the fourth image.

16. The information processing apparatus according to claim 15, wherein the processor is programmed to:
an order in which the plurality of images are arranged in the candidate list is determined based on a record of past usage of the plurality of functions.

17. The information processing apparatus according to claim 11, wherein the processor is programmed to:
display a different cooperative function depending on an order in which the first image and the second image are designated by the user.

18. The information processing apparatus according to claim 11, wherein the processor is programmed to:
when the second image is designated by the user after the first image is designated, display the second guide with reference to the first image, the second image and the fourth image indicating that the fourth function is capable of executing another cooperative function with the first function and the second function.

19. The information processing apparatus according to claim 11, wherein the processor is programmed to:
display a different guide while changing the fourth function in accordance with an order in which the first image and the second image are designated by the user.

20. The information processing apparatus according to claim 11, wherein
the first function, the second function, the third function and the fourth function are included in a group of functions registered in advance, a group of functions of one or a plurality of identified devices, a group of functions displayed on a display, or a group of functions displayed in a specific area in a screen of the display.

* * * * *